United States Patent [19]

Mimuro et al.

[11] Patent Number: 4,884,647
[45] Date of Patent: Dec. 5, 1989

[54] REAR WHEEL STEERING APPARATUS

[75] Inventors: Tetsushi Mimuro, Nagoya; Hiroki Abe, Okazaki; Masahiro Honda, Nukata; Takeshi Mitsui, Okazaki, all of Japan

[73] Assignee: Mitsubishi Jidosha Kogyo Kabushiki Kaisha, Tokyo, Japan

[21] Appl. No.: 127,618

[22] Filed: Nov. 30, 1987

Related U.S. Application Data

[63] Continuation of Ser. No. 705,921, Feb. 26, 1985, abandoned.

[30] Foreign Application Priority Data

| Nov. 21, 1983 | [JP] | Japan | 58-179923 |
| Nov. 30, 1983 | [JP] | Japan | 58-184861 |
| Nov. 30, 1983 | [JP] | Japan | 58-184860 |
| Nov. 30, 1983 | [JP] | Japan | 58-184851 |
| Nov. 30, 1983 | [JP] | Japan | 58-184853 |
| Nov. 30, 1983 | [JP] | Japan | 58-184854 |
| Feb. 28, 1984 | [JP] | Japan | 59-27560 |
| Jan. 29, 1985 | [JP] | Japan | 60-14954 |

[51] Int. Cl.$^4$ ............................................. B62D 5/06
[52] U.S. Cl. ..................... 180/140; 60/385; 91/536; 180/79.1; 180/141; 180/142; 364/424.05
[58] Field of Search ............... 180/140, 141, 142, 143, 180/79, 79.1; 280/91; 364/424.05, 404.1; 74/388 PS; 60/385, 386; 91/536; 92/117 R, 117 A

[56] References Cited

U.S. PATENT DOCUMENTS

| 4,412,594 | 11/1983 | Furukawa et al. | 180/140 |
| 4,418,780 | 12/1983 | Ito et al. | 180/142 |
| 4,441,572 | 4/1984 | Ito et al. | 180/140 |
| 4,552,239 | 11/1985 | Kanazawa et al. | 180/140 |
| 4,601,357 | 7/1986 | Miyoshi et al. | 180/140 |
| 4,621,702 | 11/1986 | Kanazawa et al. | 180/140 |
| 4,625,822 | 12/1986 | Nakamura et al. | 180/140 |

FOREIGN PATENT DOCUMENTS

| 3338700 | 4/1984 | Fed. Rep. of Germany . |
| 2534866 | 4/1984 | France . |
| 57-11173 | 1/1982 | Japan . |
| 57-44568 | 3/1982 | Japan . |
| 999177 | 7/1965 | United Kingdom . |
| 2083422 | 3/1982 | United Kingdom . |
| 2128947A | 5/1984 | United Kingdom . |

*Primary Examiner*—Mitchell J. Hill
*Attorney, Agent, or Firm*—Birch, Stewart, Kolasch & Birch

[57] ABSTRACT

A rear wheel steering hydraulic cylinder is arranged in a rear wheel steering apparatus to steer rear wheels to the right and left. When a front wheel steering angle detected by a front wheel steering angle sensor exceeds a predetermined value, the hydraulic cylinder is actuated to steer the rear wheels in a direction opposite to that of the front wheels. When the rear wheel steering angle detected by a rear wheel steering angle sensor is changed in response to the front wheel steering angle, the hydraulic cylinder is not activated, thereby not steering the rear wheels.

27 Claims, 39 Drawing Sheets

FIG. 3C
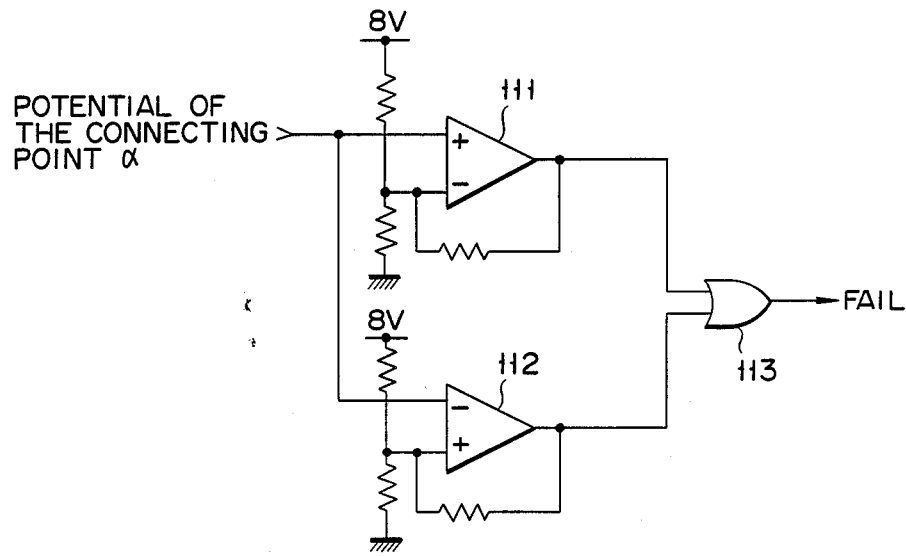
FIG. 4A
OUTPUT OF THE
SECOND TERMINAL
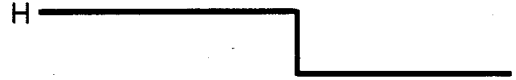
FIG. 4B
OUTPUT OF THE
FOURTEENTH
TERMINAL
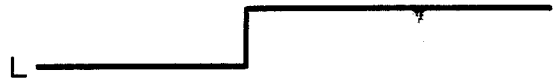
FIG. 4C
OUTPUT OF THE
THIRTEENTH
TERMINAL
FIG. 4D
OUTPUT OF THE
THIRD TERMINAL
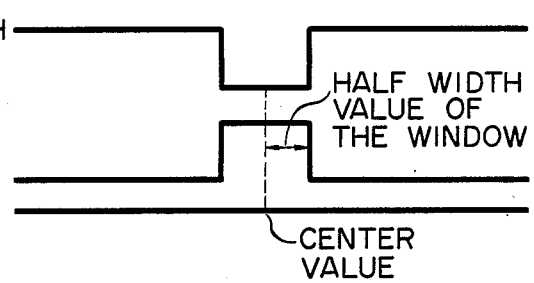

F I G. 14A
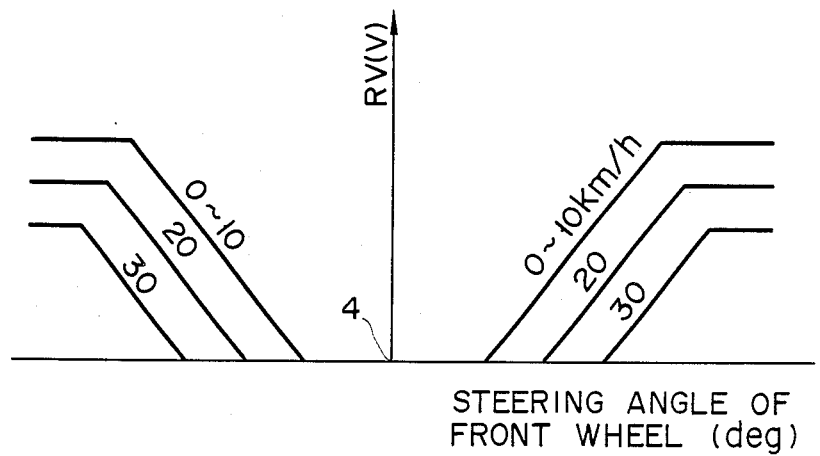
F I G. 14B
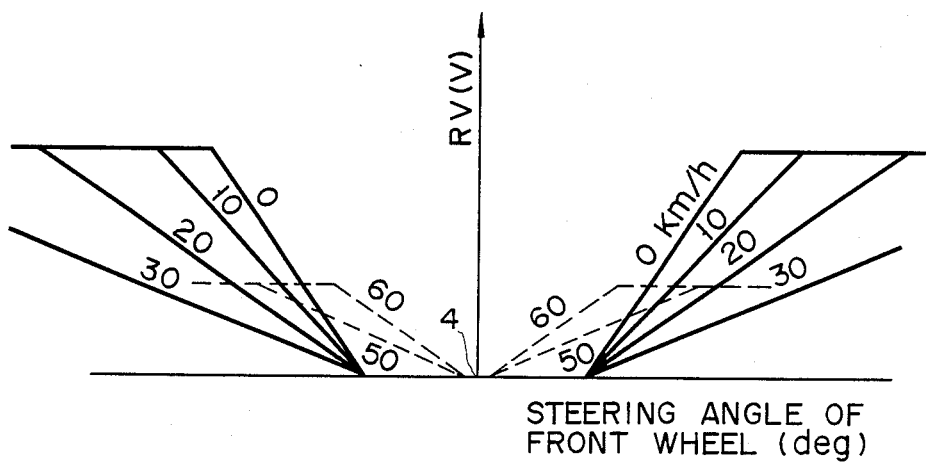

REAR WHEEL STEERING APPARATUS

This application is a continuation, of application Ser. No. 705,921 filed on Feb. 26, 1985, now abandoned.

BACKGROUND OF THE INVENTION

The present invention relates to a rear wheel steering apparatus wherein a steering angle of rear wheels is adjusted in accordance with a steering angle of front wheels, i.e., a steering wheel.

Demand has arisen for improved turning performance and response in front wheel drive vehicles. A conventional rear wheel steering apparatus has been proposed to satisfy this need. According to this conventional apparatus, when front wheels are turned at a predetermined steering angle, rear wheels are turned at a predetermined angle in the same direction as or a direction opposite to the turned direction of the front wheels, thereby improving turning performance and response when changing lanes. However, if a steering angle of rear wheels is increased, when the rear wheels turn from or return to a neutral position, a driver and/or passengers feel a shock and uncomfortableness.

SUMMARY OF THE INVENTION

It is, therefore, an object of the present invention to provide a rear wheel steering apparatus, wherein rear wheels are steered in accordance with a change in a steering angle of front wheels when a vehicle is moved backward, when a stationary swing is performed to turn the vehicle at a wide angle during parking, or when the vehicle changes lanes during highway driving.

In order to achieve the above object of the present invention, there is provided a rear wheel steering apparatus comprising: driving condition detecting means having at least front wheel steering angle detecting means for detecting a front wheel steering angle of a vehicle and generating a signal corresponding to the front wheel steering angle and rear wheel steering angle detecting means for detecting a rear wheel steering angle of the vehicle and generating a signal corresponding to the rear wheel steering angle; rear wheel steering means for steering rear wheels; and rear wheel steering control means having discriminating means for discriminating a difference between the front and rear wheel steering angle signals from said front and rear wheel steering angle detecting means and steering control means for supplying a steering signal to said rear wheel steering means to eliminate the difference when the difference exceeds a predetermined value.

BRIEF DESCRIPTION OF THE DRAWINGS

FIGS. 3A to 3C are respectively circuit diagrams of the control circuit of FIG. 1;

FIGS. 4A to 4D are timing charts of output signals from first to fourth window comparators, respectively;

FIGS. 14A and 14B are graphs showing output signals from a subtracter 148 and a rear wheel maximum steering angle adjusting circuit 146 according to the third embodiment, respectively;

DETAILED DESCRIPTION OF THE PREFERRED EMBODIMENTS

A rear wheel steering apparatus according to a first embodiment of the present invention will be described with reference to FIGS. 1 to 7.

Figure 1:
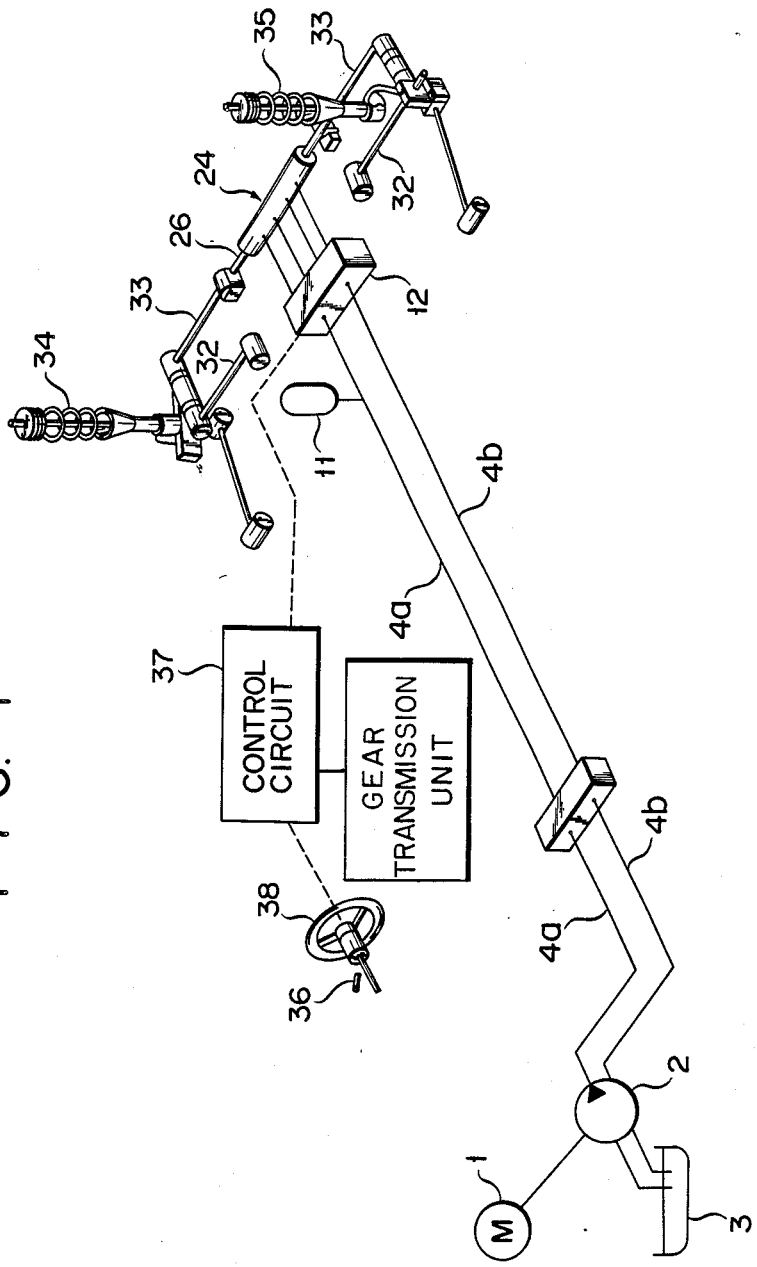
FIG. 1 is a perspective view of a rear wheel steering apparatus of a vehicle according to an embodiment of the present invention.
Figure 2A:
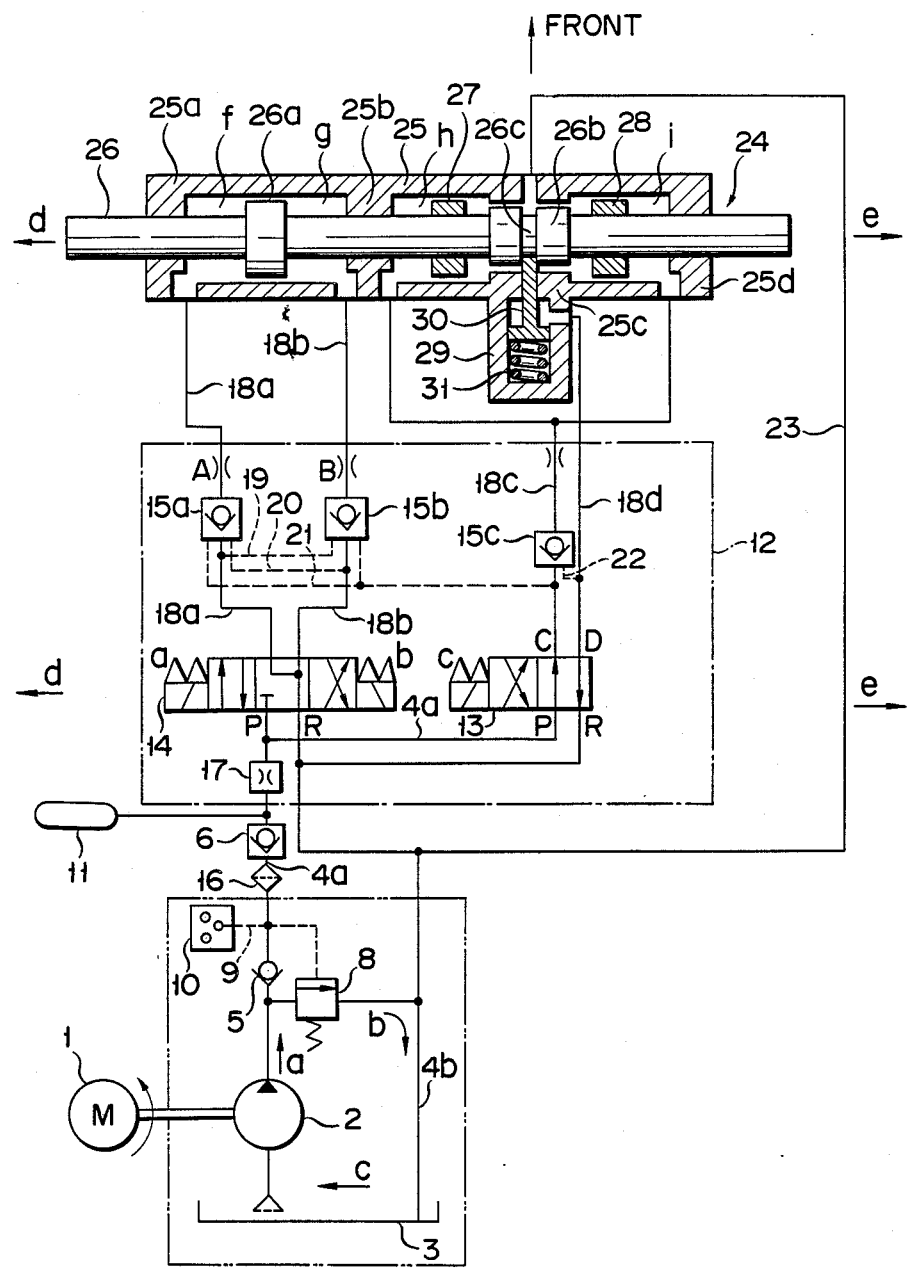
FIG. 2A is a system block diagram of a hydraulic circuit when a control circuit of FIG. 1 is kept inactive.
Figure 2B:
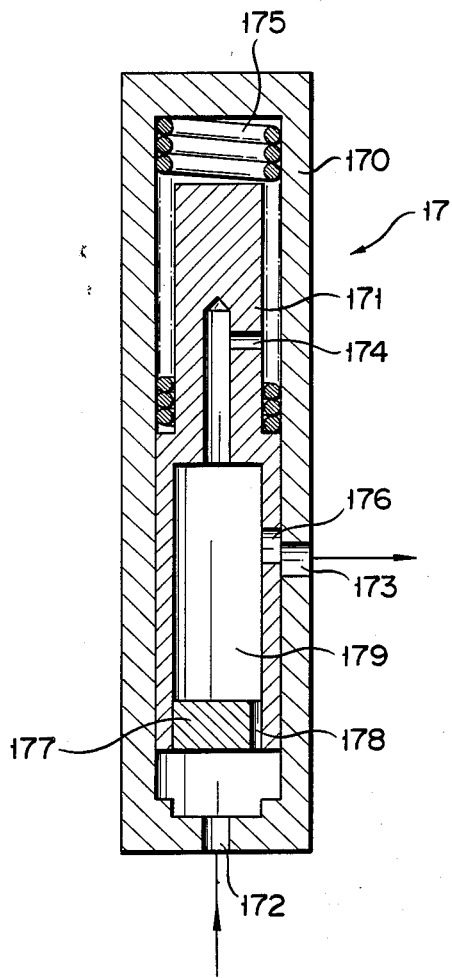
FIG. 2B is a sectional view of a pressure compensating flow control valve.

FIG. 1 is a perspective view showing the overall construction of the rear wheel steering apparatus, FIG. 2A is a system diagram of a hydraulic circuit in an inactive state, and FIG. 2B is a sectional view of a pressure compensating flow control valve. Referring to FIG. 1, reference numeral 1 denotes a motor; 2, a hydraulic pump driven by the motor 1; 3, a reservoir; and 4a, a high-pressure oil passage extending from the pump 2. Reference numerals 5 and 6 of FIG. 2A denote check valves arranged in the passage 4a; 4b, a low-pressure oil passage for connecting an upstream portion of the passage 4a with respect to the valve 5 to the reservoir 3; 9, an oil passage extending from the valve 5 to a pressure switch 10; and 11, an accumulator arranged in a downstream portion of the passage 4a with respect to the valve 6. When a pressure at the downstream side of the valve 5 which includes the accumulator 11 is higher than that of the upstream side thereof, compressed oil from the pump 2 is circulated in the order indicated by arrows a, b, c and the pump 2. A control valve 12 comprises a first electromagnetic selector valve (a selector control valve) 13, a second electromagnetic selector valve (an actuating control valve) 14, a first pilot operated check valve 15a, a second pilot operated check valve 15b and a third pilot operated check valve 15c, as shown in FIG. 2A. The passage 4a is connected to the P ports of the valves 13 and 14 through an in-line filter 16, the check valve 6 and a pressure compensating flow control valve 17. Similarly, the passage 4b is connected to the R ports of the valves 13 and 14. Reference numerals 18a and 18b denote oil passages at the side of the valve 14. The valves 15a and 15b are arranged in the passages 18a and 18b, respectively. Reference numerals 18c and 18d denote oil passages at the side of the valve 13. A cylinder assembly 24 shown in FIG. 2A comprises a cylinder 25 fixed on the vehicle body and a piston rod 26. The left portion of the cylinder 24 is called a first cylinder housing and the right portion of the cylinder is called a second cylinder housing. End plates 25a and 25d are integrally formed at two ends of the cylinder 25. An annular partition wall 25b partitions the left portion of the cylinder 25 into right and left chambers. An annular projection 25c is formed on the inner wall at the right portion of the cylinder 25. The piston rod 26 extends through the cylinder 25. A left portion of the piston rod 26 which is located to the left of the wall 25b comprises a piston 26a for partitioning the cylinder 25 into chambers f and g. The piston 26a is a piston of the first cylinder housing. A large-diameter portion 26b is located at the right of the piston rod 26. The large-diameter portion 26b is a piston of the second cylinder housing. An annular groove 26c is formed in the portion 26b. Reference numeral 27 denotes a sliding ring slidably mounted on a portion of the piston rod 26 between the wall 25b and the portion 26b. The ring 27 can be slid along the axial direction of the piston rod 26. Reference numeral 28 denotes a sliding ring slidably mounted on a portion of the piston rod 26 between the wall 25d and the portion 26b. The ring 28 can be slid along the axial direction of the piston rod 26. Reference numeral 29 denotes a cylindrical body formed in a portion of the cylinder 25 which corresponds to the projection 25c; and 30, a lock member slidably inserted in the body 29. The distal end of the member 30 extends through the wall of the cylinder 25 and can extend/retract with respect to the cylinder 25. Reference numeral 31 denotes a spring hooked between the member 30 and the bottom of the body 29. The spring 31 continuously biases the member 30 toward the piston rod 26. The passage 18a at the downstream side of the valve 15a is connected to the chamber f of the cylinder 25. The passage 18b at the downstream side of the valve 15b is connected to the chamber g of the cylinder 25. The passage 18c at the downstream side of the valve 13 is connected to chambers h and i of the cylinder 25. The passage 18d at the downstream side of the valve 13 is connected to the cylindrical body 29. The passage 4b is connected to a portion of the cylinder 25 between the ring 27 and the ring 28 through an oil passage 23. Reference numeral 19 denotes a pilot oil passage extending from the passage 18a at the upstream side of the valve 15a to the valve 15b; 20, a pilot oil passage extending from the passage 18b at the upstream side of the valve 15b to the valve 15a; 21, a pilot oil passage extending from the passage 18c at the downstream side of the valve 13 to the valves 15a and 15b; and 22, a pilot oil passage extending from the passage 18d at the downstream side of the valve 13 to the valve 15c.

As shown in FIG. 1, a rear wheel suspension system comprises: struts 34 and 35 each incorporating a coil spring and a shock absorber; arms 32 each having one end connected to a knuckle located at the lower end of each of the struts 34 and 35 and the other end connected to the vehicle body; and arms 33 each having one end locked by the corresponding knuckle through the corresponding knuckle arm and the other end coupled to the corresponding end of the piston rod 26. Each arm 33 is parallel to the corresponding arm 32.

The pressure compensating flow control valve 17 has the construction shown in FIG. 2B. Referring to FIG. 2B, reference numeral 170 denotes a housing. A piston 171 is slidably inserted in the housing 170. An inlet port 172 is formed at one end of the housing 170 and is thus connected to the accumulator 11. Pressurized oil is supplied to the housing 170 through the port 172. The piston 171 is biased by a balance spring 175 toward the port 172. A pressure chamber 179 is formed in the piston 171. A portion of the chamber 179 which is located at the side of the port 172 has a restrictor 177. The restrictor 177 has, for example, an orifice 178. Oil pressure flowing in the chamber 179 through the port 172 is lowered by a predetermined amount. Reference numeral 174 denotes a communication hole. The chamber 179 can communicate with a portion of the housing 170 which is located at the side of the spring 175 through the hole 174. A port 176 is formed in the outer surface of the piston 171, and communicates with the chamber 179. An outlet port 173 is formed in the outer wall surface of the housing 170 so as to correspond to the port 176. In this embodiment, the control valve 17 is arranged in the passage 4a, but may be arranged in the passage 4b.

Referring to FIG. 1, reference numeral 37 denotes a control circuit; 38, a steering wheel; and 36, a steering angle sensor. The control circuit 37 will be described in detail later with reference to FIGS. 3A to 3C.

The operation of the rear wheel steering apparatus of the first embodiment will be briefly described. A case will be described wherein solenoid coils c and b are energized. As shown in FIG. 2A, the valve 13 is operated from the neutral position in a direction indicated by arrow e. The pressurized oil from the pump 2 or the accumulator 11 is supplied to the body 29 through the passage 4a, the P port of the valve 13, the D port thereof and the passage 18d in the order named. The distal end of the lock member 30 is moved backward against the biasing force of the spring 31. The member 30 is retracted from the groove 26c of the piston rod 26 of the cylinder 25. Thus, the piston rod 26 is released. The pressurized oil flowing through the passage 18d is partially supplied to the valve 15c, so that the upstream side of the valve 15c communicates with the downstream side thereof. Similarly, the valve 14 is operated from the neutral position of FIG. 2A in a direction indicated by arrow d. The pressurized oil from the pump 2 is supplied to the chamber g of the cylinder 25 through the passage 4a, the P port of the valve 14, the passage 18b, the valve 15b and the passage 18b in the order named. The pressurized oil flowing through the passage 18b at the upstream side of the valve 15b is partially supplied to the valve 15a through the passage 20, so that the downstream portion of the passage 18a with respect to the valve 15a communicates with the upstream portion thereof. Furthermore, the upstream and downstream portions of the passage 18a communicate with the reservoir 3 through the R port of the valve 14 and the passage 4b in the order named. The oil in the chamber f returns to the reservoir 3, and at the same time, the piston rod 26 is moved along the direction indicated by arrow d. As a result, the rear wheels are steered to the right by the corresponding arms 33. When the solenoid coil b is deenergized, the compressed oil is no longer supplied to the chamber g, and movement of the piston rod 26 is stopped. When the valve 15a is closed, the piston rod is held in this position.

A case will be described wherein solenoid coils c and a are energized. In this case, the valve 13 is actuated from the neutral position of FIG. 2A in the direction indicated by arrow e. In the same manner as described above, the member 30 is moved backward against the biasing force of the spring 31. The distal end of the member 30 is retracted from the groove 26c of the piston rod 26 of the cylindr 25, thereby releasing the piston rod 26. The pressurized oil flowing through the passage 18d is partially supplied through the passage 22 to the valve 15c, so that the upstream side of the valve 15c communicates with the downstream side thereof. The valve 14 is actuated from the neutral position of FIG. 2A in the direction indicated by arrow e to cause the compressed oil to flow from the pump 2 to the chamber f of the cylinder 25 through the passage 4a, the P port of the valve 14, the passage 18a, the valve 15a and the passage 18a in the order named. The pressurized oil flowing through the upstream portion of the passage 18 with respect to the valve 15a is partially supplied to the vale 15b through the passage 19, so that the downstream portion of the passage 18b with respect to the valve 15b communicates with the upstream portion thereof. Furthermore, the upstream and downstream portions of the passage 18b communicate with the reservoir 3 through the R port of the valve 14 and the passage 4b in the order named. Thus, the piston rod 26 of the cylinder 25 is moved in the direction indicated by arrow e while the oil returns from the chamber g to the reservoir 3. As a result, the rear wheels are steered to the left by the corresponding arms 33. When the solenoid coil a is deenergized, the pressurized oil is no longer supplied to the chamber f, and the movement of the piston rod 26 is stopped. When the valve 15b is closed, the piston rod 26 is held in this position.

When the solenoid coil a or b is deenergized and the solenoid c is deenergized while the piston rod 26 is slightly moved from the neutral position in the direction indicated by arrow d or e, the pressurized oil is supplied to the chambers h and i of the cylinder 25 through the passage 4a, the P port of the valve 13, the valve 15c and the passage 18c in the order named. The oil flowing through the upstream portion of the passage 18c with respect to the valve 15c is partially supplied to the valves 15a and 15b through the passage 21. In this state, the downstream portion of the passage 18a with respect to the valve 15a communicates with the upstream portion thereof, and the downstream portion of the passage 18b with respect to the valve 15b communicates with the upstream portion thereof. The chambers f and g of the cylinder 25 are kept at a low pressure. Therefore, the piston rod 26 returns to the neutral position because the piston rod 26 is biased by the pressurized oil supplied to the chambers h or i through the rings 27, 28, and the member 30 biased by the spring 31 is then inserted in the groove 26c.

Since the valve 17 is arranged in the passage 4a, the piston 171 of the valve 17 is moved to a position where the pressure is balanced with the biasing force of the spring 175 even if a flow rate or a pressure of the passage 4a is changed. An overlapping area or opening between the ports 176 and 173 is changed to keep the flow rate constant. For example, when a flow rate is increased, a difference between the pressures in front of and behind the restrictor 177, i.e., between the pressures at the port 172 and in the chamber 179 is increased. As shown in FIG. 2B, the piston 171 is moved upward to a position where the pressure is balanced with the biasing force of the spring 175. An opening between the ports 176 and 173 is decreased, so that the flow passage is restricted to obtain a constant flow rate. When a steering load of the rear wheels is increased and the oil pressure at the port 173 side is increased, the pressure in the chamber 179 is increased to decrease a pressure difference between the pressures of the chamber 179 and the port 172. Then, the piston 171 is moved downward (FIG. 2B) to a position where the pressure is balanced with the biasing force of the spring 175. In this case, the opening between the ports 176 and 173 is increased to compensate for a decrease in flow rate which is caused by an increase in load pressure, thereby maintaining a constant flow rate. As a result, pressurized oil at a constant flow rate is supplied to the cylinder assembly 24, and the velocity of the piston rod 26 in the cylinder assembly 24 is kept constant. Even if a rear wheel steering force is changed, the steering velocity can be kept constant.

Figures 1, 3A:
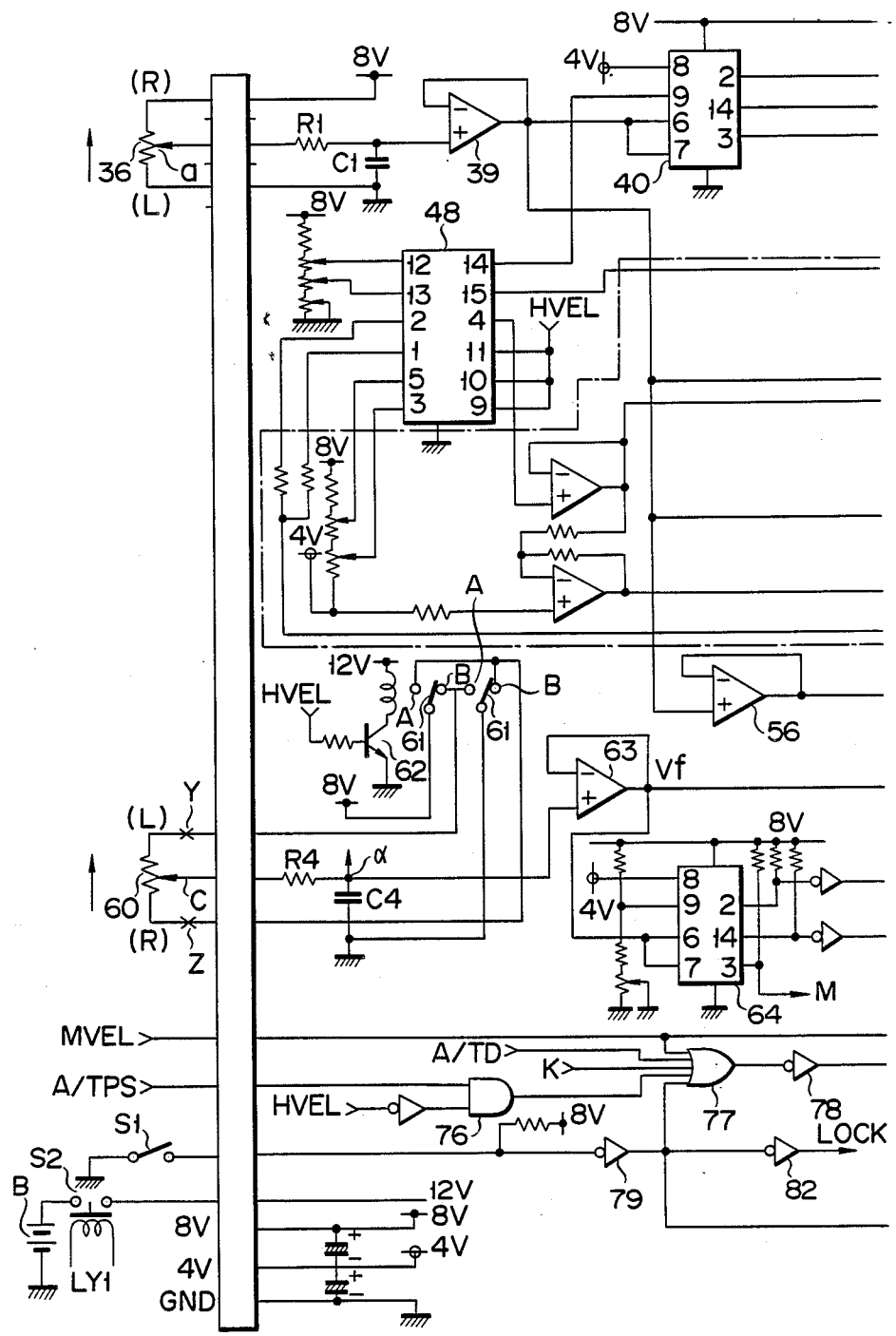
Figures 2, 3A:
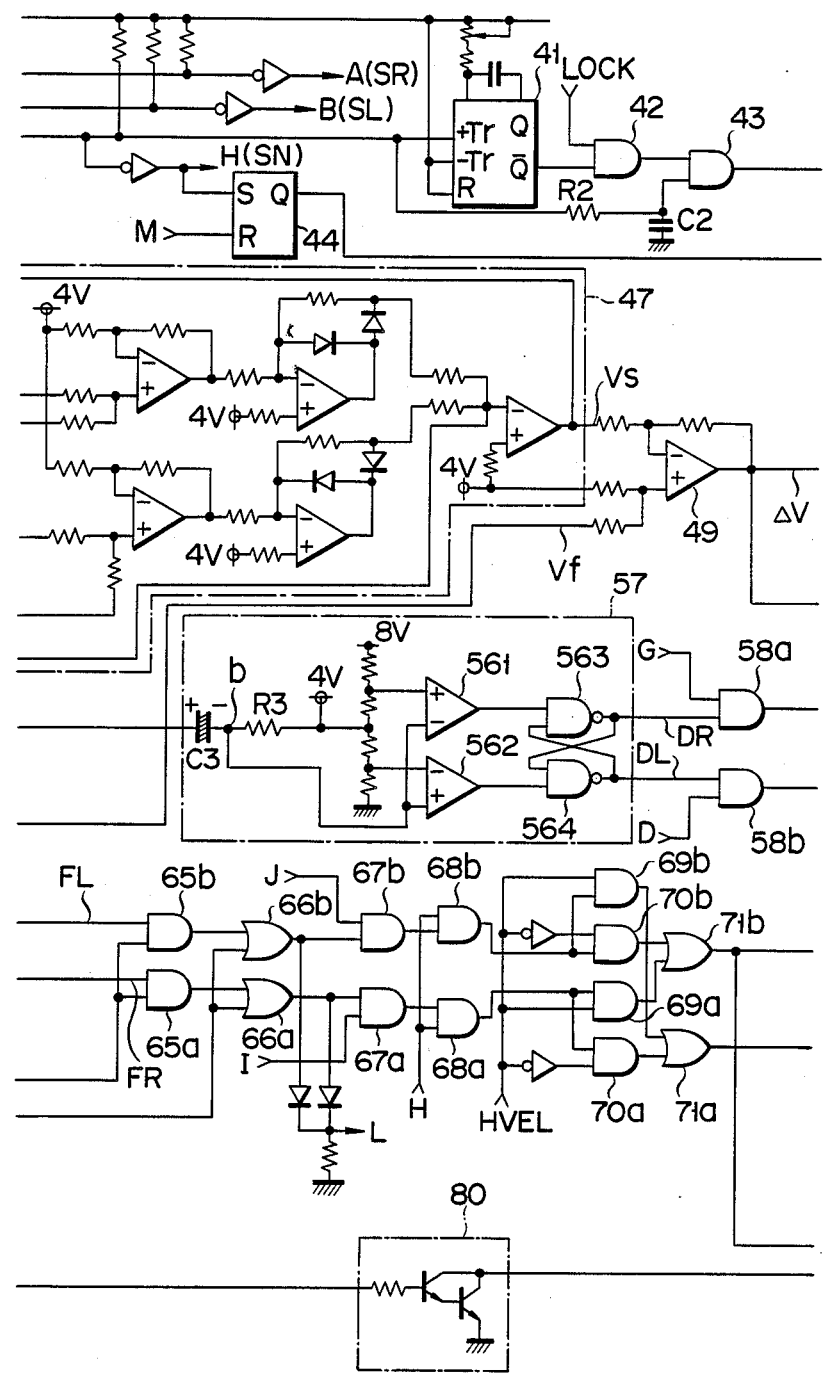
Figures 3, 3A:
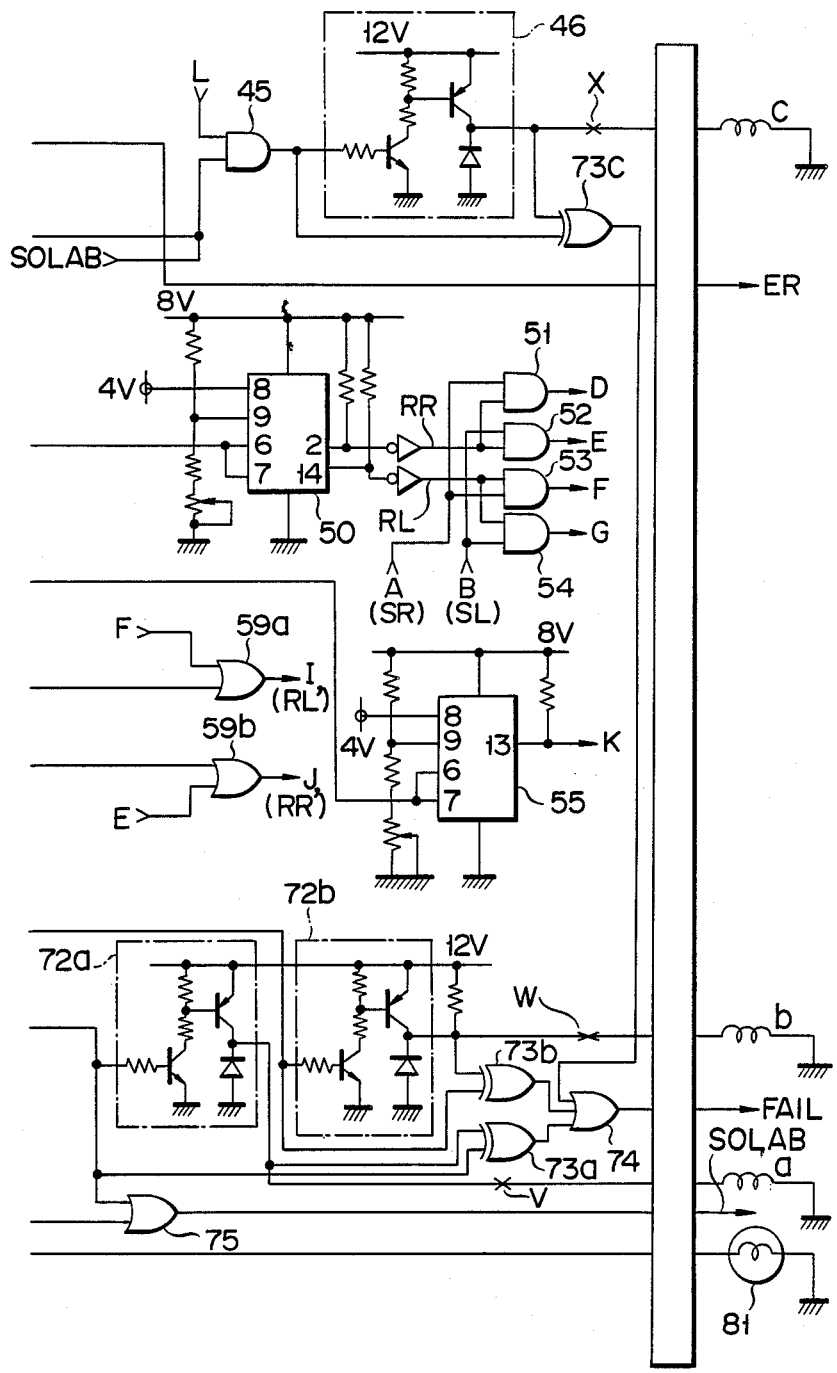

The control circuit shown in FIG. 1 will be described with reference to FIGS. 3A and 3B. Referring to FIG. 3A, reference numeral 36 (FIG. 1) denotes a steering angle sensor for detecting a steering angle. One end of the sensor 36 receives a voltage of 8 V, and the other end thereof is grounded. A contact a of the sensor 36 is located at the center so as to generate a voltage of 4 V when a steering wheel 38 is in a neutral position. The contact a of the sensor 36 is vertically moved in accordance with a change in the steering angle of the steering wheel 38. For example, when the steering wheel 38 is rotated clockwise, i.e., to the right, the contact a is moved in the direction indicated by the arrow. However, when the steering wheel 38 is rotated counterclockwise, i.e., to the left, the contact a is moved in a direction opposite to that indicated by the arrow. In other words, when the steering wheel 38 is gradually rotated clockwise, an output signal from the contact a of the sensor 36 is increased. An output from the sensor 36 is supplied to the "6" and "7" terminals of a first window comparator 40 through an integrator of a resistor R1 and a capacitor C1, and an operational amplifier 39. The comparator 40 constitutes a front wheel steering position detecting means and comprises a TCA965 available from Siemens Components, Inc., U.S.A. The input/output characteristics of the TCA965 are illustrated in FIGS. 4A & 4D. An output from the "14" terminal of a switching circuit 48 (to be described later in detail) is supplied to the "9" terminal of the comparator 40. Levels of signals A (SR), B (SL) and H (SN) produced from the "2", "14" and "3" terminals of the comparator 40 through corresponding inverters change in accordance with the steering angle of the steering wheel 38 which is given as a value with respect to ±150 degrees in the low velocity mode and ±15 degrees in the high velocity mode. The signal A represents a state where the steering wheel 38 is turned to the right. The signal B represents a state where the steering wheel 38 is turned to the left. The signal H represents a state where the steering wheel 38 is turned at an angle falling outside the range of ±150 degrees in the low velocity mode or outside the range of ±15 degrees in the high velocity mode. A signal generated from the "3" terminal of the comparator 40 is supplied to the +Tr terminal of a first monostable multivibrator 41. When an input to the multivibrator 41 goes high, a $\bar{Q}$ output therefrom is kept at low level for a predetermined period of time. The $\bar{Q}$ output from the multivibrator 41 is supplied to one input terminal of an AND gate 42. The other input terminal of the AND gate 42 receives a lock signal to be described later. The lock signal is kept high when the lock member 30 shown in FIG. 2A is not inserted in the groove 26c. An output from the AND gate 42 is supplied to one input terminal of an AND gate 43. The other input terminal of the AND gate 43 receives an output from an integrator of a resistor R2 and a capacitor C2, which also receives the input signal to the multivibrator 41. An output from the AND gate 43 is generated as an error signal ER. The signal H from the comparator 40 is supplied to the S input terminal of a flip-flop 44. The R input terminal of the flip-flop 44 receives a signal M to be described later. A Q output from the flip-flop 44 is supplied to one input terminal of an AND gate 45. When the signal H is set at H level, the Q output is kept at H level. However, when the signal M is set at H level, the Q output is kept at L level. A signal SOL AB to be described later is supplied to the same input terminal of the AND gate 45. The other input terminal of the AND gate 45 receives a signal L to be described later. An output from the AND gate 45 is supplied to a solenoid drive circuit 46. When the drive circuit 46 receives the signal of H level, the solenoid coil c is energized. In other words, the signal H is set at H level when the steering angle of the steering wheel 38 is an angle falling outside the range of ±150 degrees at low velocity and the range of ±15 degrees at high velocity. The solenoid coil c shown in FIG. 2A is energized to retract the member 30 from the groove 26c. An output from the operational amplifier 39 is supplied to a voltage converter 47 which then converts an input voltage level.

An output signal Vs from the voltage converter 47 corresponds to a target steering angle of rear wheels. In the low velocity mode, the output signal Vs is set at 4 V when the steering angle of the steering wheel 38 falls within the range of ±150 degrees, but the signal Vs is linearly changed in accordance with a change in steering angle when the steering angle falls outside the range of ±150 degrees. In the high velocity mode, the signal Vs is set at 4 V when the steering angle falls within the range of ±15 degrees, but the signal Vs is linearly changed in accordance with a change in steering angle when the steering angle falls outside the range of ±15 degrees. The "1", "2", "3", "4" and "5" terminals of a switching circuit 48 comprising a triple 2-channel multiplexer are connected to the voltage converter 47. The "9", "10" and "11" terminals of the switching circuit 48 receive a signal HVEL to be described later. The signal HVEL is set at L level in the low velocity mode and at H level in the high velocity mode. When the signal HVEL goes high, the "13" and "14" terminals, the "1" and "15" terminals and the "3" and "4" terminals of the switching circuits 48 are connected, respectively. Therefore, the comparator 40 is operated to control a window half width to a value corresponding to the steering angle range of ±15 degrees. However, when the signal HVEL supplied to the switching circuit 48 is set at L level, the "12" and "14" terminals, the "2" and "15" terminals and the "5" and "4" terminals thereof are connected, respectively. The comparator 40 is operated to control the window half width to a value corresponding to the steering angle range of ±150 degrees. The output signal Vs from the voltage converter 47 is supplied to the "−" terminal of the amplifier 49, and a signal Vf to be described later is supplied to the "+" terminal thereof.

The sensor 36, the operational amplifier 39, the voltage converter 47 and the switching circuit 48 constitute the front steering angle detecting means.

The signal Vf is proportional to the rear wheel steering angle. An output signal $\Delta V$ (Vf−Vs) from the amplifier 49 is supplied to the "6" and "7" terminals of a second window comparator 50. The comparator 50 comprises a TCA965 (available from Siemens Components, Inc., U.S.A.) in the same manner as the comparator 40, and the input/output characteristics are shown in FIGS. 4A to 4D. The comparator 50 changes signals RR and RL to be generated through corresponding inverters in accordance with the input signal thereto. The amplifier 49 and the second window comparator 50 constitute a discriminating means.

The signal RR is set at H level when the rear wheels are turned to the right in the low velocity mode and to the left in the high velocity mode. The signal RL is set at H level when the rear wheels are turned to the left in the low velocity mode and to the right in the high velocity mode. The signal RR is supplied to one input terminal of each of AND gates 51 and 52. The signal RL is supplied to one input terminal of each of AND gates 53 and 54. The other input terminal of each of the AND gates 51 and 53 receivs the signal A. The other input terminal of each of the AND gates 52 and 54 receives the signal B. Output signals from the AND gates 51 to 54 are represented by signals D to G. The AND gates 51 to 54 constitute a signal generating means.

The signal D is set at H level when the front and rear wheels are turned to the right (R) in the low velocity mode and when the front and rear wheels are turned to the right (R) and left (L) in the high velocity mode. The signal E is set at H level when the front and rear wheels are turned to the left (L) and to the right (R) in the low velocity mode and when the front and rear wheels are turned to the left (L) in the high velocity mode. The signal F is set at H level when the front and rear wheels are turned to the right (R) and left (L) in the low velocity mode and when the front and rear wheels are turned to the right (R) in the high velocity mode. The signal G is set at H level when the front and rear wheels are turned to the left (L) in the low velocity mode and when the front and rear wheels are turned to the left (L) and right (R) in the high velocity mode.

The output signal $\Delta V$ from the amplifier 49 is supplied to the "6" and "7" terminals of a third window comparator 55. The comparator 55 is set at H level when the output signal $\Delta V$ (i.e., the difference between the rear wheel steering angle and the target steering angle) represents an angle exceeding 1.5 degrees. The comparator 55 comprises a TCA965 as described before. The "13" terminal of the comparator 55 generates a signal K.

The output from the operational amplifier 39 is supplied to a steering direction detector 57 through an operational amplifier 56. The steering direction detector 57 constitutes the front wheel steering direction detecting means. The detector 57 detects a steering direction of the steering wheel 38. An output signal DR from the detector 57 is set at H level when the steering wheel 38 is rotated clockwise, i.e., the front wheels are turned to the right. However, when the steering wheel 38 is rotated counterclockwise, a signal DL is set at H level. A potential at a connecting point b between a capacitor C3 and a resistor R3 is supplied to the "−" terminal of a comparator 561 and the "+" terminal of a comparator 562. When the steering wheel 38 is rotated clockwise, i.e., the front wheels are turned to the right, an output from the operational amplifier 56 is increased, so that the capcitor C3 is charged with illustrated polarities. For this reason, the potential at the connecting point b is higher than the voltage of 4 V. An output from the comparator 561 is set at L level, an output from the comparator 562 is set at H level, an output from a NAND circuit 563 is set at H level, and an output from a NAND gate 564 is set at L level. The output signal DR is supplied to one input terminal of an AND gate 58a, and the output signal DL is supplied to one input terminal of an AND gate 58b. The other input terminal of the AND gate 58a receives the signal G, and the other input terminal of the AND gate 58b receives the signal D. An output signal from the AND gate 58a is supplied to one input terminal of an OR gate 59a. An output signal from the AND gate 58b is supplied to one input terminal of an OR gate 59b. The signal F is supplied to the other input terminal of the OR gate 59a, and the signal E is supplied to the other input terminal of the OR gate 59b. An output signal I (RL') from the OR gate 59a is a steering signal for turning the rear wheels to the left (L) in the low velocity mode and to the right (R) in the high velocity mode. An output signal J (RR') from the OR gate 59b is a steering signal for turning the rear steering wheels to the right (R) in the low velocity mode and to the left (L) in the high velocity mode.

Reference numeral 60 denotes a rear wheel steering angle sensor. One end of the sensor 60 receives a voltage of 8 V through a switch 61, and the other end thereof is grounded through the switch 61. The switch 61 is switched by a transistor 62 driven in response to a signal HVEL to be described in detail below. The signal HVEL is set at H level in the high velocity mode to set the switch 61 in the "A" position, so that the L side of the sensor 60 is grounded and the R side thereof receives the voltage of 8 V.

The signal HVEL is set at L level in the low velocity mode to set the switch 61 in the "b" position. The R side of the sensor 60 is grounded and the L side thereof receives the voltage of 8 V. Thereafter, the contact c of the sensor 60 is located at the center thereof so as to generate a voltage of 4 V when the rear wheels are in the neutral position. The contact c is vertically moved in accordance with changes in steering angle of the rear wheel. For example, when the rear wheels are turned to the left, the contact is moved in the direction indicated by the arrow. However, when the rear wheels are turned to the right, the contact c is moved in a direction opposite to that indicated by the arrow. In other words, an output voltage from the contact c is increased when the rear wheels are turned to the left in the low velocity mode. However, in the high velocity mode, the voltage is lowered. An output from the sensor 60 is supplied to the "6" and "7" terminals of a fourth window comparator 64 through an integrator of a resistor R4 and a capacitor C4, and an operational amplifier 63. The output from the operational amplifier 63 is supplied as the signal Vf to the "+" terminal of the amplifier 49. It should be noted that the sensor 60, the switch 61, the transistor 62, the operational amplifier 63, the resistor R4 and the capacitor C4 constitute a rear wheel steering angle detecting means. The comparator 64 comprises a TCA965 as previously described, and its input/output characteristics are shown in FIGS. 4A to 4D. Outputs from the comparator 64 are inverted by inverters. The inverters generate signals FL and FR. The signal FL is set at H level when the rear wheels are turned from the neutral position to the left in the low velocity mode and from the neutral position to the right in the high velocity mode. The signal FR is set at H level when the rear wheels are turned from the neutral position to the right in the low velocity mode and from the neutral position to the left in the high velocity mode. The "3" terminal of the comparator 64 generates the signal M. The signal M is set at H level when the steering angle of the rear wheels falls within the range of ±0.8 degrees, and is set at L level when the steering angle of the rear wheels falls outside this range. The signal M is supplied to the R terminal of the flip-flop 44. The signal FL is supplied to one input terminal of an AND gate 65b, and the signal FR is supplied to one input terminal of an AND gate 65a. The other input terminal of each of the AND gates 65a and 65b receives a signal MVEL to be described later. The signal MVEL is set at L level when a vehicle velocity is less than 20 km/h. The signal MVEL goes high when the vehicle velocity exceeds 20 km/h. However, when the vehicle velocity exceeds, for example, 40 km/h, the signal MVEL goes low again. An output from the AND gate 65b is supplied to one input terminal of an OR gate 66b, and an output from the AND gate 65a is supplied to one input terminal of an OR gate 66a. An output from the OR gate 66b is supplied to one input terminal of an AND gate 67b, and an output from the OR gate 66a is supplied to one input terminal of an AND gate 67a. The other input terminal of the AND gate 67b receives the signal J. The other input terminal of the AND gate 67a receives the signal I. An output from the AND gate 67b is supplied to one input terminal of an AND gate 68b. An output from the AND gate 67a is supplied to one input terminal of an AND gate 68a. The other input terminal of each of the AND gates 68a and 68b receives a signal H. An output from the AND gate 68a is supplied to one input terminal of each of AND gates 69a and 70a. An output signal from the AND gate 68b is supplied to one input terminal of each of AND gates 69b and 70b. The other input terminal of each of the AND gates 69a and 69b receives the signal HVEL. The other input terminal of each of the AND gates 70a and 70b receives an inverted signal of the signal HVEL through inverters. An output from the AND gate 70a is supplied to one input terminal of an OR gate 71a, and an output from the AND gate 69b is supplied to the other input terminal of the OR gate 71a. An output from the AND gate 69a is supplied to one input terminal of an OR gate 71b, and an output from the AND gate 70b is supplied to the other input terminal of the OR gate 71b. An output from the OR gate 71a is supplied to a solenoid drive circuit 72a, and an output from the Or gate 71b is supplied to a solenoid drive circuit 72b. An output from the drive circuit 72a is supplied to the solenoid coil a shown in FIG. 2A, and an output from the drive circuit 72b is supplied to the solenoid coil b shown in FIG. 2A. The input and output with respect to the drive circuit 72a are supplied to an exclusive OR gate 73a, and the input and output with respect to the drive circuit 72b are supplied to an exclusive OR gate 73b. Outputs from the exclusive OR gates 73a, 73b and 73c are supplied to an OR gate 74. The OR gate 74 generates a disconnection signal FAIL. It should be noted that the exclusive OR gate 73c is connected to the OR gate 74 to supply the input and output with respect to the solenoid drive circuit 46.

The AND gates 58a and 58b, the OR gates 59a and 59b, the AND gates 67a and 67b, the AND gates 68a and 68b, the AND gates 69a and 69b, the AND gates 70a and 70b, the OR gates 71a and 71b, and the solenoid drive circuits 72a and 72b constitute a steering control means.

When any one of the solenoid coils a, b and c is disconnected, the disconnection signal FAIL goes high. The outputs from the OR gates 71a and 71b are generated as the signal SOL AB through an OR gate 75.

The HVEL signal is inverted by an inverter, and the inverted signal is supplied to one input terminal of an AND gate 76. A signal A/TPS to be described later is supplied to the other input terminal of the AND gate 76. An output from the AND gate 76, a signal A/TD, the signal MVEL and the signal K are supplied to an OR gate 77. An output from the OR gate 77 is supplied to the other input terminal of each of the OR gates 66a and 66b through an inverter 78.

A switch S1 comprises a lock pin switch which is closed when the lock member 30 of FIG. 2A is inserted in the groove 26c. An output signal from the switch S1 is supplied to the OR gate 77 and a lamp drive circuit 80 through an inverter 79. It should be noted that the fourth window comparator 64, the AND gates 65a and 65b, the OR gates 66a and 66b, the inverter 79, the AND gate 76, the OR gate 77 and the inverter 78 constitute a permitting means.

The drive circuit 80 is connected to a lamp 81 which is turned on when the lock member 30 is inserted in the groove 26c. An output from the inverter 79 is supplied as the signal LOCK to the other input terminal of the AND gate 42 through an inverter 82.

An output from a battery B (12 V) is generated as a system power source through a relay switch S2. A current flowing through a relay coil LY1 is controlled to control the switch S2. Control of the coil LY1 will be described later.

Figures 1, 3B:
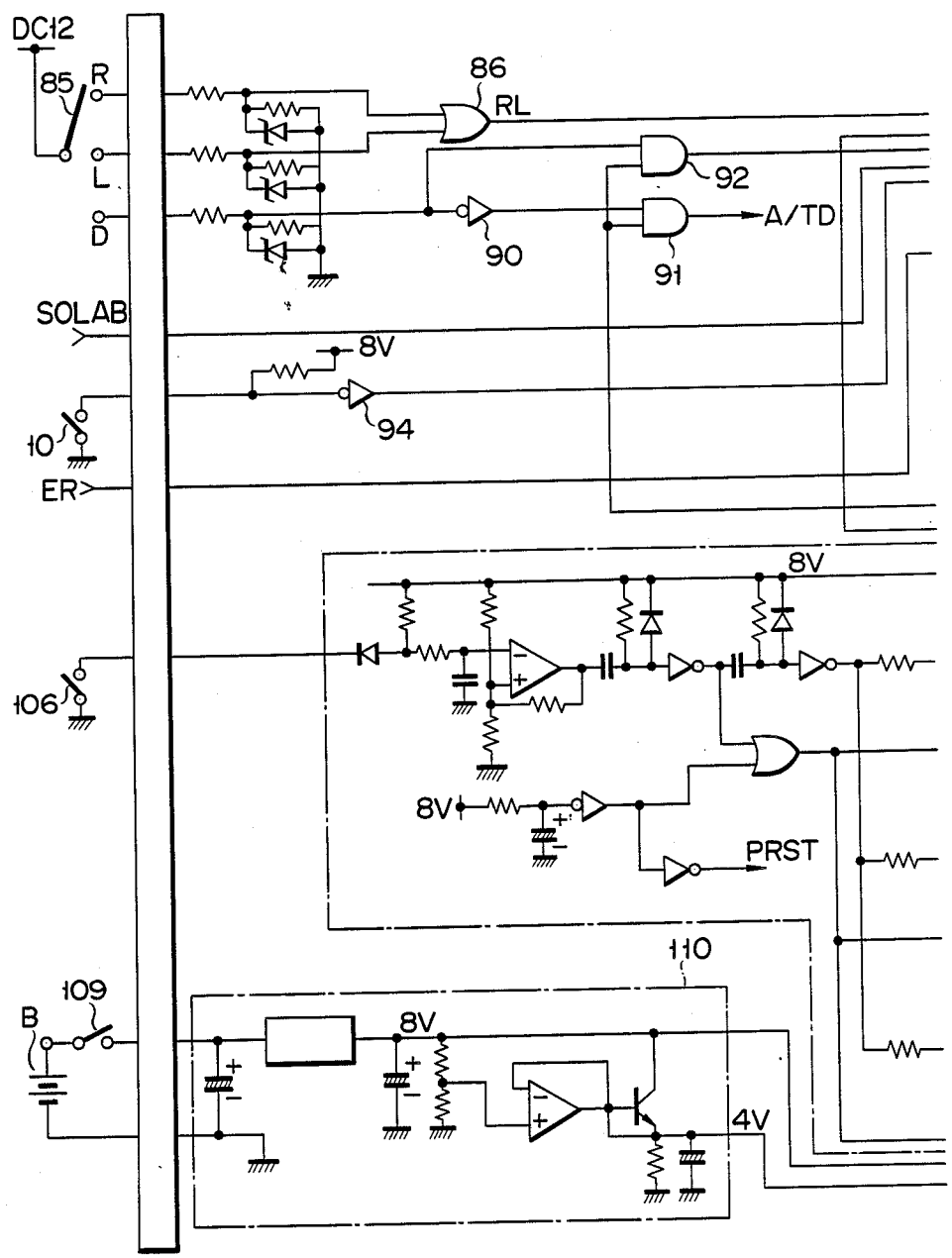
Figures 2, 3B:
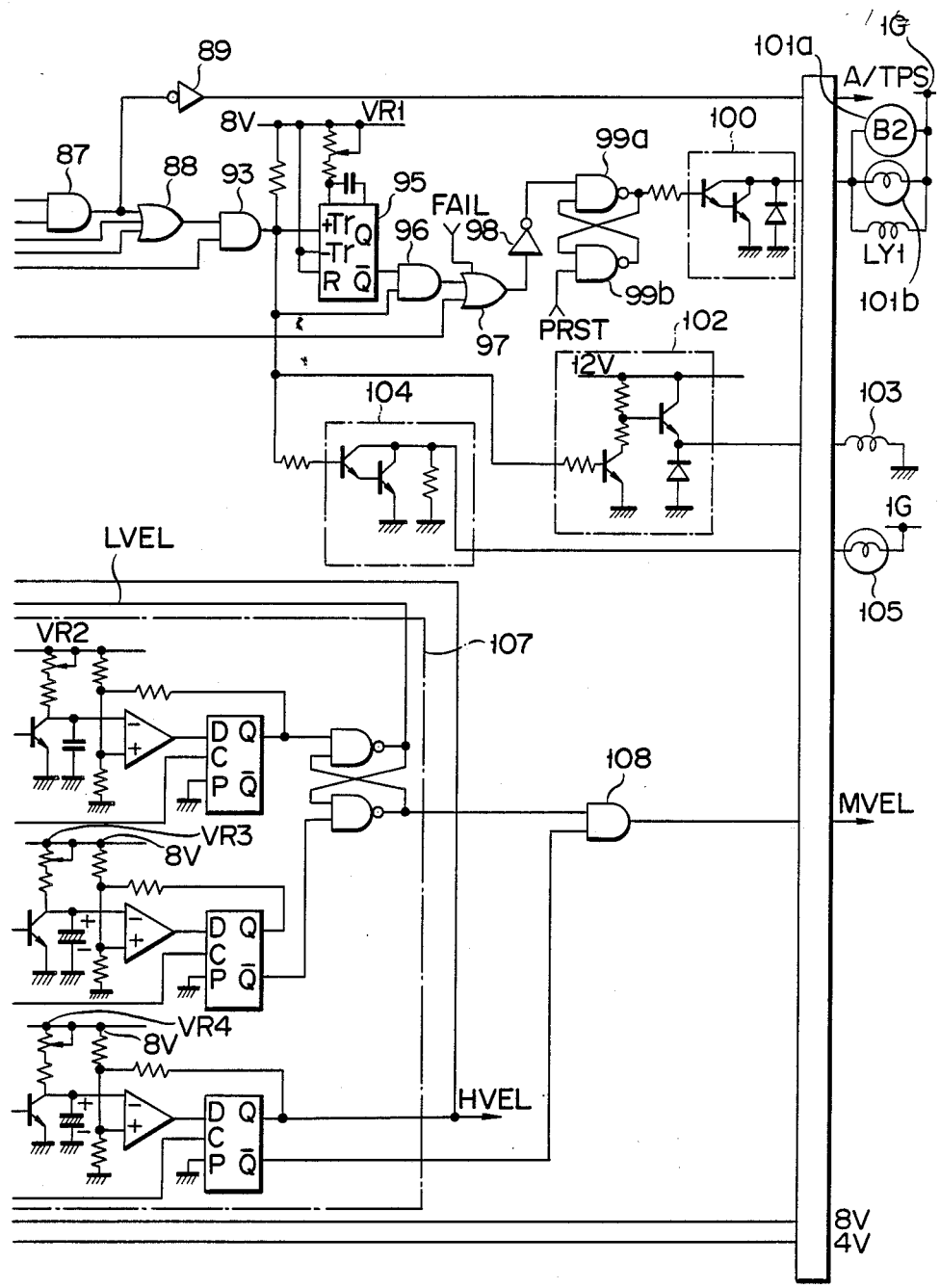

Referring to FIG. 3B, reference numeral 85 denotes an A/T position switch which is set at positions of the "R", "L" and "D" terminals when a selector lever (not shown) of an automatic transmission system is located in the "R", "L" and "D" positions, respectively. The "R" and "L" terminals of the switch 85 are connected to an OR gate 86. In other words, the OR gate 86 generates a signal of H level when the selector lever is located in the "R" or "L" position. An output from an OR gate 86 is supplied to one input terminal of an AND gate 87. An output from the AND gate 87 is supplied to an OR gate 88. The OR gate 88 also receives the signal SOL AB.

The signal SOL AB is set at H level when the solenoid coil a or b is energized. An output from the AND gate 87 is supplied to an inverter 89 which then generates the signal A/TPS. The signal A/TPS is set at L level when the rear wheels can be steered. The "D" terminal is connected to one input terminal of an AND gate 91 through an inverter 90. When the selector lever is located at the "D" position, the AND gate 91 receives a signal of L level. An output from the AND gate 91 is generated as the signal A/TD. An input to the inverter 90 is also supplied to one input terminal of an AND gate 92. An output from the AND gate 92 is supplied to the OR gate 88. An output from the OR gate 88 is supplied to one input terminal of an AND gate 93. Reference numeral 10 denotes a pressure switch described with reference to FIG. 2A. The switch 10 is closed when the path 4a is maintained at a low pressure. An operation signal from the switch 10 is inverted by an inverter 94, and the inverted signal is supplied to the other input terminal of the AND gate 93. Since the switch 10 is closed when the path 4a is maintained at a low pressure, the output from the inverter 94 is set at H level. An output from the AND gate 93 is supplied to a +Tr terminal of a monostable multivibrator 95. When the multivibrator 95 receives a signal of H level, a Q output therefrom goes to H level for a predetermined period of time. Therefore, a $\overline{Q}$ output from the multivibrator 95 goes low within the predetermined period of time after input of the signal of H level. The $\overline{Q}$ output is supplied to one input terminal of an AND gate 96, and the other input terminal thereof receives an output from the AND gate 93. An output from the AND gate 96 is supplied to an OR gate 97. The OR gate 97 receives the signal FAIL as the output from the OR gate 74 of FIG. 3A and the signal ER as the output from the AND gate 43. An output from the OR gate 97 is supplied to one input terminal of a NAND gate 99a through an inverter 98. An output from the NAND gate 99a is supplied to one input terminal of a NAND gate 99b, and an output from the NAND gate 99b is supplied to the other input terminal of the NAND gate 99a. The other input terminal of the NAND gate 99b receives a signal PRST (to be described in detail later) which is set at L level at the initial state. In the initial state, an output from the NAND gate 99a is set at L level, and an output from the NAND gate 99b is set at H level. An output from the NAND gate 99a is supplied to a buzzer 101a, an error indicator lamp 101b and the system power-off relay LY1 (FIG. 3A) through a drive circuit 100.

The output from the AND gate 93 is supplied to a hydraulic pump relay 103 for driving the pump 2 (FIG. 2A) through the drive circuit 102. The output from the AND gate 93 i$ also supplied to a hydraulic pump lamp 105 through a drive circuit 104. The lamp 105 is turned on when the pump 2 is started.

Reference numeral 106 denotes a velocity sensor. An output from the sensor 106 is supplied to a velocity detector 107. The detector 107 generates the signal LVEL of H level and supplies a signal of L level to one input terminal of an AND gate 108 when a velocity falls within the range between 0 km/h and 20 km/h. The detector 107 also generates the signal HVEL of L level to cause the flip-flop for generating. The signal HVEL to generate a signal of H level at the $\overline{Q}$ terminal thereof. When the velocity falls within the range between 20 km/h and 40 km/h, the detector 107 generates the signal LVEL of L level and supplies a signal of H level to one input terminal of the AND gate 108, so that the outputs from the Q and $\overline{Q}$ terminals of the flip-flop will not change. However, when the velocity exceeds 40 km/h, the signal LVEL is set at L level, and a signal of H level is supplied to the one input terminal of the AND gate 108. At the same time, the signal HVEL is set at H level, and the $\overline{Q}$ terminal of the flip-flop is set at L level. When the velocity is decreased and falls within the range between 20 km/h and 10 km/h, the signal LVEL is set at L level, and a signal of H level is supplied to the one input terminal of the AND gate 108. The other input terminal of the AND gate 108 is connected to the $\overline{Q}$ terminal. Therefore, when the velocity is increased and falls within the range between 0 km/h and 20 km/h, the signal LVEL is set at H level and the signals MVEL and HVEL are set at L level; when the velocity is increased and falls within the range between 20 km/h and 40 km/h, the signal LVEL is set at L level, the signal MVEL is set at H level, and the signal HVEL is set at L level; and when the velocity exceeds 40 km/h, the signals LVEL and MVEL are set at L level and the signal HVEL is set at H level. When the velocity is decreased and falls within the range between 40 km/h and 10 km/h, the signal HVEL is set at L level, the signal MVEL is set at H level, and the signal LVEL is set at L level; and when the velocity is decreased below 10 km/h, the signals HVEL and MVEL are set at L level and the signal LVEL is set at H level. The detector 107 is operated in the manner described above. The detector 107 also generates the signal PRST which is set at L level when an ignition switch 109 (to be described later) is turned on.

When the ignition switch 109 is turned on, the battery B supplies power to a power source circuit 110.

A potential at the connecting point between a resistor R4 and a capacitor C4 in FIG. 3A is supplied to the "+" terminal of a comparator 111 and the "−" terminal of a comparator 112 in FIG. 3C. The comparator 111 detects a disconnection of the sensor 60 by checking whether or not a voltage from the sensor 60 exceeds a reference voltage. The comparator 112 detects a disconnection of the sensor 60 by checking whether or not a voltage from the sensor 60 is below the reference voltage. Outputs from the comparators 111 and 112 are supplied as the signal FAIL to the OR gate 98 (FIG. 3B) through an OR gate 113.

It should be noted that the selector lever the OR gate 86, the inverter 90, the AND gates 91 and 92, the sensor 106, the detector 107 and the AND gate 108 constitute a driving condition detecting means. It should also be noted that the sensor 106, the detector 107 and the AND gate 108 constitute a velocity detecting means.

Description of Operation

The operation of the rear wheel steering apparatus having the arrangement described above will be described hereinafter. A case will be exemplified wherein the steering state of the rear wheels will be where the steering wheel 38 is turned to the right to steer the front wheels in the same direction. The steering direction of the front wheels is opposite to that of the rear wheels in the low velocity mode. In other words, when the front wheels are steered to the right, the rear wheels are steered to the left. However, the steering direction of the front wheels is the same as that of the rear wheels in the high velocity mode. In other words, when the front wheels are steered to the right, the rear wheels are steered in the same direction. In the following description, the steering state of the rear wheels in the low velocity mode (where the velocity is less than 20 km/h) is described, and the steering state of the rear wheels in the high velocity mode (where the velocity is higher than 40 km/h) is described in parentheses.

When the steering wheel 38 is rotated to the right, the contact a of the sensor 36 is moved in the direction indicated by the arrow. A voltage applied to the comparator 40 is increased. When the steering wheel 38 is rotated about 150 degrees (15 degrees) or more to the right, the signal H is set at H level. The signal of H level is supplied from the Q output terminal of the flip-flop 44 to the AND gate 45. When the rear wheels can be steered, the signal L is set at H level. The output from the AND gate 45 is set at H level. Therefore, the drive circuit 46 is driven to energize the solenoid coil c. The member 30 of FIG. 2A is retracted from the groove 26, and the piston rod 26 can be slid in the right-and-left direction. The output from the sensor 36 is converted by the voltage converter 47 which is then supplied as the signal Vs to the "−" input terminal of the amplifier 49. The signal Vf which is proportional to the steering angle of the rear wheels is supplied from the sensor 60 to the "+" terminal of the amplifier 49. In this state, the rear wheels are not yet steered. When the steering wheel 38 is gradually rotated to the right, the signal Vs is gradually increased. When the signal Vs is higher than the signal Vf and the signal $\Delta V$ ($=Vf-Vs$) is larger than a predetermined value, the signal RL generated from the comparator 50 through the inverter is set at H level. When the steering wheel 38 is rotated to the right, the signal A generated from the comparator 40 through the inverter is set at H level. Therefore, the signal F from the AND gate 53 is set at H level.

The output signal from the sensor 36 is also supplied to the detector 57. The output signal DR from the detector 57 is set at H level, and the output signal DL is set at L level.

Figure 5:
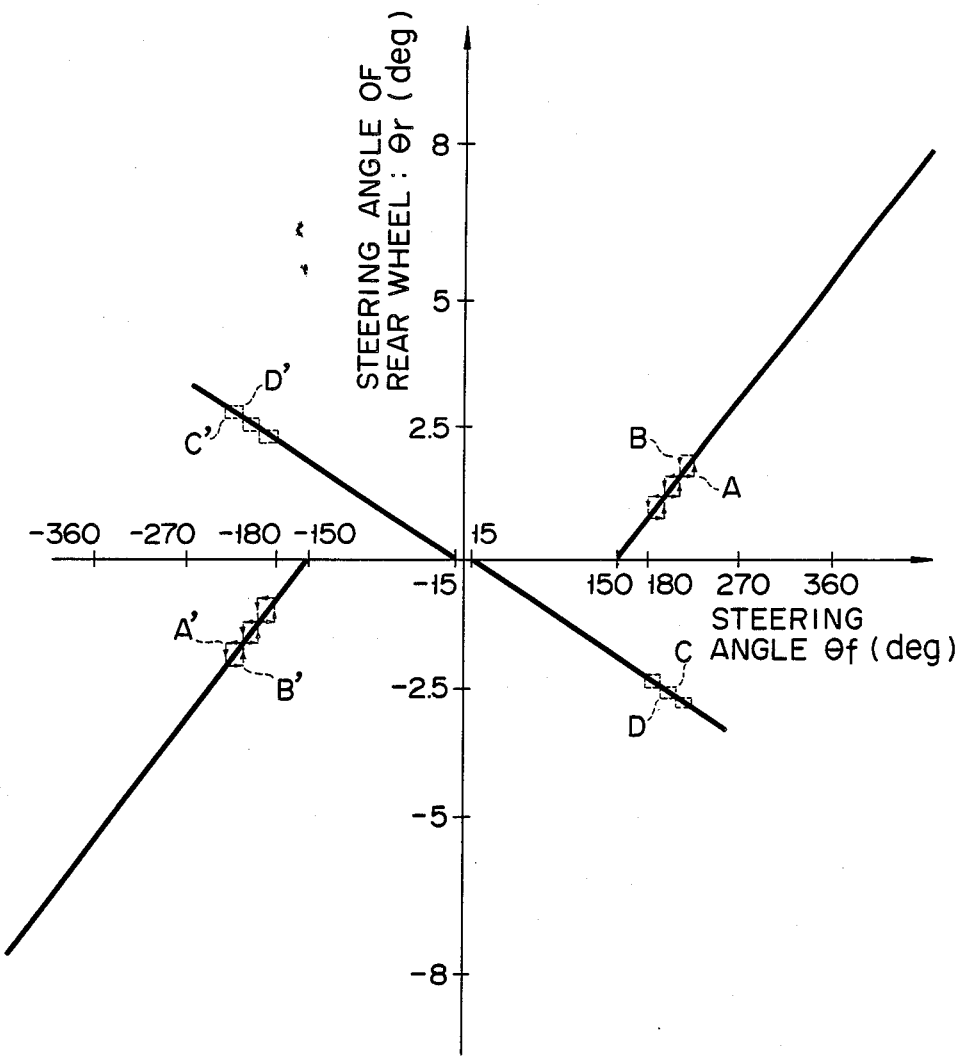
FIG. 5 is a graph showing a steering angle $\theta r$ of rear wheels as a function of a steering angle $\theta r$ of front wheels in the apparatus of FIG. 1.

The signal F is generated as the signal I through the OR gate 59a. The signal I is supplied to the other input terminal of the AND gate 67a. When a signal of H level is supplied to the one input terminal of the AND gate 67a, an AND-ed output (H level) is generated from the AND gate 67a. The signal H from the comparator 40 through the inverter is set at H level, so that the output from the AND gate 68a, is set at H level. The output from the AND gate 68a is supplied to the one input terminal of each of the AND gates 69a and 70a. The other input terminal of the AND gate 69a receives the signal HVEL, and the other input terminal of the AND gate 70a receives the signal HVEL through the inverter. The signal HVEL is set at L level (H level in the high velocity mode) in the low velocity mode, so that the output from the AND gate 70a (the AND gate 69a) is set at H level, and the output from the OR gate 71a (the OR gate 71b) is set at H level. Therefore, the solenoid coil a (the solenoid coil b) is energized by the drive circuit 72a (the drive circuit 72b). When the coil a (the coil b) is energized, the rear wheels are steered to the left (right). In this state, the contact c of the sensor 60 is moved in the direction indicated by the arrow (the direction opposite to the arrow). A voltage from the sensor 60 is increased. The signal Vf supplied to the "+" terminal of the amplifier 49 is increased and becomes equal to the signal Vs. In this condition, the rear wheels are no longer steered. As shown in FIG. 5, when the steering wheel 38 is rotated through 180 degrees to the right, the rear wheels are steered at an angle of 0.8 degrees (2.2 degrees) to the left (right). When the output from the OR gate 71a (the OR gate 71b) is set at H level, the signal SOL AB is set at H level.

When the signal H obtained from the comparator 40 through the inverter is set at H level and the solenoid coil c is energized to retract the member 30 from the groove 26c, the switch S1 is opened. The signal LOCK from the inverter 82 is set at H level. The drive circuit 80 is driven to turn off the lamp 81 which indicates that the member 30 is inserted in the groove 26c. However, if the member 30 has not been inserted in the groove 26c after a predetermined period of time has elapsed after the coil c is deenergized, the switch S1 is kept off, and the signal LOCK is kept at H level. The outputs from the AND gates 42 and 43 are set at H level, and the signal ER is set at H level. In this state, the output from the OR gate 97 (FIG. 3B) is set at H level, and the output from the NAND gate 99a is set at H level. Therefore, the buzzer 101a is operated, the lamp 101b is turned on, and the relay LY1 is energized by a drive circuit 100. When the relay LY1 is energized, the switch S2 of FIG. 3A is turned off. The battery B will not supply power to the system, and rear wheel steering is stopped.

When the signal ΔV (i.e., the difference between the rear wheel target steering angle and its actual angle) supplied from the amplifier 49 is not less than 1.5 degrees, the signal K from the comparator 55 is set at H level. In other words, since the steering wheel is rapidly rotated, rear wheel steering cannot follow. In this case, the signal K is supplied as the signal of L level to the other input terminal of the AND gate 67a through the OR gate 77, the inverter 78 and the OR gate 66a. For this reason, even if the signal I is set at H level, the output from the AND gate 67a is kept at L level. As a result, rear wheel steering is not performed.

When the steering wheel 38 is further rotated to the right, an output voltage from the sensor 36 is accordingly increased. The signal Vs supplied to the "−" terminal of the amplifier 49 is increased. When the signal ΔV=Vf−Vs exceeds the predetermined value, the signal RL obtained from the comparator 50 through the inverter is set at H level, and the signal F is set at H level. In the same manner as described above, the coil a (the coil b) is energized to steer the rear wheels to the left (right). When the output from the sensor 60 is increased, the signal Vf supplied to the "+" terminal of the amplifier 49 is increased. When the signal Vf becomes equal to the signal Vs, rear wheel steering is stopped. In this manner, when the difference between the steering angle of the front wheels and that of the rear wheels exceeds the predetermined value upon rotation of the steering wheel 38, rear wheel steering is performed until the absolute value of the steering angle of the rear wheels reaches that of the front wheels. Then, rear wheel steering is stopped. Thereafter, when the front wheels are steered and the difference between the steering angles of the front and rear wheels exceeds the predetermined value, the rear wheels are steered. The steering angle of the rear wheels is controlled in a stepped manner as indicated by dotted line A (dotted line C) of FIG. 5.

A case will be described wherein the steering wheel 38 is rotated to the right and then to the left. In this case, when the steering wheel 38 is rotated to the left, the signal Vs supplied to the "−" terminal of the amplifier 49 is gradually decreased. When the signal ΔV=VF−Vs exceeds a predetermined value, the signal RR obtained from the comparator 50 through the inverter is set at H level. However, since the steering wheel 38 is still kept in the position where the steering wheel 38 is rotated to the right, the signal A is kept at H level. For this reason, the signal D from the AND gate 51 is set at H level, and the signal J is set at H level through the AND gate 58b and the OR gate 59b. The outputs from the AND gates 67b and 68b are set at H level, and the output from the AND gate 68b is supplied to one input terminal of each of the AND gates 69b and 70b. The other input terminal of the AND gate 69b receives the signal HVEL, and the other input terminal of the AND gate 70b receives the signal HVEL through the inverter. Since the signal HVEL is set at L level (H level in the high velocity mode) in the low velocity mode, the output from the AND gate 70b (the AND gate 69b) is set at H level, and the output from the OR gate 71b (the OR gate 71a) is set at H level. Therefore, the signal of H level is supplied to the drive circuit 72b (the drive circuit 72a) to energize the coil b (the coil a), thereby steering the rear wheels to the right (left). Subsequently, the contact c of the sensor 60 is moved in the direction (the direction indicated by the arrow) opposite to that indicated by the arrow, and the voltage from the sensor 60 is decreased. When the signal Vf supplied to the "+" terminal of the amplifier 49 is decreased and becomes equal to the signal Vs, rear wheel steering is stopped. When the steering wheel 38 is rotated to the right and then to the left, the steering angle of the rear wheels can be controlled in the stepped manner as indicated by dotted line B (dotted line D) of FIG. 5. When the steering wheel 38 is rotated to the right from the neutral position and then returns to the neutral position, hysteresis characteristics are provided for the steering tracks of the rear wheels.

A case will be exemplified wherein the steering condition of the rear wheels is described when the steering wheel 38 is rotated from the neutral position to the left. When the steering wheel 38 is rotated to the left, the contact a of the sensor 36 is moved in the direction opposite to that indicated by the arrow. The voltage applied to the comparator 40 is decreased. When the steering wheel 38 is rotated through 150 degrees (15 degrees) to the left, the signal H is set at H level. The signal of H level is supplied from the Q terminal of the flip-flop 44 to the AND gate 45. When the rear wheels can be steered, the signal L is set at H level. The output from the AND gate 45 is set at H level. Therefore, the drive circuit 46 is driven to energize the coil c. As a result, the member 30 (FIG. 2A) is retracted from the groove 26c, and the piston rod 26 is free to move the right-and-left direction. The output from the sensor 36 is converted by the voltage converter 47 and is supplied as the target steering angle signal Vs to the "−" input terminal of the amplifier 49. The "+" terminal of the amplifier 49 receives the signal Vf which is proportional to the steering angle of the rear wheel and which is generated from the sensor 60. In this state, the rear wheels are not yet steered. When the steering wheel 38 is rotated to the left, the signal Vs is decreased. When the signal Vf is larger than the signal Vs and the signal ΔV=Vf−Vs is larger than the predetermined level, the signal RR obtained from the comparator 50 through the inverter is set at H level. When the steering wheel 38 is rotated to the left, the signal B obtained from the comparator 40 through the inverter is set at H level. Therefore, the signal E from the AND gate 52 is set at H level.

The output from the sensor 36 is supplied to the detector 57, and the output signal therefrom is set at L level, and the signal DL is set at H level.

The OR gate 59b receives the signal E, and produces it as the signal J. The signal J is supplied to the other input terminal of the AND gate 67b. When the one input terminal of the AND gate 67b receives a signal of H level, the output from the AND gate 67b is set at H level. The signal H obtained from the comparator 40 through the inverter is set at H level, and then the output from the AND gate 68b is set at H level. The output from the AND gate 68b is supplied to one input terminal of each of the AND gates 69b and 70b. The other input terminal of the AND gate 69b receives the signal HVEL, and the other input terminal of the AND gate 70b receives the signal HVEL through the inverter. The signal HVEL is set at L level (H level in the high velocity mode) in the low velocity mode. The output from the AND gate 70b (the AND gate 69b) is set at H level, and the output from the OR gate 71b (the OR gate 71a) is set at H level. Therefore, the coil b (the coil a) is energized by the drive circuit 72b (the drive circuit 72a). Subsequently, the rear wheels are steered to the right (left), and the contact c of the sensor 60 is moved in the direction (the direction indicated by the arrow) opposite to that indicated by the arrow. As a result, the voltage generated from the sensor 60 is decreased. When the signal Vf supplied to the "+" terminal of the amplifier 49 is decreased and becomes equal to the signal Vs, rear wheel steering is stopped. As shown in FIG. 5, when the steering wheel 38 is rotated through 180 degrees to the left, the rear wheels are steered at an angle of 0.8 degrees (2.2 degrees) to the right (left).

When the steering wheel 38 is further rotated to the left, the voltage generated from the sensor 36 is further decreased. The signal Vs supplied to the "−" terminal of the amplifier 49 is decreased. When the signal ΔV=Vf−Vs exceeds the predetermined level again, the signal RR obtained from the comparator 50 through the inverter is set at H level, and the signal E set at H level. In the same manner as described above, the coil b (the coil a) is energized, and the rear wheels are steered to the right (left). When the output from the sensor 60 is decreased and the signal Vf supplied to the "+" terminal of the amplifier 49 is decreased and equal to the signal Vs, rear wheel steering is stopped. In this manner, when the steering wheel 38 is rotated to the left and the difference between the steering angles of the front and rear wheels exceeds the predetermined value, the rear wheels are steered. The rear wheels are steered until the absolute value of the steering angle thereof becomes equal to that of the front wheels, and then rear wheel steering is stopped. When the front wheels are further steered and the difference again exceeds the predetermined value, rear wheel steering is performed again. The steering angle of the rear wheels is controlled in the stepped manner as indicated by dotted line A' (dotted line C') of FIG. 5.

A case will be described wherein the steering wheel 38 rotated to the left is gradually rotated to the right. In this case, when the steering wheel 38 is rotated to the right, the signal Vs supplied to the "−" terminal of the amplifier 49 is increased. When the signal ΔV=Vf−Vs exceeds the predetermined value, the signal RL derived from the comparator 50 through the inverter is set at H level. Since the steering wheel 38 is continuously rotated to the left, the signal B is set at H level. The output signal G from the AND gate 54 is set at H level, and the signal I is set at H level through the AND gate 58a and the OR gate 59a. The signal of H level is supplied to the drive circuit 72a (the drive circuit 72b) through the AND gates 67a, 68a, 70a (69a), 71a (71b) to energize the corresponding coil, thereby steering the rear wheels to the left (right). When the rear wheels are steered to the left (right), the contact c of the sensor 60 is moved in the direction indicated by the arrow (the direction opposite to that indicated by the arrow). The voltage generated from the sensor 60 is increased. When the signal Vf supplied to the "+" terminal of the amplifier 49 is increased and becomes equal to the signal Vs, rear wheel steering is stopped. When the steering wheel 38 is rotated to the left and then to the right, the steering angle of the rear wheels can be controlled in the stepped manner as indicated by dotted line B' (dotted line D') of FIG. 5. When the steering wheel 38 rotated from the neutral position to the left returns to the neutral position, hysteresis characteristics are provided for the steering tracks of the rear wheels. When the steering wheel 38 returns to the neutral position and the steering angle falls within the range of ±150 degrees (±15 degrees), the signal H is set at L level. The output signal from the Q terminal of the flip-flop 44 is set at H level. The signal L is set at H level while the coil a or b is being energized. For this reason, the coil c will not be deenergized. When the rear wheel steering angle falls within the range of ±0.8 degrees, the signal M from the "3" terminal of the comparator 64 is set at H level. The signal M of H level is supplied to the R terminal of the flip-flop 44. The output from the Q terminal of the flip-flop 44 is set at L level. In this case, the coil a or b is deenergized, and the output from the AND gate 45 is set at L level. Finally, the coil c is deenergized.

Even if the steering angle of the steering wheel 38 falls within the range of ±150 degrees (±15 degrees), the coil c will not be deenergized, and the lock member 30 is kept retracted from the groove 26c. The coil c is deenergized only when the coil a or b is deenergized. The rear wheels then return to the neutral position. The lock member 30 is retracted from the lock member 30 while the coil a or b is energized and the piston rod 26 returns to the neutral position. When the steering angle of the front wheels falls within the range of ±150 degrees (±15 degrees , the coil c will not be deenergized immediately. The piston rod 26 therefore does not return to the neutral position while the lock member 30 abuts against the large-diameter portion 26. In addition, the coil c is deenergized immediately before the rear wheels return to the neutral position, and then the member 30 is inserted in the groove 26c, thereby preventing hunting of the rear wheels near the neutral position.

When the selector lever is set at the "R" or "L" position in FIG. 3B, the output from the OR gate 86 is set at H level. When the velocity falls within the range between 0 to 20 km/h, the signal LVEL is set at H level, and the output from the AND gate 87 is set at H level. The signal A/TPS of L level is supplied through the inverter 81. This L level signal is supplied to the AND gate 76 of FIG. 3A, so that a signal of L level is supplied to the OR gate 77. The inputs to the OR gate 77 are given as follows when the velocity is less than 20 km/h: the signal MVEL is set at L level, the signal K is set at L level since the difference between the current steering angle of the rear wheels and the target steering angle is 1.5 degrees, and the signal A/TD is set at L level in a manner to be described below. The OR gate 77 thus generates a signal of L level. This signal is supplied to the AND gates 67a and 67b through the inverter 78 and the OR gates 66a and 66b. The rear wheels are steered in response to the signal I (RL') or J (RR').

When the velocity exceeds 20 km/h, the signal LVEL is set at L level, and the OR gate 87 is set at L level. The signal A/TPS is thus set at H level. In this state, the AND gate 76 and then the OR gate 77 are sequentially enabled. The OR gates 66a and 66b are disabled. The signal MVEL is set at H level and is supplied to the other input terminal of each of the AND gates 65a and 65b. The one input terminal of each of the AND gates 65a and 65b receives the corresponding one of the signals FR and FL generated from the comparator 64 in accordance with right or left steering of the rear wheels. One of the AND gates 65a and 65b generates a signal of H level in accordance with the signals FR and FL and the signal of H level. When the right rotation signal RL' for the signal FL is supplied to the AND gate 67b which also receives the signal J, or the left rotation signal RR' for the signal RL' is supplied to the AND gate 67a which also receives the signal I, the coil b or d is energized. From the state wherein the rear wheels are steered in a direction opposite to that of the front wheels when the velocity is less than 20 km/h to the state wherein the velocity is increased over 20 km/h, the rear wheels can return to the neutral position. However, steering of the rear wheels in the same direction as that of the front wheels is prevented.

The rear wheels return to the neutral position at a velocity of not less than 20 km/h, and rear wheel steering is not performed.

When the velocity exceeds 40 km/h, the signal MVEL is set at L level. The signals of L level are supplied to the AND gates 65a and 65b. Since the selector lever is located at a position excluding the "D" position and the velocity exceeds 40 km/h, the AND gate 91 generates a signal of H level as the signal A/TD to cause the inverter 78 to generate a signal of L level through the OR gate 77. In this case, the rear wheels are not steered.

Even if the velocity is decreased and falls within the range between 20 km/h and 10 km/h, the signal MVEL is set at H level, and the signal LVEL is set at L level. The signal of L level is generated from the inverter 78. Since the rear wheels are not steered and are located in the neutral position, the signals FL and FR derived from the comparator 64 are set at L level. For this reason, the AND gates 65a and 65b generate signals of L level, and the OR gates 66a and 66b generate signals of L level. The AND gates 67a and 67b generate signals of L level even if the signals I and J of H level are supplied thereto, respectively. As a result, the rear wheels are not steered.

Referring to FIG. 3B, when the selector lever is located in the "D" position, the AND gate 91 generates the signal A/TD of L level. The OR gate 86 generates the output of L level, so that the signal A/TPS is set at H level.

When the velocity is less than 20 km/h, the signal HVEL is set at L level, and then the AND gate 76 generates the output of H level. The signal of L level is supplied to the other input terminal of each of the OR gates 66a and 66b. Since the signal MVEL is set at L level, the AND gates 65a and 65b are disabled. The signals of L level are generated from the OR gates 66a and 66b. Even if the signals I (RL') and J (RR') are supplied to the AND gates 67a and 67b, they are kept disabled. In this case, rear wheel steering is not started. When the velocity falls within the range between 20 km/h and 40 km/h, the signal HVEL is kept low, and the signals of L level are supplied to one input terminal of each of the OR gates 66a and 66b. Although the signal MVEL is set at H level, rear wheel steering is not yet started. The signals FL and FR derived from the comparator 64 are kept low. The other input terminal of each of the OR gates 66a and 66b receives the corresponding one of the L level outputs from the AND gates 65a and 65b. In this case, rear wheel steering is not performed.

When the velocity exceeds 40 km/h, the signal HVEL goes high to disable the AND gate 76. The signals MVEL, A/TD and K are kept at L level. The OR gate 77 supplies a signal of L level to the inverter 78 and a signal of H level to the OR gates 66a and 66b. Therefore, the rear wheels are steered in the same direction as the front wheels in response to the signals I and J of H level.

Referring to FIG. 3B, when the OR gate 88 generates a signal of H level, and the switch 10 is turned on in response to a decrease in pressure in the passage 4a to cause the inverter 94 to generate a signal of H level, the AND gate 93 generates a signal of H level. The OR gate 88 generates a signal of H level when the selector lever is set at the "R" or "L" position and the velocity is less than 20 km/h, when the selector lever is located in the "D" position and the velocity is more than 40 km/h, or when the coil a or b is energized. When the AND gate 93 generates an output of H level, the drive circuits 102 and 104 are actuated to energize the relay 103. The lamp 105 is turned on so as to indicate that the pump 2 is being operated. When the relay 103 is energized, the pump 2 is operated by the motor 1 to maintain the pressure of the compressed oil in the passage 4a. When the AND gate 93 is enabled, the multivibrator 95 is set. An output from the multivibrator 95 goes high when a predetermined period of time has elapsed after the output from the AND gate 93 is set at H level. When the pump 2 is operated to increase the pressure of the oil in the passage 4a, the output from the inverter 94 is set at L level, thereby stopping the pump 2.

When the pressure of the oil in the passage 4a has not been increased even when the predetermined period of time has elapsed after the output from the AND gate 93 is set at H level, the output from the inverter 94 is kept at H level. When the predetermined period of time has elapsed, the logic condition of the AND gate 96 is satisfied. The output from the AND gate 96 is set at H level. A signal of L level is supplied to the NAND gate 99a, and an output therefrom is set at H level. Therefore, when the drive circuit 100 is driven, the buzzer 101a is operated, the lamp 101b is turned on, and the relay LY1 is energized. When the relay LY1 is energized, the switch S2 is opened, power supply from the battery B is stopped, and rear wheel steering is stopped.

When the coil a of FIG. 3A is disconnected at the x position V, the coil b is disconnected at the x position W, or the coil c is disconnected at the x position X, the output from the OR gate 74 is set at H level, and the signal FAIL is set at H level. When the signal FAIL goes high, the output from the OR gate 97 of FIG. 3B is set at H level, and the output from the NAND gate 99a is set at H level. Upon the operation of the drive circuit 100, the buzzer 101a is operated, the lamp 101b is turned on, and the relay LY1 is energized. Upon energizing of the relay LY1, the switch S2 of FIG. 3A is turned off to deenergize the system, thereby stopping rear wheel steering.

When the sensor 60 of FIG. 3A is disconnected at the x position Y, the output from the comparator 112 of FIG. 3C is set at H level. The signal FAIL is generated through the OR gate 113. When the sensor 60 is disconnected at the x position Z, the output from the comparator 111 of FIG. 3C is set at H level, and the signal FAIL is generated from the OR gate 113. When the signal FAIL goes high, the buzzer 101a is operated, the lamp 101b is turned on, and the system is deenergized, thereby stopping rear wheel steering, as described above.

In the above embodiment, the rear wheels can be steered when the selector lever of an automatic transmission vehicle is located in the "R", "L" or "D" position. However, the rear wheels may be steered when the selector lever is located in the "P" or "N" position. In a vehicle with a manual transmission, the rear wheels may be steered in a direction opposite to that of the front wheels when the shift lever is set in the "first" or "R" position. The rear wheels may be steered in the same direction as that of the front wheels when the shift lever is set in the "third", "fourth" or "fifth" position.

In the above embodiment, when the output from the AND gate 93 is set at H level, the pump 2 is started. However, the OR gate 88 and the AND gate 93 can be omitted. In this case, the signal from the switch 10 is supplied to the output side of the AND gate 93 through the inverter 94, thereby operating the pump 2.

In the above embodiment, the rear wheels are steered in the direction opposite to that of the front wheels in the low velocity mode, and in the same direction as that of the front wheels in the high velocity mode. However, the rear wheels may be steered either in the direction opposite to that of the front wheels in the low velocity mode or in the same direction as that of the front wheels in the high velocity mode. When the rear wheels are steered only in the low velocity mode, a control circuit shown in FIGS. 6A and 6B is used.

Figures 1, 6A:
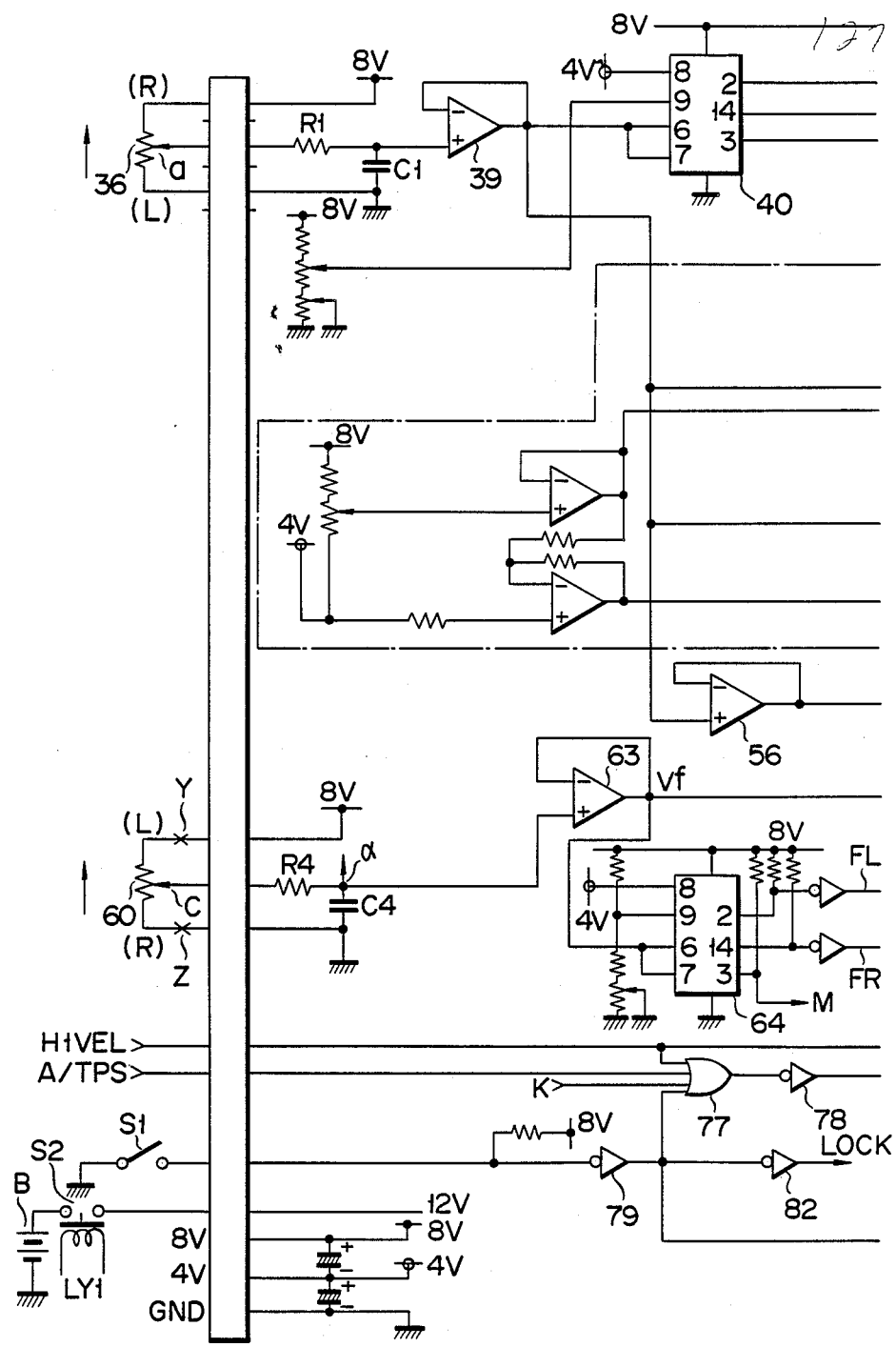
FIGS. 6A and 6B are respectively circuit diagrams of the control circuit when the rear wheels are steered only at low speed.
Figures 2, 6A:
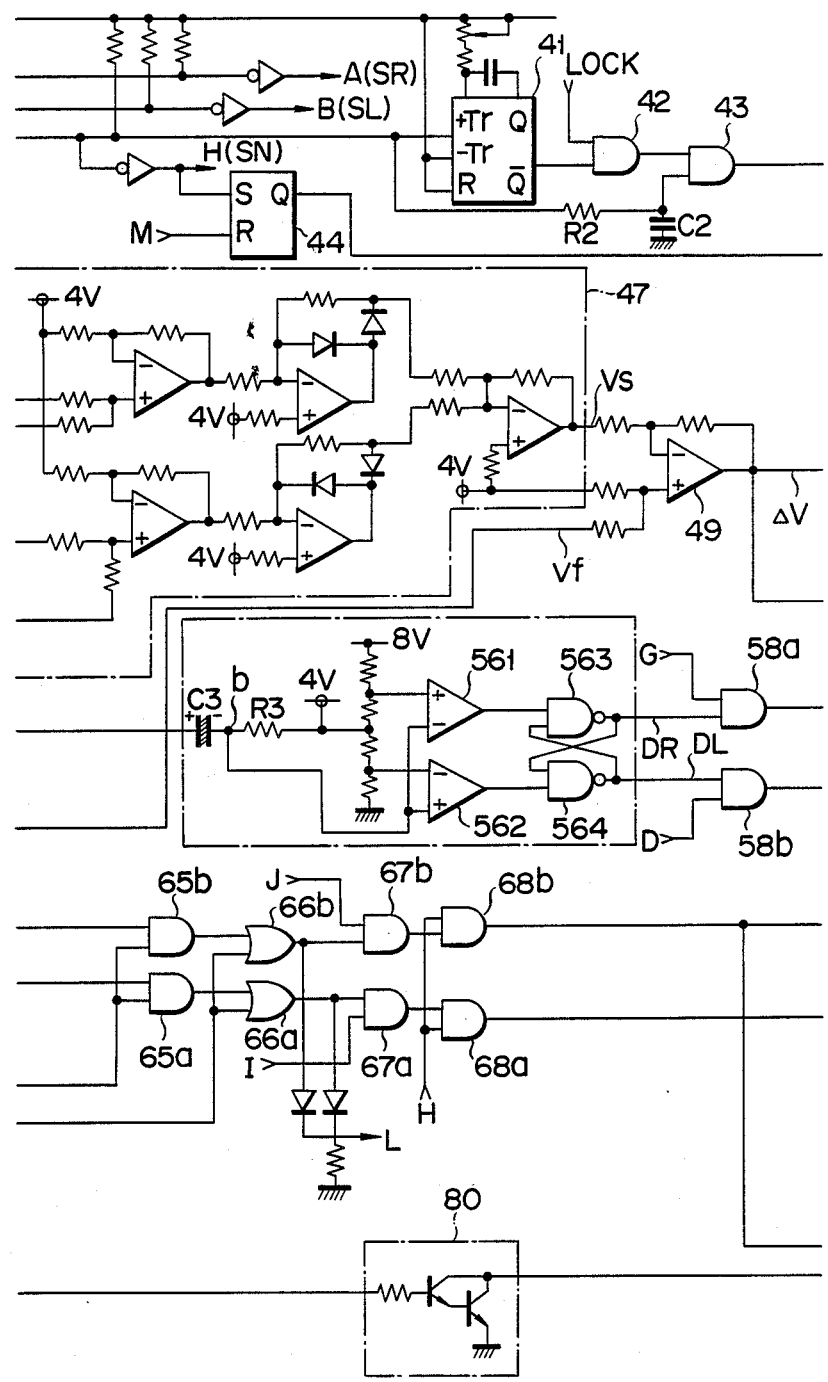
Figures 3, 6A:
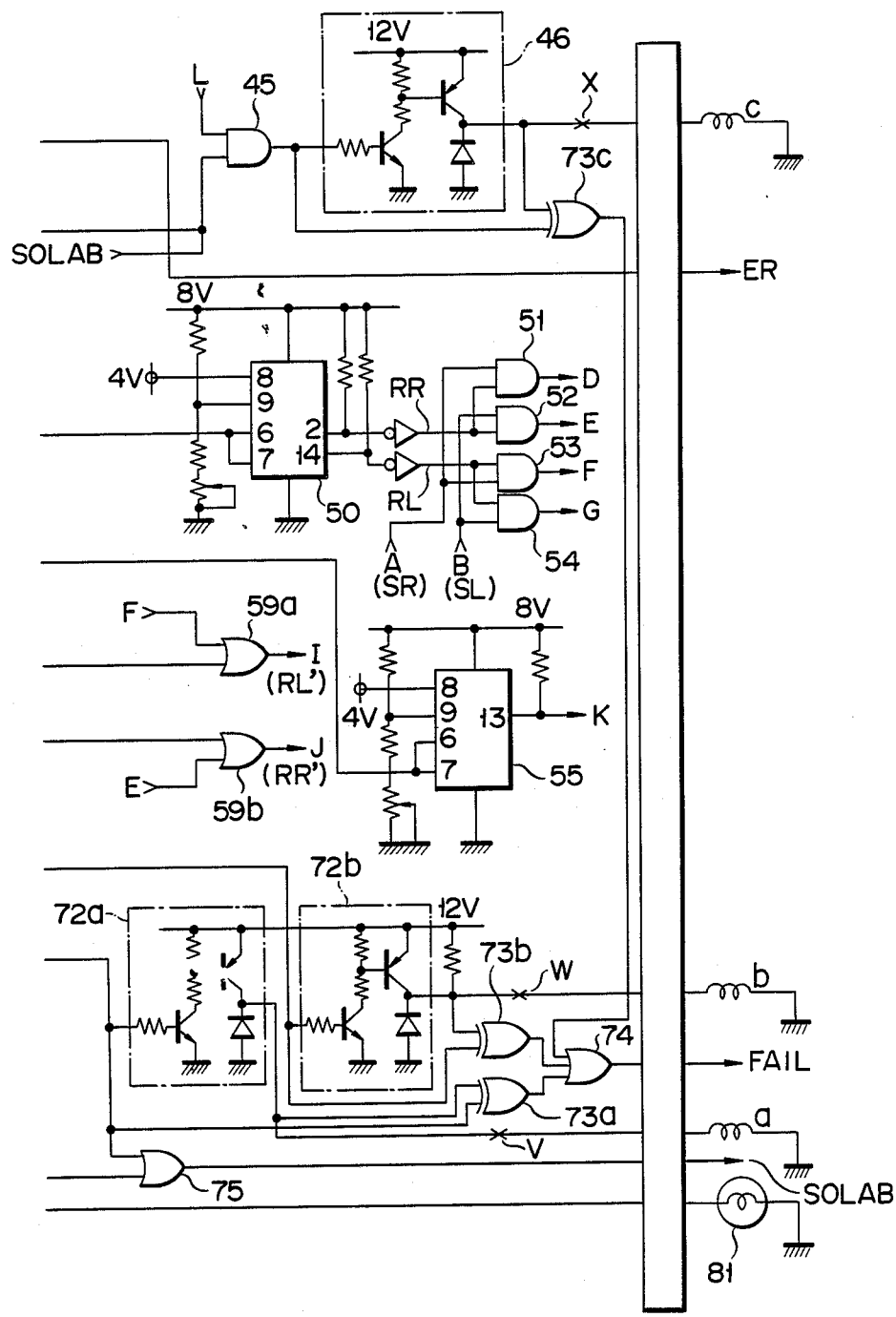
Figures 1, 6B:
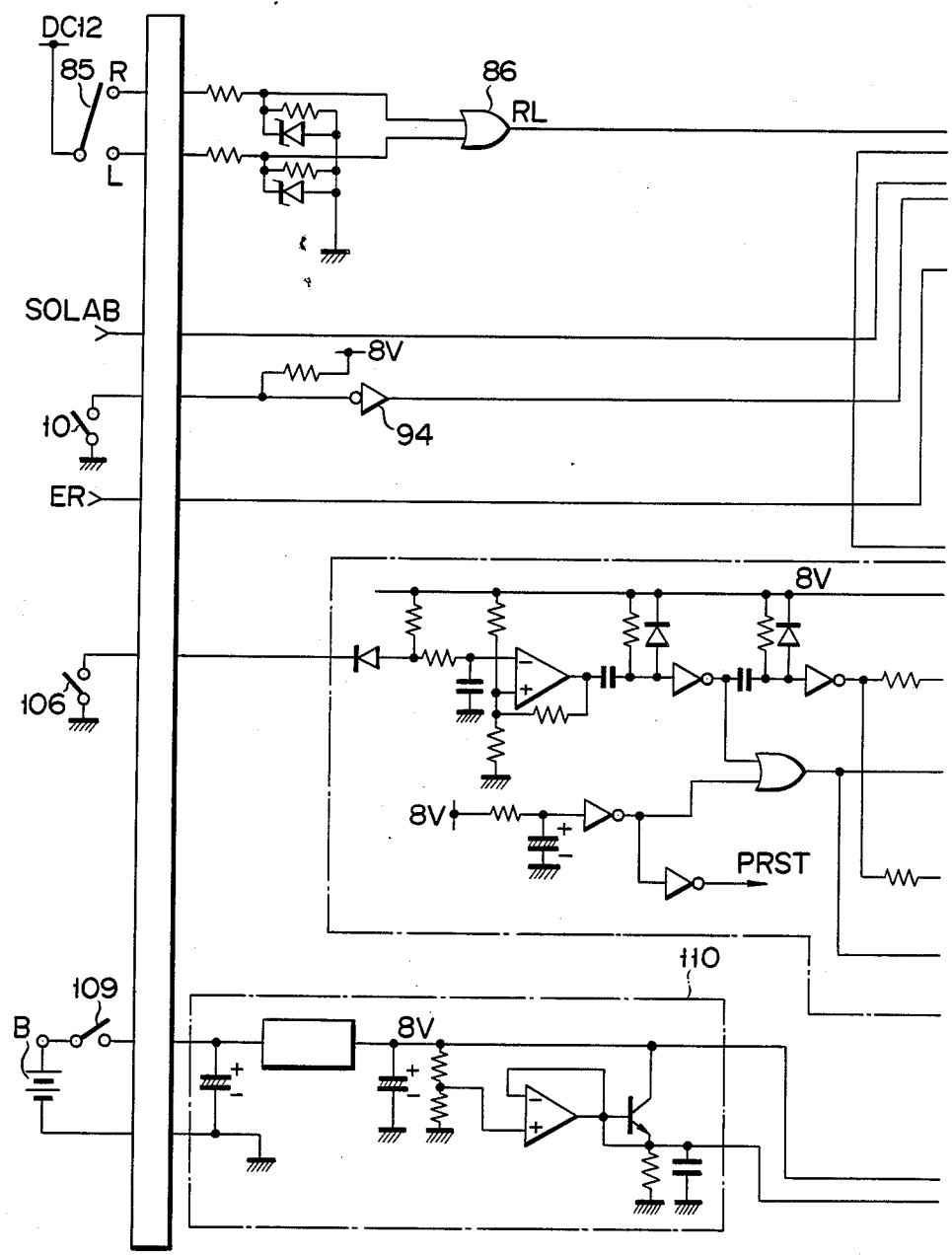
Figures 2, 6B:
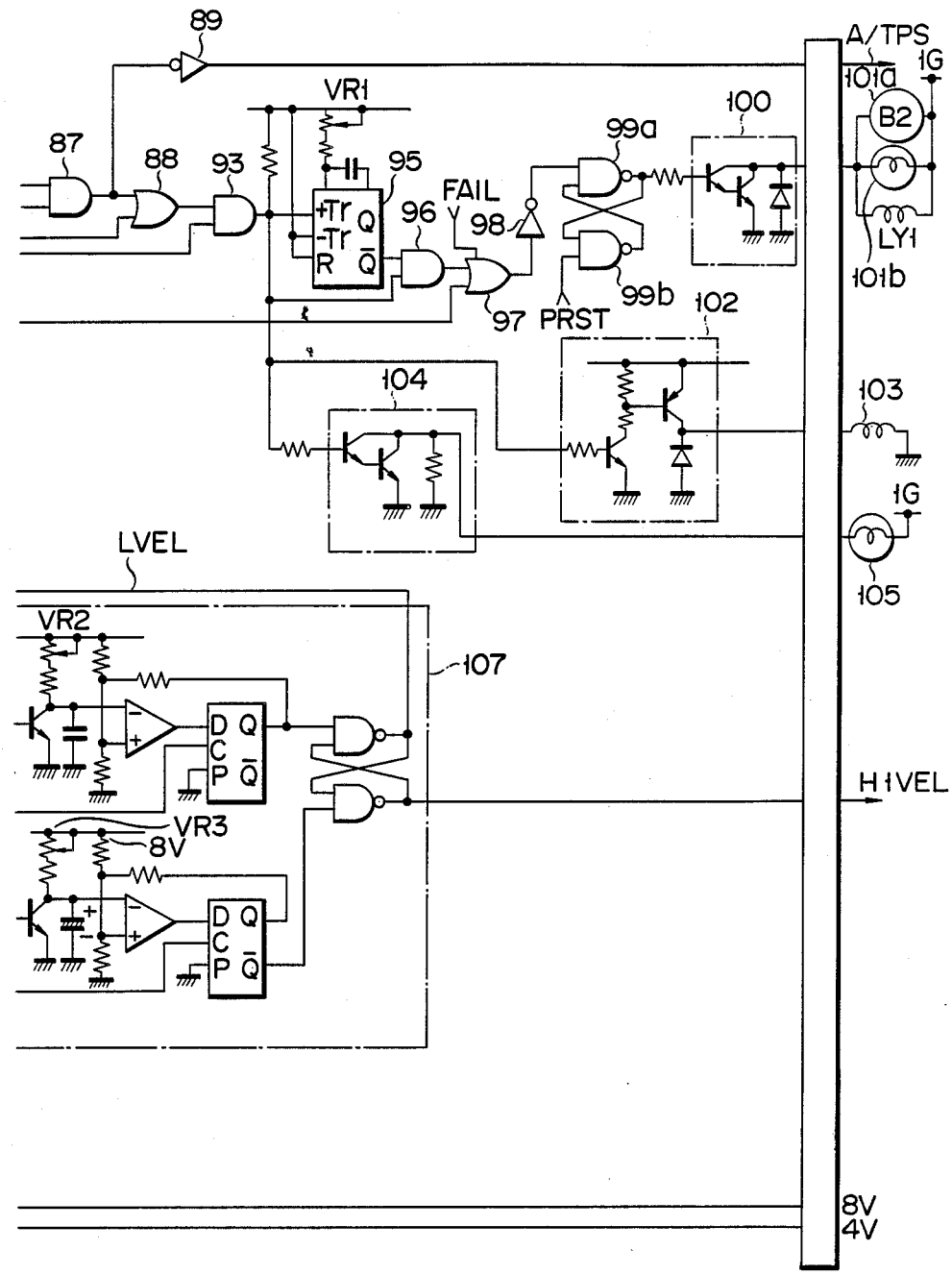

The circuit arrangement shown in FIG. 6A is obtained by modifying that of FIG. 3A in the following manner.

(1) The respective terminals of the switching circuit 48 are connected to each other in the state wherein the signal HVEL of L level is supplied thereto. Under this condition, the switching circuit 48 is omitted.

(2) The switch 61 is set in the position of the "B" terminal and the corresponding terminals are connected. The switch 61 and the transistor 62 are omitted.

(3) The signal A/TD supplied to the OR gate 77 is omitted.

(4) The signal A/TPS is directly supplied to the OR gate 77, and the AND gate 76 is omitted.

(5) The output from the AND gate 68b is supplied to the output side of the OR gate 71b, and the output from the AND gate 68a is supplied to the output side of the OR gate 71a. The AND gates 69a, 69b, 70a and 70b and the OR gates 71a and 71b are omitted.

The circuit arrangement of FIG. 6B is obtained by modifying that of FIG. 3B in the following manner.

(1) The AND gate 108 is omitted. The signal supplied from the detector 107 to the one input terminal of the AND gate 108 is directly generated as a signal H1VEL. The signal H1VEL is set at L level in the lot velocity mode (e.g., less than 20 km/h) and is set at H level in the high velocity mode (e.g., 20 km/h or more).

(2) The "D" terminal of the A/T position switch is omitted, and the AND gates 91 and 92 are omitted.

When the velocity is increased to a high velocity, the output signal H1VEL from the detector 107 goes high, and the output from the OR gate 77 is set at H level. An output from the OR gate 77 is set at L level through the inverter 78. This L level signal is supplied to the AND gates 67a and 67b through the OR gates 66a and 66b, thereby preventing rear wheel steering for increasing the steering angle of the rear wheels. When the selector lever is set in a position excluding the "R" or "L" position, the output from the OR gate 86 is set at L level. The signal A/TSP is set at H level. As a result, the output from the OR gate 77 is set at H level to prevent rear wheel steering for increasing the steering angle of the rear wheels.

Figures 1, 7A:
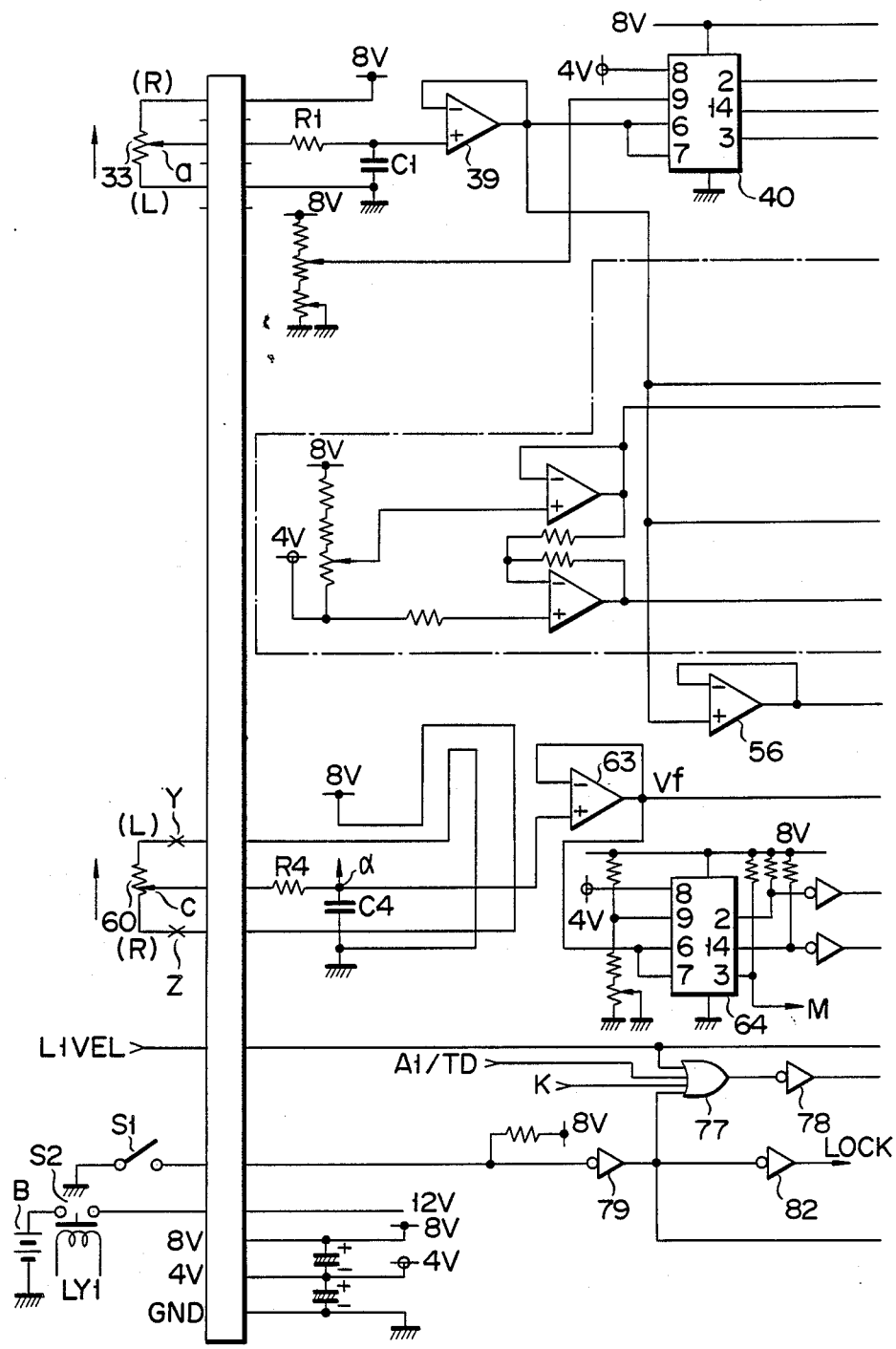
FIGS. 7A and 7B are respectively circuit diagrams of the control circuit when the rear wheels are steered only at high speed.
Figures 2, 7A:
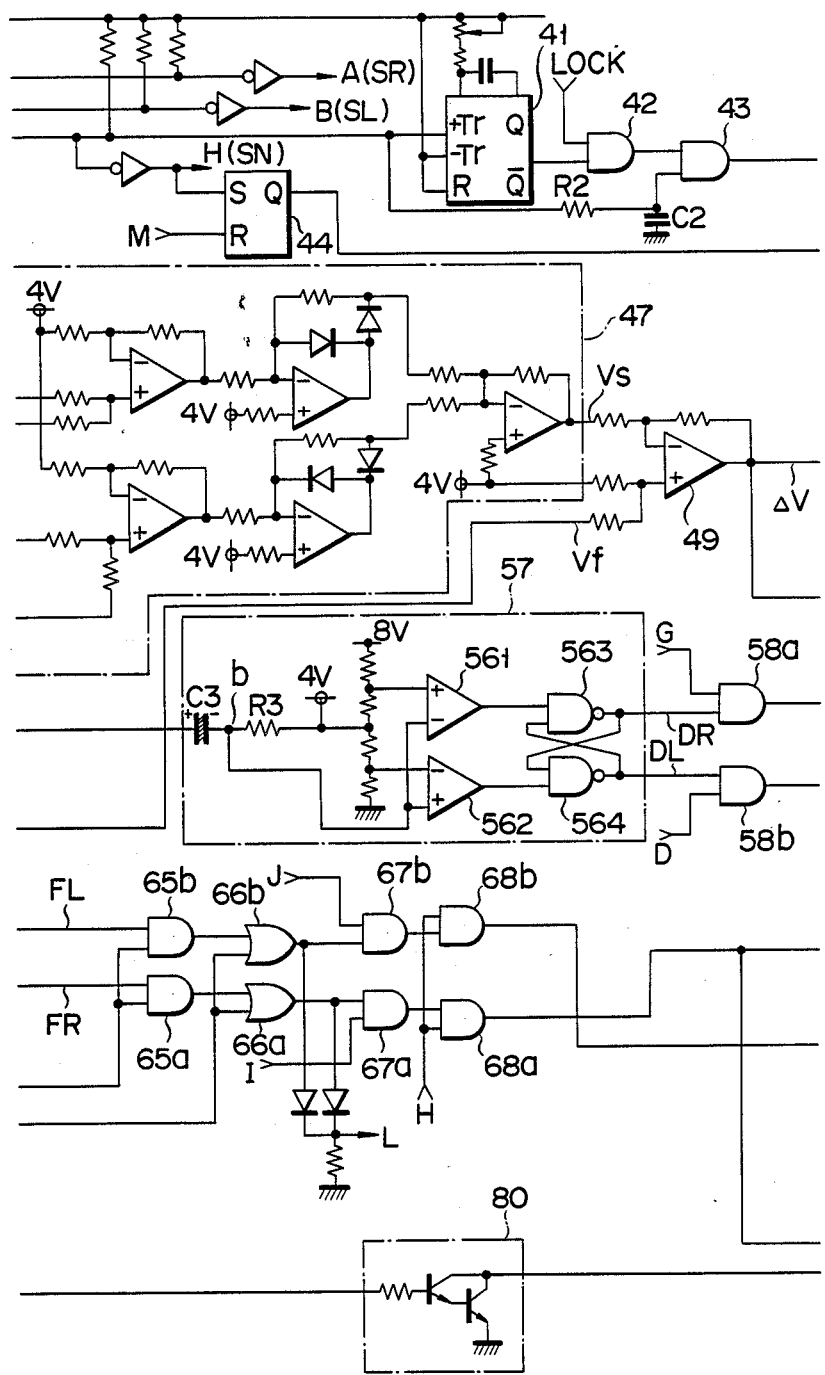
Figures 3, 7A:
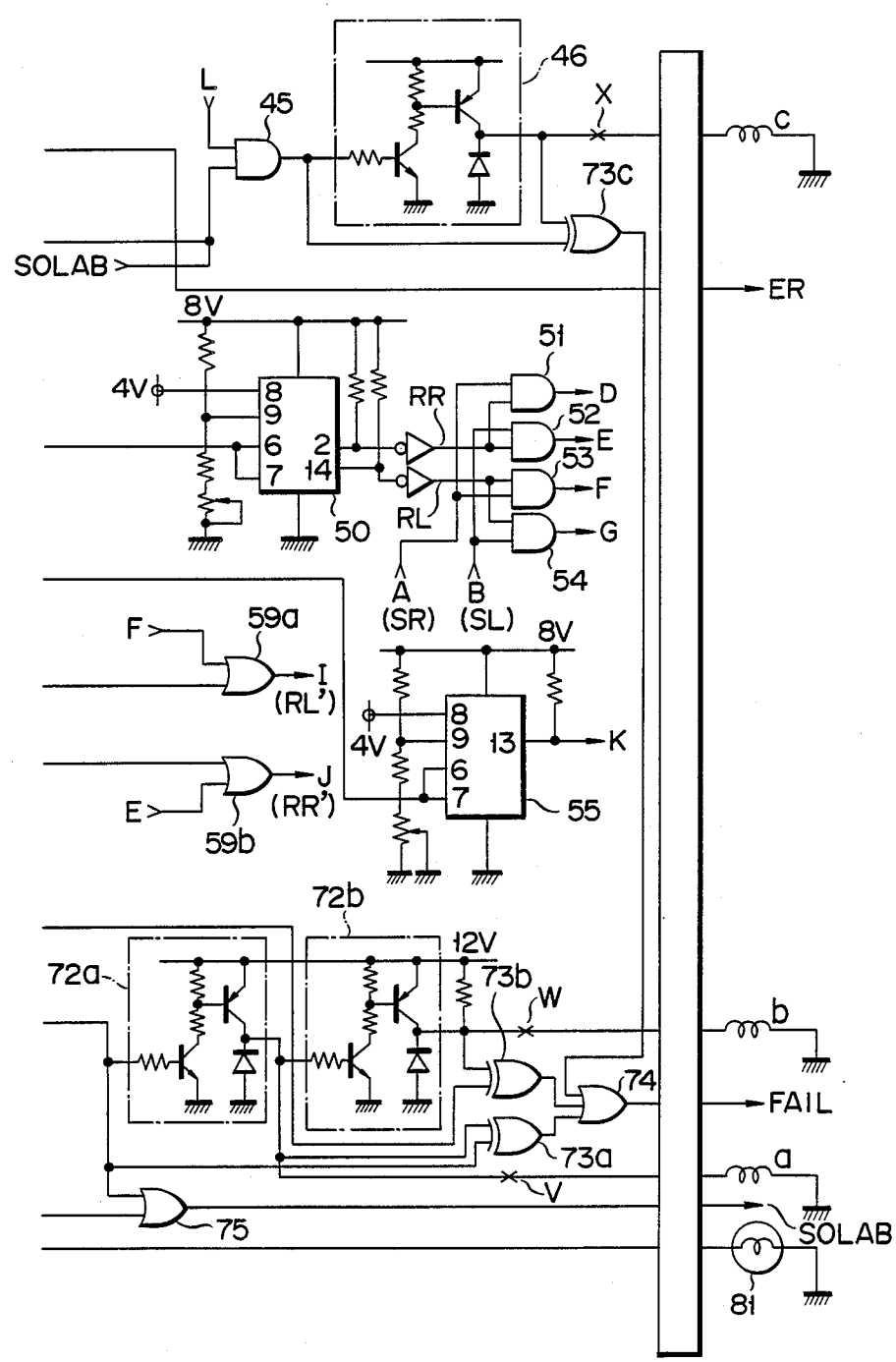

Rear wheel steering in only the high velocity mode will be described with reference to a control circuit of FIGS. 7A and 7B. The circuit arrangement of FIG. 7A is obtained by modifying that of FIG. 3A in the following manner.

(1) The respective terminals of the switching circuit 48 are connected in a state wherein the signal HVEL of H level is supplied thereto. Under this condition, the switching circuit 48 is omitted.

(2) The switch 61 is set in the position of the "A" terminal, and the corresponding terminals are connected to each other. The transistor 62 and the switch 61 are then omitted.

(3) The signals A/TPS, A/TD and HVEL supplied to the OR gate 77 are omitted, and the AND gate 76 is also omitted. The signal MVEL supplied to the OR gate 77 and the AND gates 65a and 65b is replaced with a signal L1VEL. A signal A1/TD to be described later is supplied to the OR gate 77.

(4) The output from the AND gate 68b is directly supplied to the output side of the OR gate 71a, and the output from the AND gate 68a is directly supplied to the output side of the OR gate 71b. The AND gates 69a, 69b, 70a and 70b, and the OR gates 71a and 71b are omitted.

Figures 1, 7B:
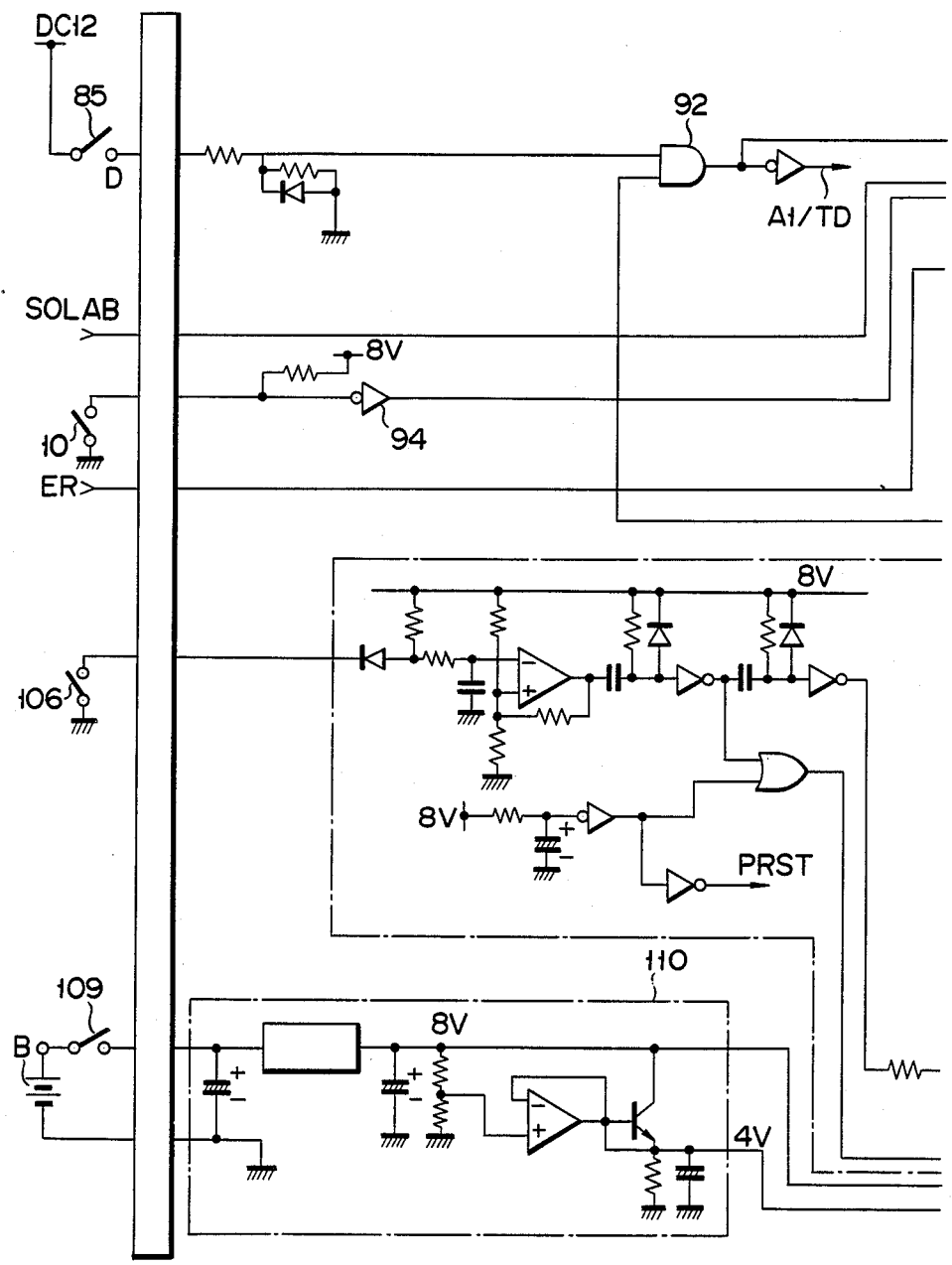
Figures 2, 7B:
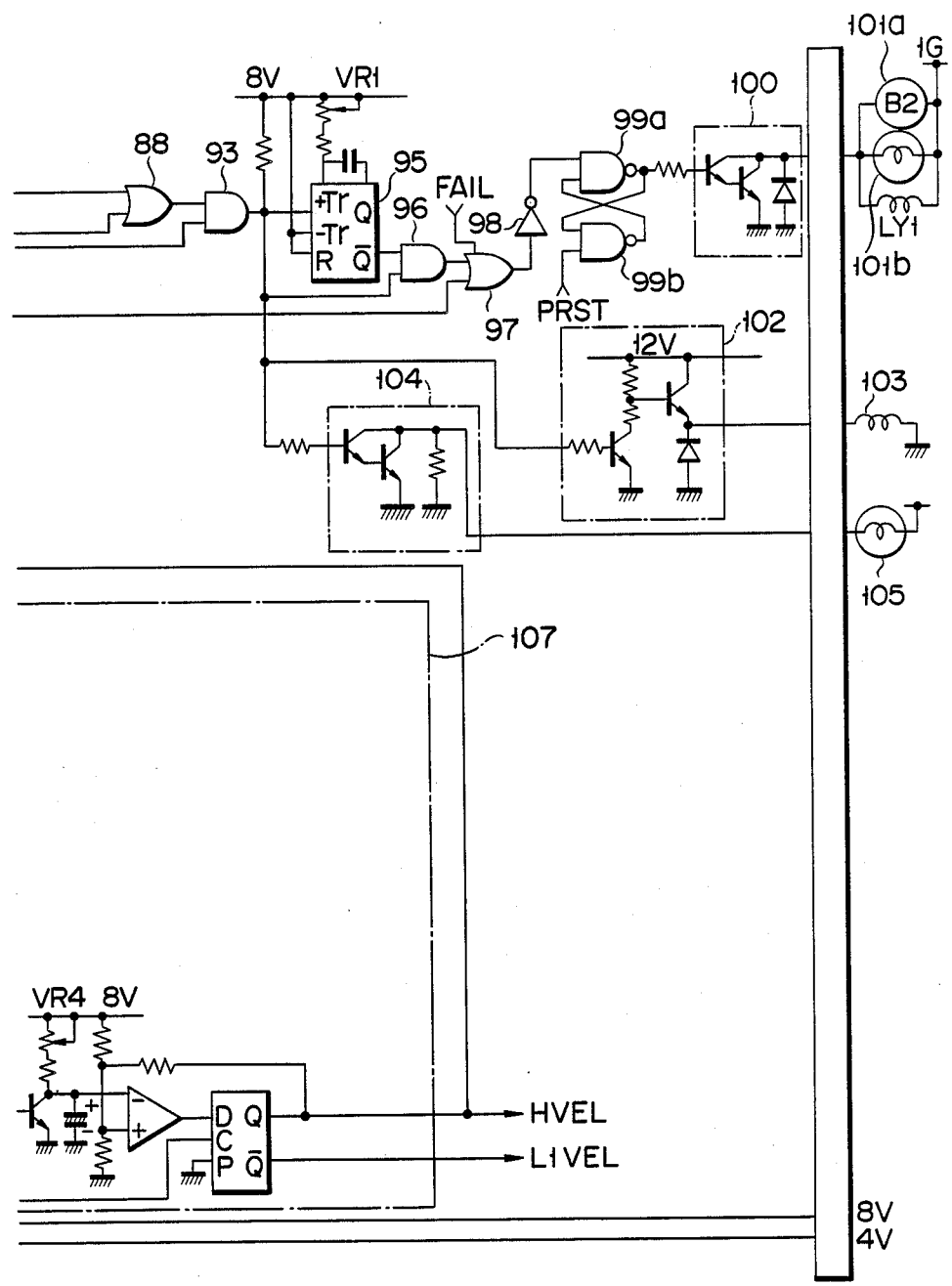

The circuit arrangement of FIG. 7B is obtained by modifying that of FIG. 3B in the following manner.

(1) The "R" and "L" terminals of the A/T position switch are omitted, and the OR gate 86, the AND gate 87 and the inverter 89 are omitted.

(2) The inverter 90 and the AND gate 91 are omitted, and the output from the AND gate 92 is supplied as the signal A1/TD through the inverter. The signal AL/TD is set at L level when the selector lever is set at the "D" position and the velocity is high (e.g., 40 km/h or more).

(3) The AND gate 108 is omitted, and the output from the detector 107 to the one input terminal of the AND gate 108 is generated as the signal L1VEL. The signal L1VEL is set at H level in the low velocity mode (i.e., less than 40 km/h), and at L level in the high velocity mode (i.e., 40 km/h or more).

When the velocity is low, the signal L1VEL is set at H level and is then supplied to the OR gate 77, thereby preventing rear wheel steering for increasing the steering angle as described above. When the selector lever is set in a position excluding the "D" position, the output from the AND gate 92 is set at L level, and the signal A1/TD is set at H level. Since the signal A1/TD is supplied to the OR gate 77, the output from the OR gate 77 is set at H level. Rear wheel steering for increasing the steering angle is prevented in the same manner as described above.

According to the embodiment described above, the relationship between the front wheel steering velocity and the response of the rear wheel steering apparatus determines whether the rear wheels are steered in accordance with front wheel steering continuously or stepwisely. More specifically, when the steering velocity of the front wheels is low, the response speed of the rear wheel steering apparatus is fast that the rear wheels are steered in a stepped manner. When a stationary swing is performed, i.e., when the frictional force between the wheels and the road surface is high, the steering angle of the front wheels exceeds the predetermined value even if the front wheels are steered. When a large pressure acts on the piston rod 26, the rear wheels are turned against the frictional force between the wheels and the road surface. When the steering angle of the rear wheels becomes equal to that of the front wheels, rear wheel steering is stopped. Thereafter, steering of the rear wheels is stopped by the frictional force between the wheels and the road surface. When large force acts on the piston rod 26 again, (i.e., the difference between the steering angles of the front and rear wheels exceeds the predetermined value), the rear wheels are turned. As a result, the rear wheels are steered in a stepped manner. However, when the steering velocity of the front wheels is fast and the response of the rear wheel steering apparatus cannot follow the change in the front wheels, the rear wheels are continuously steered.

The response characteristics of the rear wheels with respect to the front wheels are good. In addition, since servo motors are not used, the rear wheel steering apparatus is compact.

When the rear wheels go beyond an angle exceeding the target steering angle, the rear wheels return to the target steering angle in response to the signals A, B, E and F. As a result, good driving stability is maintained. Even if the steering inhibit signal supplied through the OR gate 77 and the inverter 78 is generated, the rear wheels are returned to the neutral position by the signals generated by the comparator 64 and the AND gates 65a and 65b and the signal MVEL, thereby providing good operability.

A second embodiment will be described with reference to FIGS. 8 and 9. The same reference numerals as in FIGS. 8 and 9 denote the same parts as in the first embodiment, and a detailed description thereof will be omitted.

Figure 8:
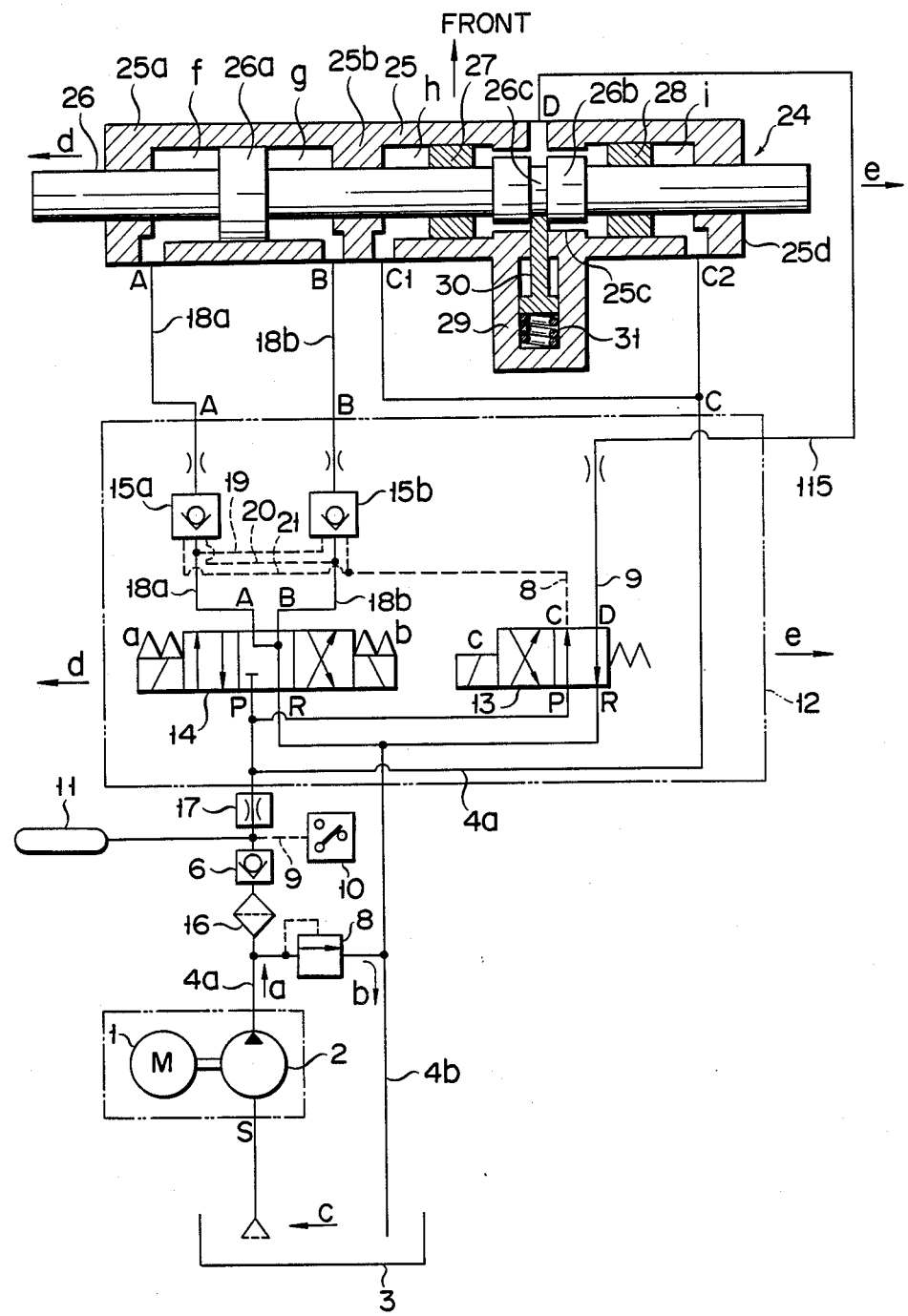
FIG. 8 is a system diagram of a hydraulic circuit when a control circuit according to a second embodiment is kept inactive.

FIG. 8 shows a hydraulic circuit when the rear wheels are located in the neutral position. The differences between the hydraulic circuit of the first embodiment shown in FIG. 2A and the hydraulic circuit of the second embodiment are as follows:

(1) The chambers h and i of the cylinder 25 are connected to the passage 18c at the downstream side of the valve 13 in the first embodiment. However, according to the second embodiment, chambers h and i of a first electromagnetic selector valve 13 are connected to a high-pressure oil passage 4a.

(2) The cylinder 25 between the rings 27 and 28 is connected to the passage 4b in the first embodiment. However, according to the second embodiment, a cylinder 25 between sliding rings 27 and 28 is connected to the D port of the valve 13 through an oil passage 115.

(3) The passage 18d is connected to the body 29 of the cylinder 25 in the first embodiment. However, according to the second embodiment, the passage 18d is not provided. Unlike the operation of the first embodiment wherein the compressed oil is supplied to the body 29 through the passage 18d when the coil c of the valve 13 is energized to retract the member 30 from the groove 26c of the piston rod 26, the pressurized oil is supplied to the cylinder 25 between the rings 27 and 28 through the passage 115 according to the second embodiment. The chambers h and i of the cylinder 25 and the portion of the cylinder 25 between the rings 27 and 28 are kept at a low pressure when the coil c of the valve 13 is energized according to the first embodiment. However, according to the second embodiment, the chambers h and i and the portion of the cylinder 25 between the rings 27 and 28 are kept at a high pressure.

Although differences between the hydraulic circuits of the first and second embodiments have been presented, the hydraulic circuit of the second embodiment is operated substantially in the same manner as that of the first embodiment, and a detailed description thereof will be omitted. The hydraulic circuit of the second embodiment can be controlled by the control circuit of FIGS. 3A to 3C. However, the circuit arrangement of FIG. 3A may be replaced With that of FIG. 9.

The differences between the circuit arrangements in FIGS. 9 and 3A will be described hereinafter. The signals A and B are generated from the "2" and "14" terminals of the comparator 40 in FIG. 3A. However, these signals are omitted in the arrangement in FIG. 9. The inverted output signals RR and RL from the comparator 50 and the signals A and B are respectively supplied to the AND gates 51 to 54 to derive the signals D to G in FIG. 3A. The AND gates 51 to 54 are omitted in the arrangement of FIG. 9. The signal DR from the detector 57 and the signal G are supplied to the AND gate 58a, the output therefrom and the signal F are supplied to the OR gate 59a, and the OR gate 59a generates the signal I in FIG. 3A. Referring to FIG. 3A again, the output signal DL from the detector 57 and the signal D are supplied to the AND gate 58b, an output therefrom and the signal E are supplied to the OR gate 59b, and the OR gate 59b generates the signal J. However, according to the arrangement in FIG. 9, an output from a steering direction detector 57 and an output signal RL derived from the comparator 50 through the inverter are supplied to the AND gate 58a, and the AND gate 58a generates the signal I. The output signal DL from the detector 57 and the inverted output signal RR of the comparator 50 are supplied to the AND gate 58b, which then generates the signal J. Furthermore, as shown in FIG. 3A, the inverted output signals FR and FL of the comparator 64 and the signal MVEL are supplied to the AND gates 65a and 65b. However, in FIG. 9, the signal FR is supplied to only the AND gate 65a, and the signal FL is supplied to only the AND gate 65b. Furthermore, in FIG. 3A, the signal H is supplied to the AND gates 68a and 68b. However, in FIG. 9, an output signal N from the Q output of a flip-flop 44 and a signal LOCK are supplied to an AND gate 117. An output from the AND gate 117 is supplied to the AND gates 68a and 68b.

As shown in FIG. 3A, the output from the amplifier 49 is supplied to the comparator 55 which then generates the signal K. However, as shown in FIG. 9, the comparator 55 is omitted, so the signal K is omitted.

The operation of the control circuit shown in FIG. 9 will be described hereinafter. The arrangement of the control circuit of FIG. 9 is partially simplified as compared with that of FIG. 3A in consideration of the response time of the oil pressure. However, the control circuit of FIG. 9 is operated in substantially the same manner as in that of FIG. 3A, and only the differences will be briefly described hereinafter. When the steering wheel 38 is rotated to the right to energize the coil c and retract the member 30 from the groove 26c, the rear wheels can be steered. When the output $\Delta V$ from the amplifier 49 exceeds the predetermined value, the inverted output signal RL of the comparator 50 is set at H level. The signal RL is supplied to the AND gate 58a. Since the steering wheel 38 is rotated to the right, the output signal DR from the detector 57 is set at H level. Therefore, the output signal I from the AND gate 58a is set at H level, and the rear wheels are steered to the left (right). When the output $\Delta V$ from the amplifier 49 exceeds the predetermined value and the steering wheel 38 is stopped, the output signals DR and DL from the detector 57 are set at L level after a predetermined period of time has elapsed. With the circuit shown in FIG. 3A, when the rear wheel steering overshoots or undershoots the predetermined angle and the output ΔV from the amplifier 49 exceeds the predetermined value, the rear wheels are steered. However, with the circuit of FIG. 9, the rear wheels are not steered since the signals I and J are set at L level. This operation is also performed when the steering wheel 38 is rotated to the left or when it returns to the neutral position after being rotated to the right or left. The output signal DR or DL from the detector 57 is set at H level while the steering wheel 38 is being rotated. For this reason, the rear wheels cannot be steered in this state.

In the second embodiment, the rear wheels are steered in a stepped manner or continuously in the same direction as or a direction opposite to the direction of the front wheels in accordance with a change in the steering angle of the front wheels in the same manner as in the first embodiment. In addition, four pipes are connected to the rear wheel steering cylinder for steering the rear wheels in accordance with the steering angle of the front wheels, thereby providing a rear wheel steering apparatus in which piping takes up less space.

Figures 1, 9:
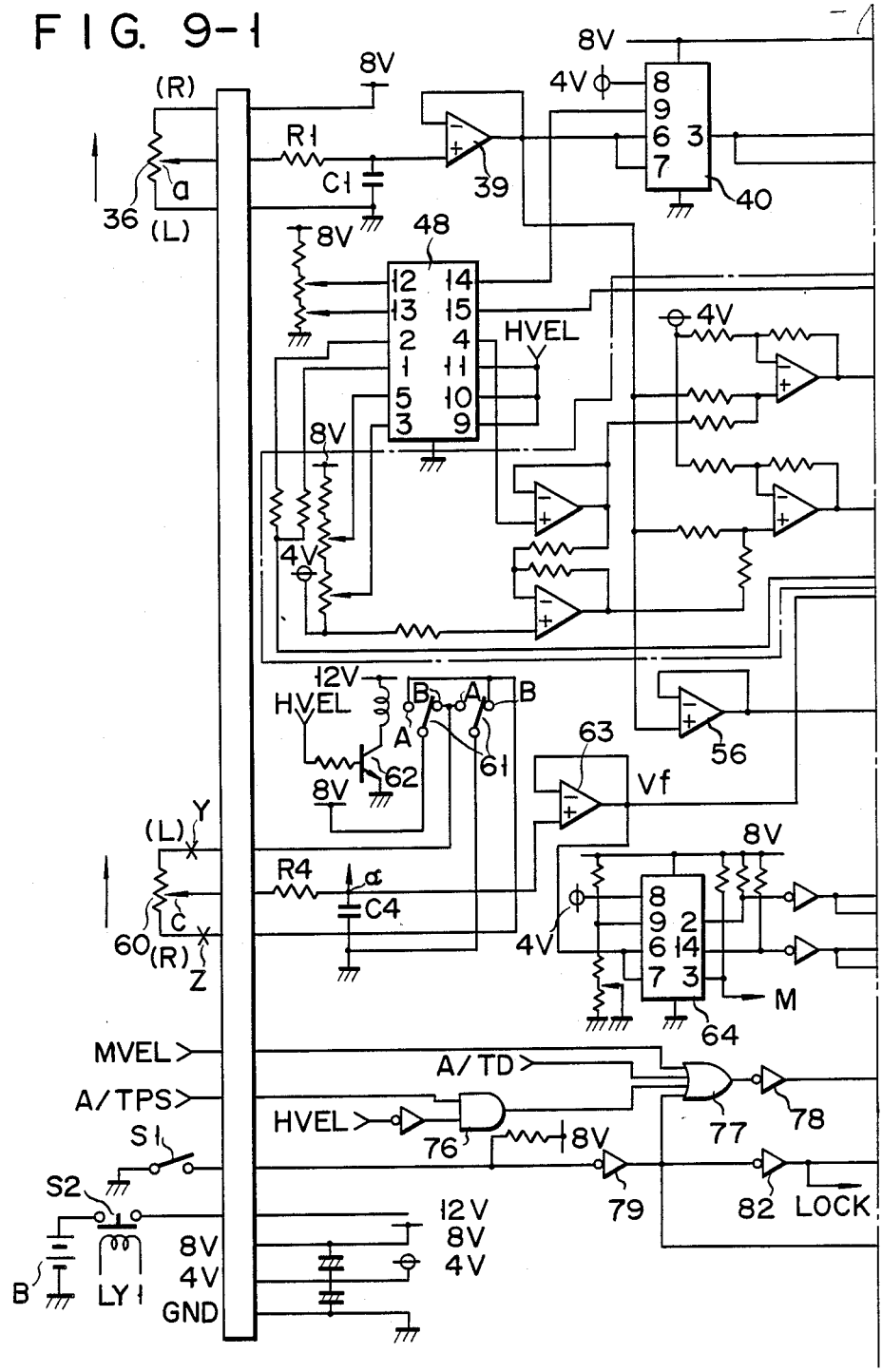
FIG. 9 is a circuit diagram of the control circuit shown in FIG. 8.
Figures 2, 9:
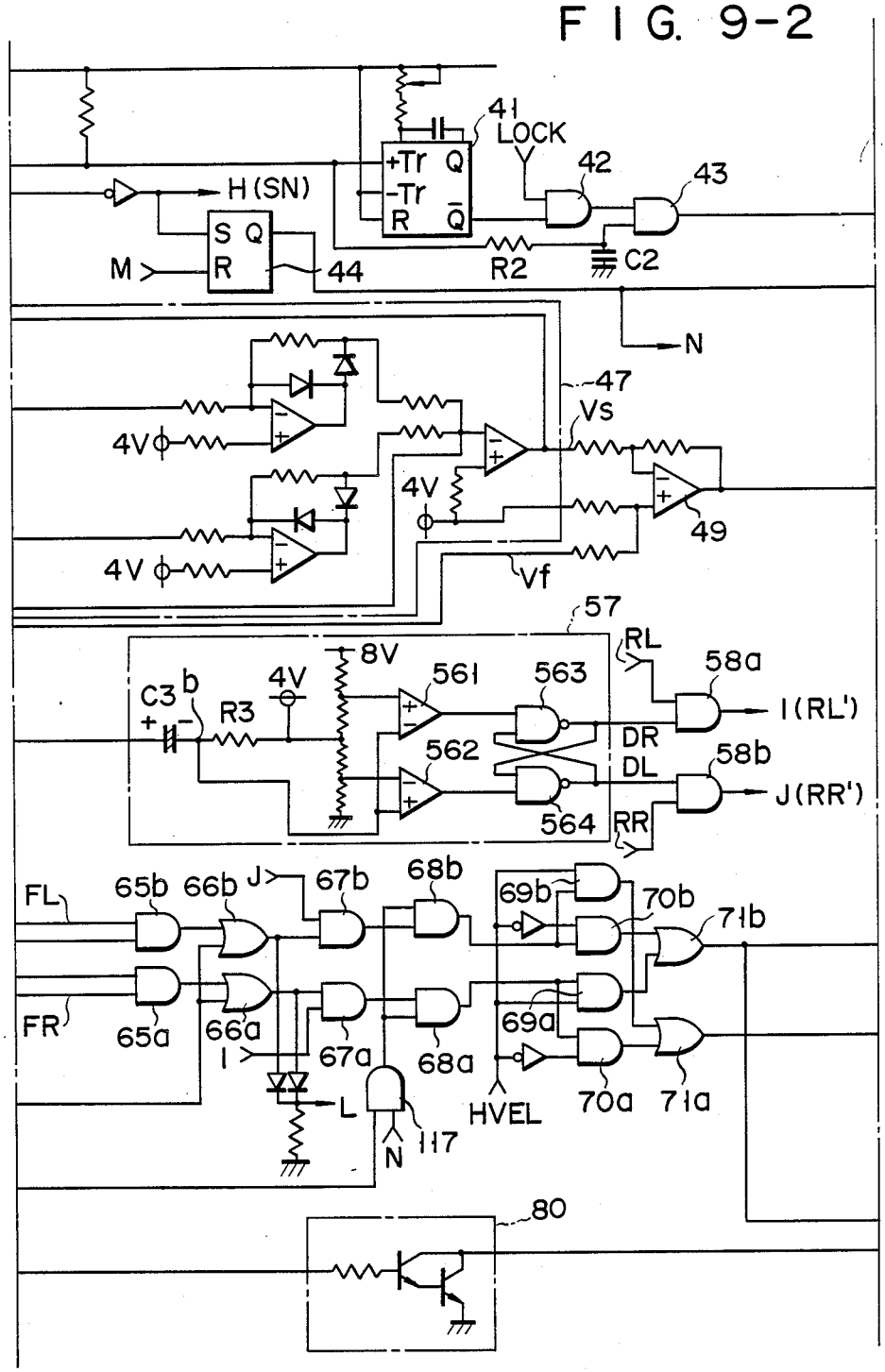
Figures 3, 9:
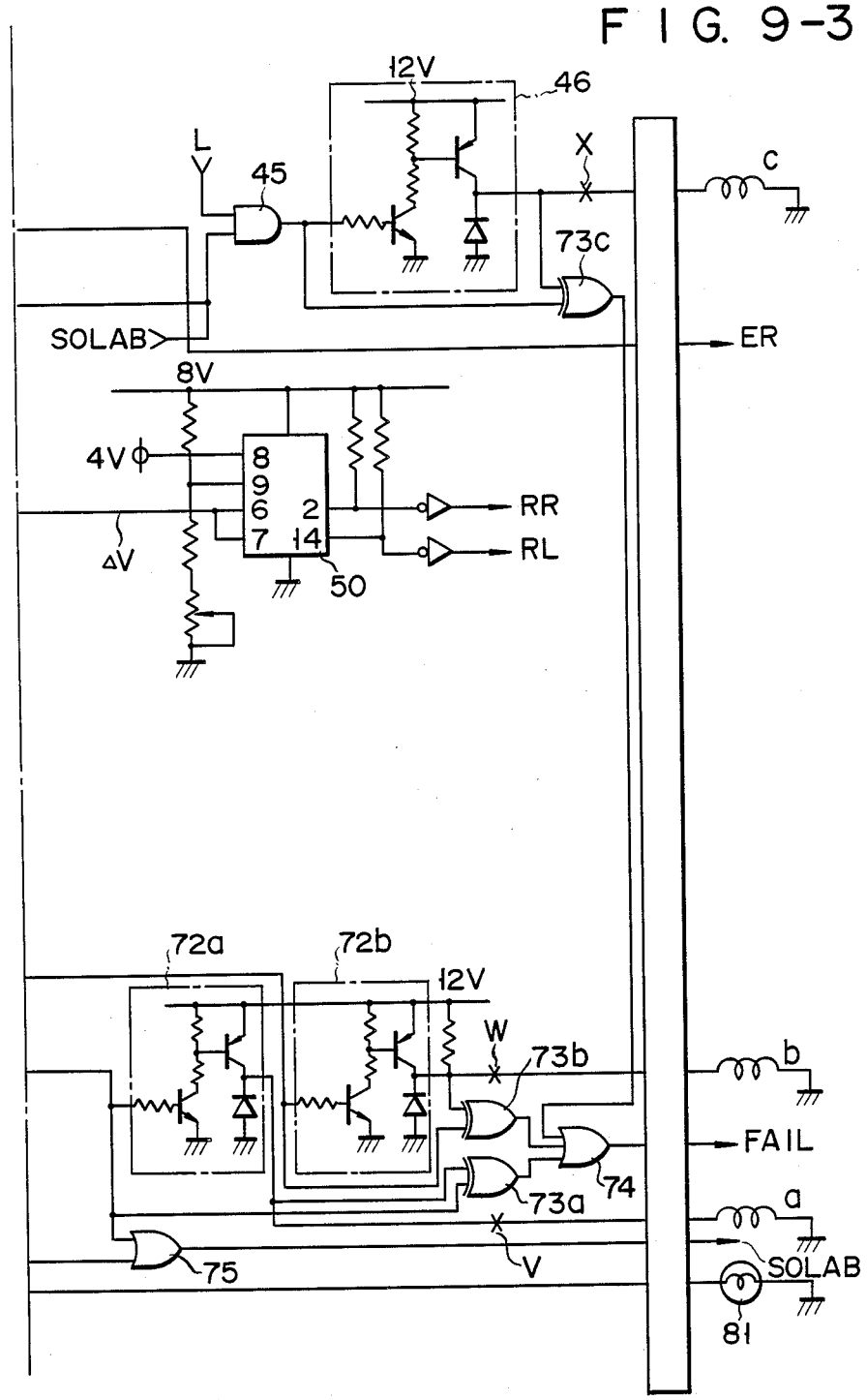

In the second embodiment, the changes shown in FIG. 9 yield the same results as in the first embodiment. The rear wheels can be steered in either the low or high velocity mode.

Figure 10:
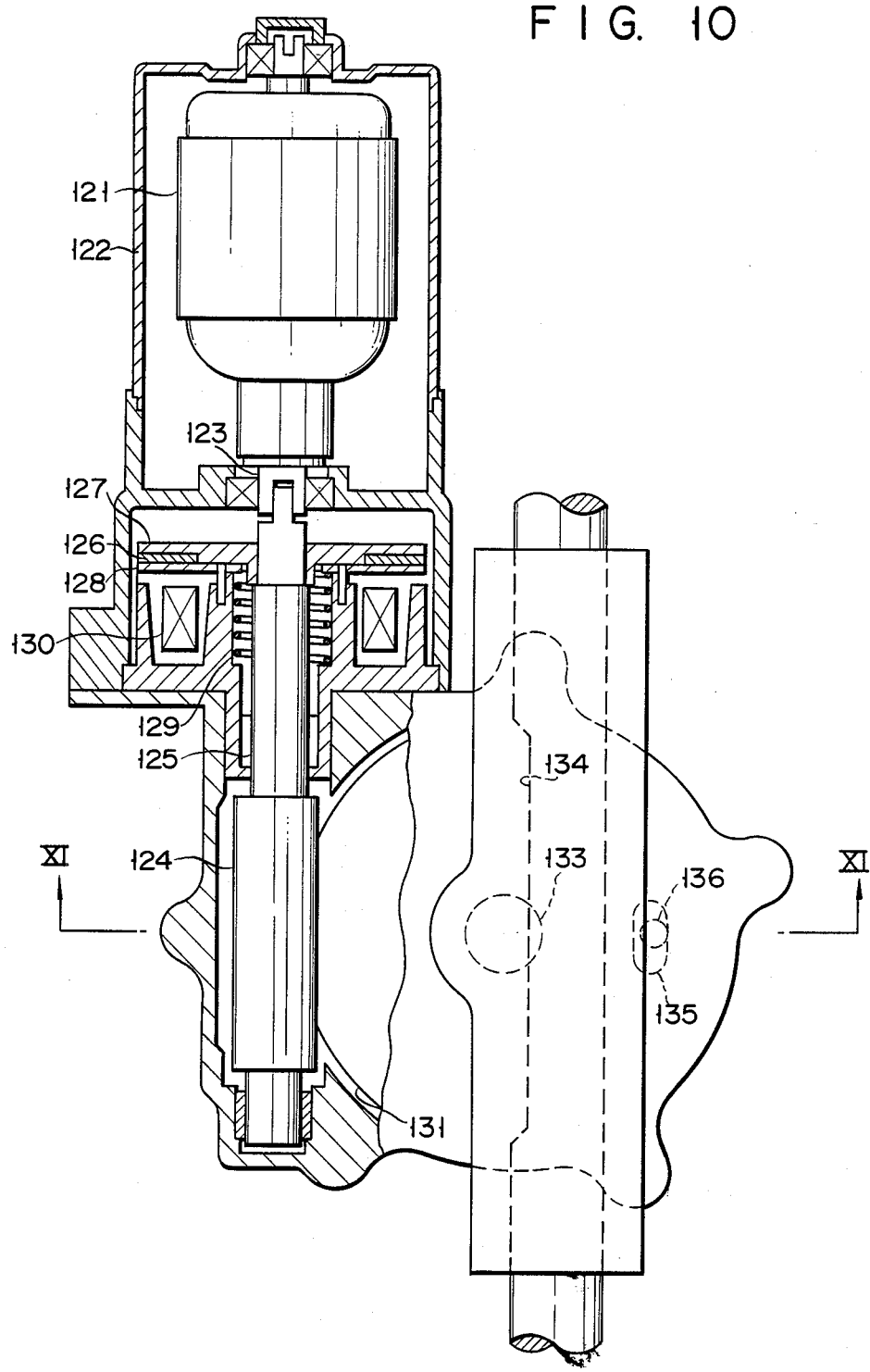
FIG. 10 is a sectional view of an electric actuator according to a third embodiment of the present invention.
Figure 11:
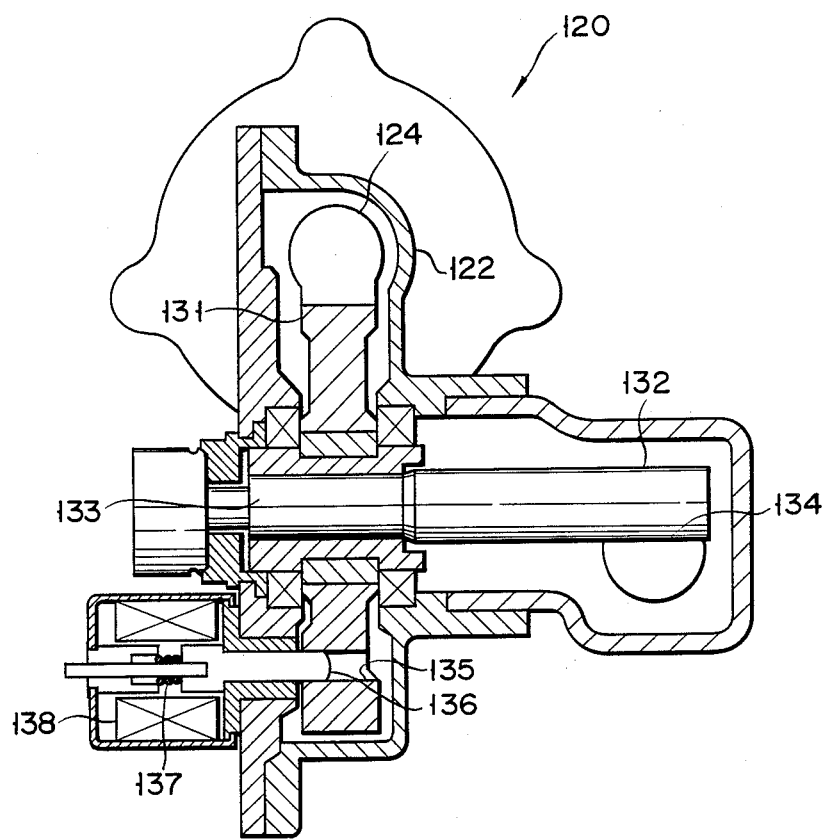
FIG. 11 is a sectional view of the actuator taken along the line XI—XI of FIG. 10.

In the first and second embodiments, the hydraulic rear steering apparatuses are exemplified by hydraulic cylinders for steering the rear wheels, respectively. A third embodiment will be described with reference to FIGS. 10 to 12 wherein an electric rear steering apparatus using an electric force in place of hydraulic pressure is used to steer the rear wheels. FIG. 10 is a sectional view of an electric actuator unit, and FIG. 11 is a sectional view thereof taken along the line XI—XI of FIG. 10. Reference numeral 120 denotes an electric actuator unit; and 121, a motor housed in a case 122. A shaft 123 of the motor 121 is coupled to a shaft 125 having a worm gear 124. Rotation of the shaft 123 is transmitted to the shaft 125. A disk member 127 having a pad 126 is fixed on the shaft 125. A disk brake member 128 opposing the disk member 127 is slidable along the axis of the shaft 125 but not rotatable thereabout. The brake member 128 is urged by a coil spring 129 into tight contact with the pad 126. A frictional force between the brake member 128 and the pad 126 prevents rotation of the disk member 127. When a brake solenoid coil 130 is energized, the brake member 128 is separated from the pad 126 against the biasing force of the spring 129. The gear 124 is meshed with a worm wheel 131. The wheel 131 is fixed on a shaft 133 having a pinion gear 132. The gear 132 meshes with a rack 134. The two ends of the rack 134 are coupled to links 33 (FIG. 1). An elongated hole 135 is formed in the wheel 131. A lock pin 136 is mounted on the case 122 and can extend/retract into/from the hole 135. The pin 136 is biased by a coil spring 137 toward the hole 135. When a solenoid coil 138 is energized, the pin 136 retracts from the hole 135 against the biasing force of the spring 137.

Figures 1, 12:
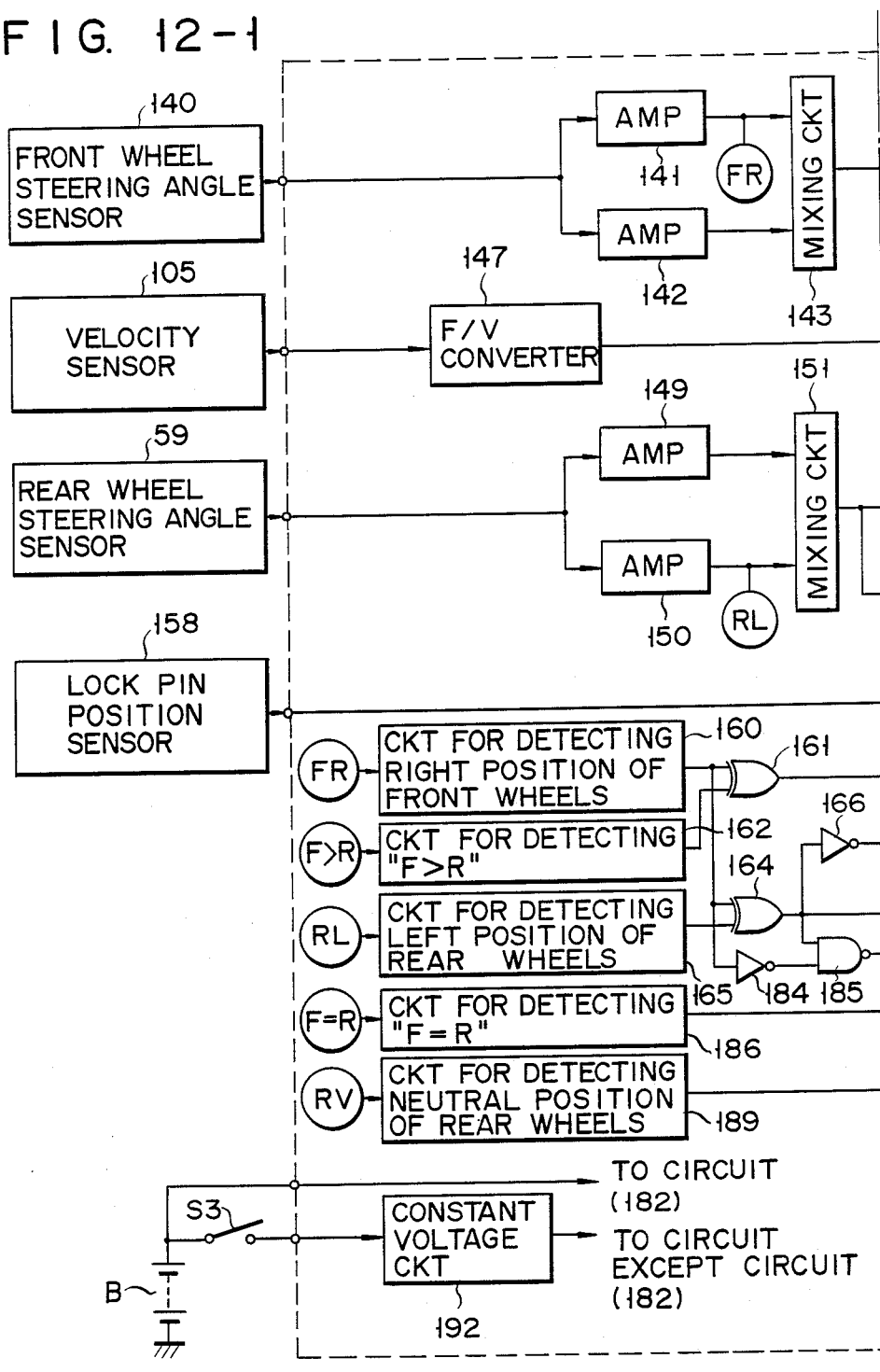
FIGS. 12 and 13 are respectively circuit diagrams of a control circuit according to the third embodiment of the present invention.
Figures 2, 12:
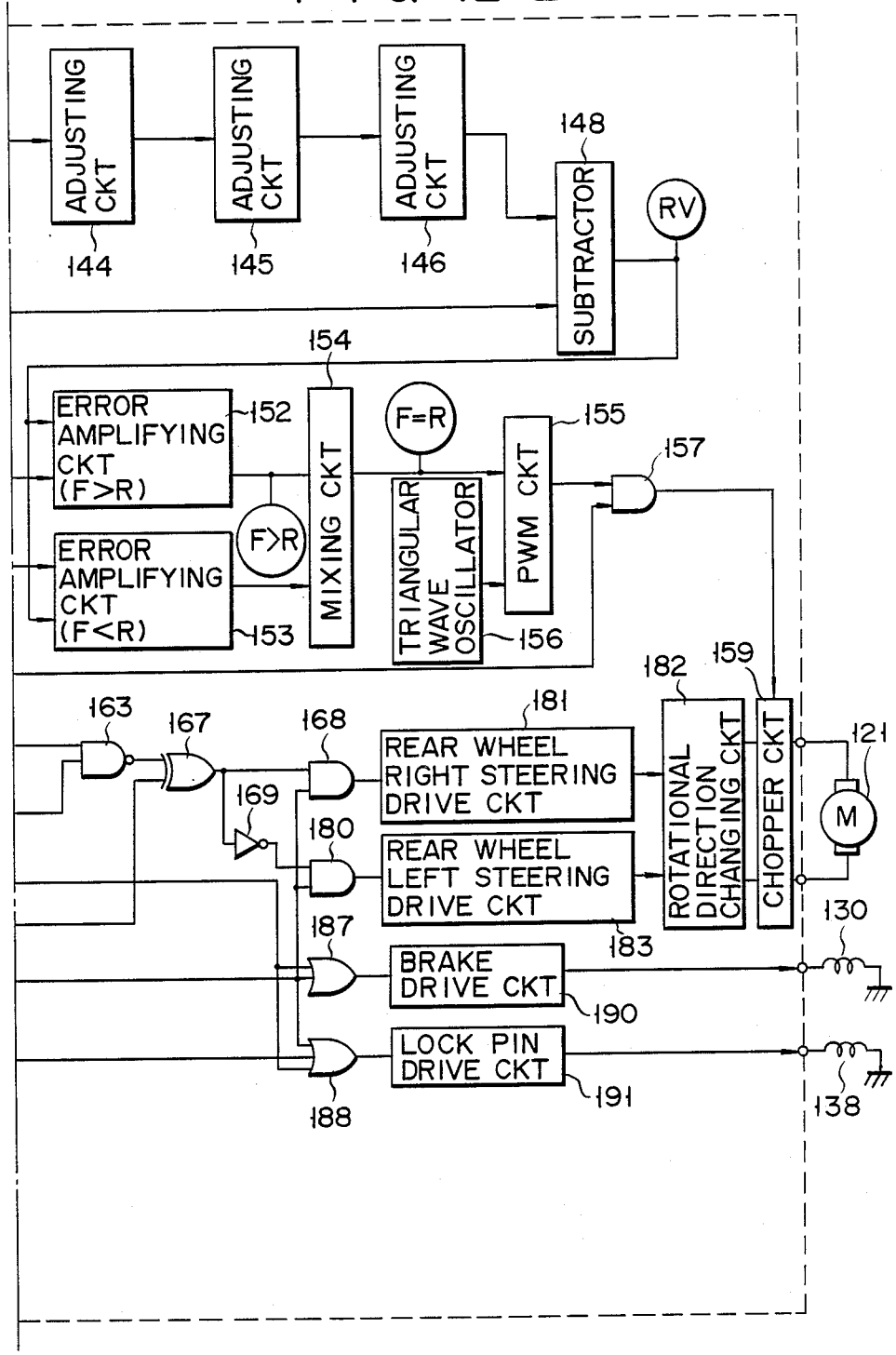

A control circuit for the electric actuator unit 120 shown in FIGS. 10 and 11 will be described with reference to FIG. 12. Reference numeral 140 denotes a front wheel steering angle sensor for detecting a steering angle of the front wheels. The sensor 140 is operated in the same manner as the sensor 36 of FIG. 3A. When the front wheels are located in the neutral position, the sensor 140 generates a voltage of 4 V. When the front wheels are steered to the right, the output voltage is increased. However, when the front wheels are steered to the left, the output voltage is decreased. The output from the sensor 140 is supplied to a front wheel right steering angle amplifier 141 and a front wheel left steering angle amplifier 142. The input signal is amplified by the amplifier 141 and is converted to a signal proportional to a steering angle between the neutral position and the position of the wheel when it is turned to the right with reference to the voltage of 4 V. The amplifier 142 inverts and amplifies the input signal with reference to the voltage of 4 V and generates a signal proportional to the steering angle between the neutral position and the position of the wheel when it is turned to the left. Outputs from the amplifiers 141 and 142 are supplied to a rear wheel steering start adjusting circuit 144 through a mixing circuit 143. The adjusting circuit 144 adjusts the steering start position of the rear wheels by setting a voltage of 4 V until the front wheel steering angle is set at the reference angle, thereby preventing rear wheel steering. A control gradient adjusting circuit 145 adjusts a ratio of the rear wheel steering angle to the front wheel steering angle. A rear wheel maximum steering angle adjusting circuit 146 adjusts the maximum steering angle of the rear wheels. A velocity signal detected by a velocity sensor 106 also shown in FIG. 3B is supplied to a subtracter 148 through an F/V converter 147. The subtracter 148 converts the output from the adjusting circuit 146. As shown in FIG. 14A, when the velocity is increased to a value falling within the range between 0 and 10 km/h or to 20 km/h or 30 km/h, the steering start time of the rear wheels lags and is decreased with respect to the front wheel steering angle. In addition, the rear wheel maximum steering angle is decreased. When the velocity is high, the output voltage is set at 4 V, thereby inhibiting rear wheel steering. An output RV from the subtracter 148 represents the target steering angle of the rear wheels. The output from a sensor 60 also shown in FIG. 3A is supplied to amplifiers 149 and 150. The input signal to the amplifier 149 is amplified with reference to the voltage 4 V and is converted to a signal proportional to the rear wheel steering angle between the neutral position and the wheels turned to the right. The amplifier 150 inverts and amplifies the input signal with reference to the voltage of 4 V and converts it to a signal proportional to the rear wheel steering angle between the neutral position and the wheels turned to the left. Outputs from the amplifiers 149 and 150 are supplied to error amplifying circuits 152 and 153 through a mixing circuit 151. The output from the subtracter 148 is supplied to the amplifying circuits 152 and 153. Differences between the target steering angle and the actual steering angle of the rear wheels are amplified. The amplified signals are mixed by a mixing circuit 154, and the result is supplied to a PWM circuit 155. The PWM circuit 155 determines a pulse width in accordance with an output from a triangular wave oscillator 156 and the output from the mixing circuit 154. An output from the PWM circuit 155 is supplied to one input terminal of an AND gate 157. A lock pin position sensor 158 detects the position of the pin 136 shown in FIG. 10. When the pin 136 is released from the hole 135, the sensor 158 supplies a signal of H level to the other input terminal of the AND gate 157. An output from the AND gate 157 is supplied to a chopper circuit 159. When the output from the AND gate 157 is set at H level, the chopper circuit 159 is operated to drive the motor 121 shown in FIG. 10. An output FR from the amplifier 141 is supplied to a circuit 160 for detecting a right position of the front wheels. The circuit 160 generates a signal of H level when the front wheels are steered to the right from the neutral position. The signal of H level is supplied to an exclusive OR gate 161. The output from the amplifying circuit 152 is supplied to a circuit 162 for detecting F>R. The circuit 162 generates a signal of H level when the target steering angle of the rear wheels is larger than the actual steering angle. The signal of H level is supplied to the exclusive OR circuit 161. An output from the exclusive OR gate 161 is supplied to one input terminal of a NAND gate 163. The output from the circuit 160 is supplied to an exclusive OR gate 164. The output RL from the amplifier 150 is supplied to a circuit 165 for detecting a left position of the rear wheels. The circuit 165 generates a signal of H level when the rear wheels are steered to the left from the neutral position. This H level signal is supplied to the exclusive OR gate 164. An output from the exclusive OR gate 164 is supplied to the other input terminal of the NAND gate 163 through an inverter 166. An output from the NAND gate 163 is supplied to an exclusive OR gate 167. An output from the exclusive OR gate 167 is supplied to one input terminal of an AND gate 168 and to one input terminal of an AND gate 180 through an inverter 169. An output from the AND gate 168 is supplied to a rotational direction changing circuit 182 through a rear wheel right steering drive circuit 181. A drive current from the changing circuit 182 flows in the motor 121 when the output from the AND gate 157 is set by the chopper circuit 159 at H level. The motor 121 steers the rear wheels to the right. An output from the AND gate 180 is supplied to the changing circuit 182 through a rear wheel left steering drive circuit 183. When the output from the AND gate 180 and 157 are set at H level, the chopper circuit 159 drives the motor 121, thereby steering the rear wheels to the left. The output from the circuit 160 is supplied to one input terminal of a NAND gate 185 through an inverter 184, and the other terminal thereof receives the output from the exclusive OR gate 164. An output from the NAND gate 185 is supplied to the exclusive OR gate 167. An output F=R from the mixing circuit 154 is supplied to a circuit 186 for detecting F=R. The circuit 186 supplies a signal of H level to the other input terminal of each of the AND gates 168 and 180 and OR gates 187 and 188 when the difference between the actual steering angle of the rear wheels and the target steering angle exceeds a predetermined value. The output from the exclusive OR gate 164 is supplied to the OR gates 187 and 188. The output RV from the subtracter 148 is supplied to a circuit 189 for detecting the neutral position of the rear wheels. The circuit 189 supplies a signal of H level to the OR gate 188 when the front wheels are being steered even after the rear wheel start point. An output from the OR gate 187 is supplied to a brake drive circuit 190. The drive circuit 190 is connected to the coil 130 shown in FIG. 10. When an output from the OR gate 187 is set at H level, the coil 130 is energized to release the brake mechanism in FIG. 10. An output from the OR gate 188 is supplied to a lock pin drive circuit 191. The drive circuit 191 is connected to the coil 138 of FIG. 11. When an output from the OR gate 188 is set at H level, the coil 138 is energized to retract the pin 136 from the hole 135. Reference symbol B denotes a battery; and S3, an ignition key switch. Reference numeral 192 denotes a constant voltage circuit.

The operation of the electronic rear wheel steering apparatus is substantially the same as the hydraulic rear wheel steering apparatus of the first embodiment and will only be briefly described hereinafter.

A case will be exemplified wherein steering of the rear wheels is described when the steering wheel 38 is turned to the right. When the steering wheel 38 is turned to steer the front wheels to the right, an output voltage from the sensor 140 is increased. The output voltage from the sensor 140 is converted by the amplifier 141 and is then supplied to the subtracter 148. An output from the sensor 105 is supplied to the subtracter 148 through the F/V converter 147. When the front wheel steering angle exceeds a rear wheel steering start point determined in accordance with the velocity, an output from the subtracter 148 exceeds 4 V. The output from the subtracter 148 is supplied to the amplifying circuit 152. An output from the sensor 59 is supplied to the amplifying circuits 151 and 152. The differences between the target steering angles and the actual steering angles of the rear wheels are amplified, and amplified signals are supplied to the PWM circuit 155 through the mixing circuit 154. The PWM circuit 155 determines a pulse width of the H level signal in accordance with the outputs from the mixing circuit 154 and the triangular wave oscillator 156. An output from the PWM circuit 155 is supplied to one input terminal of the AND gate 157. Since the output RV from the subtracter 148 exceeds 4 V, an output from the circuit 189 is set at H level. The output from the OR gate 188 is set at H level. The drive circuit 191 is operated to energize the coil 138. The pin 136 shown in FIG. 11 is retracted from the hole 135. When the difference between the target steering angle of the rear wheels and the actual steering angle is larger than the predetermined value, the output from the circuit 186 is set at H level. The output from the OR gate 187 is set at H level, and the drive circuit 190 is operated to energize the coil 130. As a result, the member 128 is released against the biasing force of the spring 129. Since the pin 136 is removed from the hole 135, the sensor 158 supplies a signal of H level to the other input terminal of the AND gate 157. Since one input terminal of the AND gate 157 receives the pulse signal as described above, the AND gate 157 supplies a signal of H level to the chopper circuit 159 in response thereto. Since the front wheels are steered to the right, the circuit 160 supplies a signal of H level to the exclusive OR gate 161. Since the rear wheels are located at the neutral position, the circuit 162 supplies a signal of H level to the exclusive OR gate 161. The circuit 165 supplies a signal of L level to the exclusive OR gate 164. As a result, the output from the AND gate 180 is set at H level, and the H level signal is supplied to the changing circuit 182 through the drive circuit 183. The DC polarities of the signals supplied from the power source to the motor 121 are changed so as to steer the rear wheels to the left. An average current controlled by the chopper circuit 159 flows in the motor 121. The motor 121 is rotated to steer the rear wheels to the left. When the rear wheel steering angle becomes equal to the target steering angle, an output from the AND gate 157 goes low to stop the motor 121. At the same time, the output from the circuit 186 is set at L level, and the coil 130 is deenergized to actuate the brake mechanism. When the steering wheel 38 is further rotated to the right, the above operation is repeated.

When the velocity is constant, the rear wheels are steered in a stepped manner as is indicated by dotted line A of FIG. 5.

A case will be described wherein the steering wheel 38 is turned to the right and then to the left. In this case, when the front wheels are steered to the left, an output voltage from the sensor 140 is decreased. This output is voltage-converted by the amplifier 141 and is supplied to the subtracter 148. An output voltage from the subtracter 148 is also decreased and is supplied to the amplifying circuit 153. An output from the sensor 59 is also supplied to the amplifying circuit 153 through the amplifier 150. The difference between the steering angle of the rear wheels and their target steering angle is amplified by the amplifying circuit 153. The amplified signal is supplied to the PWM circuit 155 through the mixing circuit 154. The PWM circuit 155 calculates a pulse width in accordance with the outputs from the mixing circuit 154 and the oscillator 156. The pulse width signal is supplied to one input terminal of the AND gate 157. When the difference between the actual and target steering angles of the rear wheels exceeds a predetermined value, the brake mechanism is released as described above. At the same time, since the output RV from the subtracter 148 exceeds 4 V, the pin 136 is removed from the hole 135. The sensor 158 supplies a signal of H level to the other input terminal of the AND gate 157. As a result, the AND gate 157 supplies a signal of H level to the chopper circuit 159 while the H level pulse is supplied to the AND gate 157, thereby driving the motor 121. Since the front wheels are kept in the steering position to the right of the neutral position, the circuit 160 supplies a signal of H level to the exclusive OR gate 161. Furthermore, since the actual steering angle of the rear wheels is larger than their target steering angle, the circuit 162 supplies a signal of L level to the exclusive OR gate 161. Since the rear wheels are kept in the steering position to the left of the neutral position, the circuit 165 supplies a signal of H level to the exclusive OR gate 164. As a result, the output from the AND gate 168 is set at H level, and the H level signal is supplied to the changing circuit 182 through the drive circuit 181. The motor 121 is driven to steer the rear wheels to the right. When the actual steering angle of the rear wheels becomes equal to their target steering angle, the output from the AND gate 157 goes low to stop the motor 121. At the same time, the output from the circuit 186 goes low to deenergize the coil 130, thereby actuating the brake mechanism. When the steering wheel 38 is further rotated to the left, the above operation is repeated. When the velocity is constant, the rear wheels are steered in a stepped manner as is indicated by dotted line B of FIG. 5. When the front wheels are steered between the rear wheel steering start position and the neutral position and the output RV from the subtracter 148 is set at 4 V, the output from the circuit 189 is set at L level and the coil 138 is deenergized. The pin 136 biased by the spring 137 is extended into the hole 135.

A case will be described wherein the steering wheel 38 is steered from the neutral position to the left. When the steering wheel 38 is rotated to the left (i.e., counterclockwise), an output voltage from the sensor 140 is decreased. The output from the sensor 140 is voltage-converted by the amplifier 142 and is supplied to the subtracter 148. An output from the sensor 105 is supplied to the subtracter 148 through the circuit 147. When the front wheel steering angle exceeds the rear wheel steering start point determined by a velocity, an output voltage from the subtracter 148 is higher than 4 V. This output from the subtracter 148 is supplied to the amplifying circuit 152. An output from the sensor 59 is also supplied to the amplifying circuit 152. The amplifying circuit 152 amplifies the difference between the actual and target steering angles of the rear wheels. The amplified signal is supplied to the PWM circuit 155 through the mixing circuit 154. The PWM circuit 155 calculates a pulse width in accordance with the outputs from the mixing circuit 154 and the oscillator 156. The pulse width signal is supplied to one input terminal of the AND gate 157. When the difference between the actual and target steering angles of the rear wheels exceeds a predetermined value, the brake mechanism is deactivated. Since the output RV from the subtracter 148 is higher than 4 V, the pin 136 is removed from the hole 135. The sensor 158 supplies a signal of H level to the other input terminal of the AND gate 157. As a result, the AND gate 157 supplies a signal of H level to the chopper circuit 159 while the H level pulse is supplied to the AND gate 157. Since the front wheels are kept in the steering position to the left of the neutral position, the output FR from the amplifier 141 is set at L level and the detector 160 supplies a signal of L level to the exclusive OR gate 161. The rear wheels are kept in the neutral position. In this manner, since the actual steering angle of the rear wheels is smaller than the target steering angle, the circuit 162 supplies a signal of H level to the exclusive OR gate 161. As described above, the rear wheels are kept in the neutral position and the circuit 165 supplies a signal of L level to the exclusive OR gate 164. The output from the AND gate 168 is thus set at H level, and the drive circuit 181 supplies a signal of H level to the changing circuit 182, thereby controlling the polarities of the DC power supplied to the motor 121. The motor 121 is rotated at the average current with the polarities controlled by the chopper circuit 159. Thus, the rear wheels are steered to the right. When the actual steering angle of the rear wheels becomes equal to the target steering angle, the output from the AND gate 157 goes low to stop the motor 121. At the same time, the output from the circuit 186 goes low to deenergize the coil 130, and the brake mechanism is then actuated. When the steering wheel 38 is rotated to the left, the above operation is repeated. The rear wheels are steered in a stepped manner as indicated by dotted line A' of FIG. 5 when the velocity is constant.

A case will be described wherein the steering wheel 38 is rotated to the left and then to the right. In this case, when the front wheels turn to the right, an output voltage from the sensor 140 is increased. The output from the sensor 140 is voltage-converted by the amplifier 142 and is supplied to the subtracter 148. An output from the subtracter 148 is decreased and is supplied to the amplifying circuit 153. An output from the sensor 59 is supplied to the amplifying circuit 153 through the amplifier 149. The amplifying circuit 153 amplifies the difference between the actual and target steering angles of the rear wheels. The amplified signal is supplied to the PWM circuit 155 through the mixing circuit 154. The PWM circuit 155 calculates a pulse width in accordance with the outputs from the mixing circuit 154 and the oscillator 156. The pulse width signal is supplied to one input terminal of the AND gate 157. When the difference between the actual and target steering angles of the rear wheels exceeds the predetermined value, the brake mechanism is deactivated. Since the output RV from the subtracter 148 is higher than 4 V, the pin 136 is removed from the hole 135. The sensor 158 supplies a signal of H level to the other input terminal of the AND gate 157. As a result, the AND gate 157 supplies the signal of H level to the chopper circuit 159 to drive the motor 121 while the H level pulse is being supplied to the AND gate 157. Since the front wheels are kept in the steering positions to the left of the neutral position, the circuit 160 supplies a signal of L level to the exclusive OR gate 161. Furthermore, since the actual steering angle of the rear wheels is larger than the target steering angle, the circuit 162 also supplies a signal of L level to the exclusive OR gate 161. At the same time, the rear wheels are steered to the right, and the circuit 165 supplies a signal of L level to the exclusive OR gate 164. As a result, the output from the AND gate 180 is set at H level. A signal of H level is supplied to the changing circuit 182 through the drive circuit 183. The motor 121 is driven to steer the rear wheels to the left. When the actual steering angle of the rear wheels becomes equal to the target steering angle, the output from the AND gate 157 goes low to stop the motor 121. At the same time, the output from the circuit 186 goes low to deenergize the coil 130, thereby actuating the brake mechanism. When the steering wheel 38 further returns toward the neutral position, the above operation is repeated, and the rear wheels are steered stepwisely in the same manner as indicated by dotted line B' of FIG. 5. When the front wheels are steered between the rear wheel steering start position and the neutral position and the output RV from the subtracter 148 is set at 4 V, the output from the circuit 189 goes low to deenergize the coil 138. The pin 136 biased by the spring 137 is inserted in the hole 135. The control circuit shown in FIG. 12 controls low-velocity operations such as parking in a garage, a small turn or the like wherein the rear wheels are steered to the left when the front wheels are steered to the right, and vice versa so as to decrease the radius of rotation of the vehicle. As described with reference to the first embodiment wherein the rear wheels are controlled in the high velocity mode in addition to the low velocity mode to allow for smooth lane changing, the steering direction of the rear wheels must be changed. This can be performed by a control circuit of FIG. 13 obtained by modifying the control circuit of FIG. 12 in the following manner.

The signal from the sensor 105 is supplied to a rear wheel steering start point adjusting circuit 144, a control gradient adjusting circuit 145 and a rear wheel maximum steering angle adjusting circuit 146 through an F/V converter 147. As shown in FIG. 14B, the rear steering start point is switched between the steering angle range of ±150 degrees in the low velocity mode and ±15 degrees in the high velocity mode. The control gradient is adjusted such that the steering angle of the rear wheels is decreased when the velocity is increased from 0 km/h, 10 km/h, 20 km/h to 30 km/h in the low velocity mode and such that the steering angle of the rear wheels is increased when the velocity is increased to 50 km/h, 60 km/h, . . . in the high velocity mode. The maximum steering angle of the rear wheels is also adjusted as ±7 degrees in the low velocity mode and ±3 degrees in the high velocity mode. An output from the adjusting circuit 146 is given as RV, and is supplied to error amplifying circuits 152 and 153. An output V from a velocity sensor 105 is supplied to a velocity detecting circuit 193. The circuit 193 supplies a signal of H level to an exclusive OR gate 194 in the high velocity mode. The gate 194 also receives an output from an exclusive OR gate 164. An output from the exclusive OR gate 194 is supplied to an inverter 166, a NAND gate 185, and OR gates 187 and 188. The output from the circuit 193 is supplied to an exclusive OR gate 95. This gate 195 also receives an output from an exclusive OR gate 167. An output from the exclusive OR gate 195 is supplied to an AND gate 168 and an inverter 169.

Figures 1, 13:
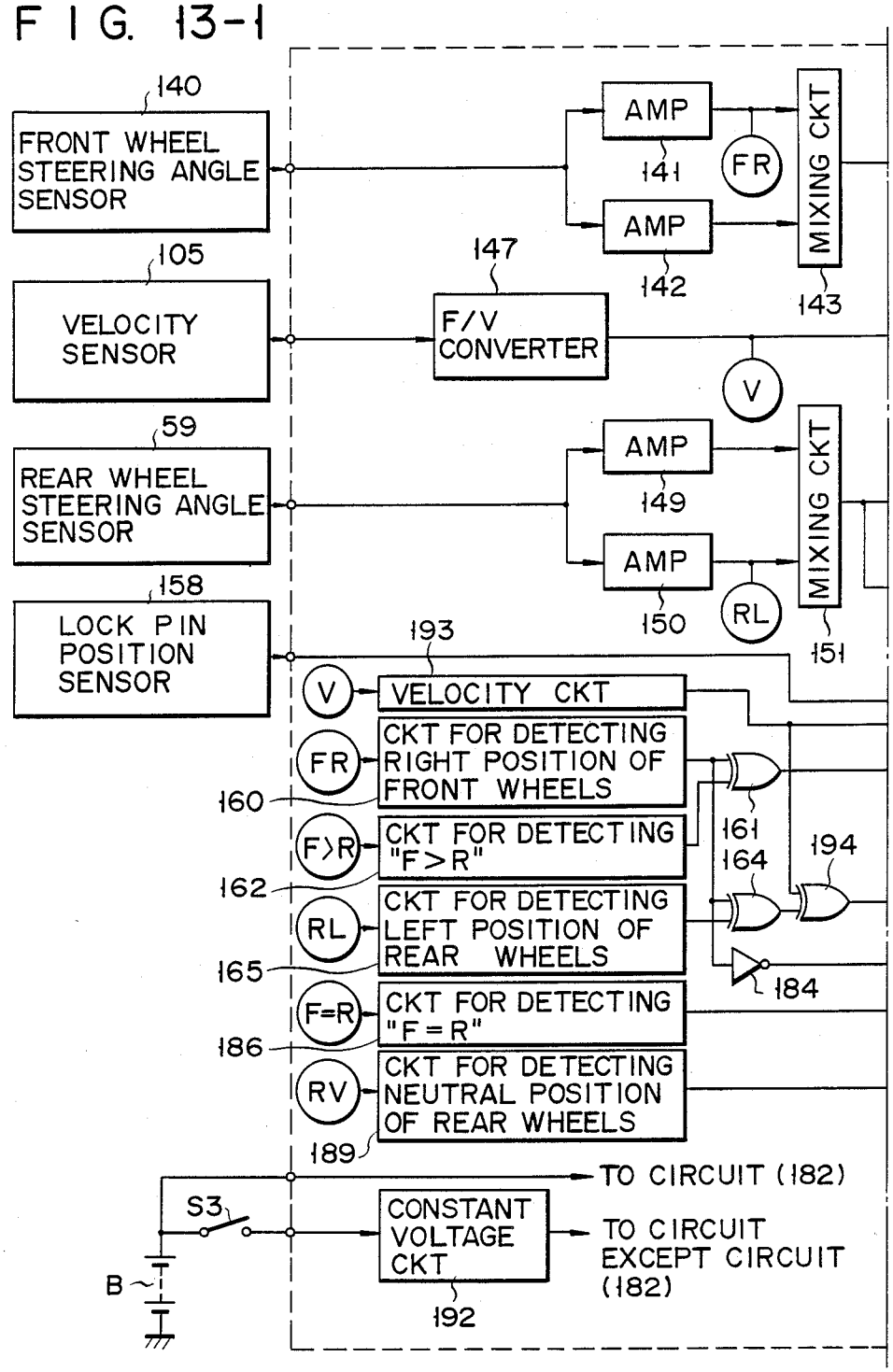
Figures 2, 13:
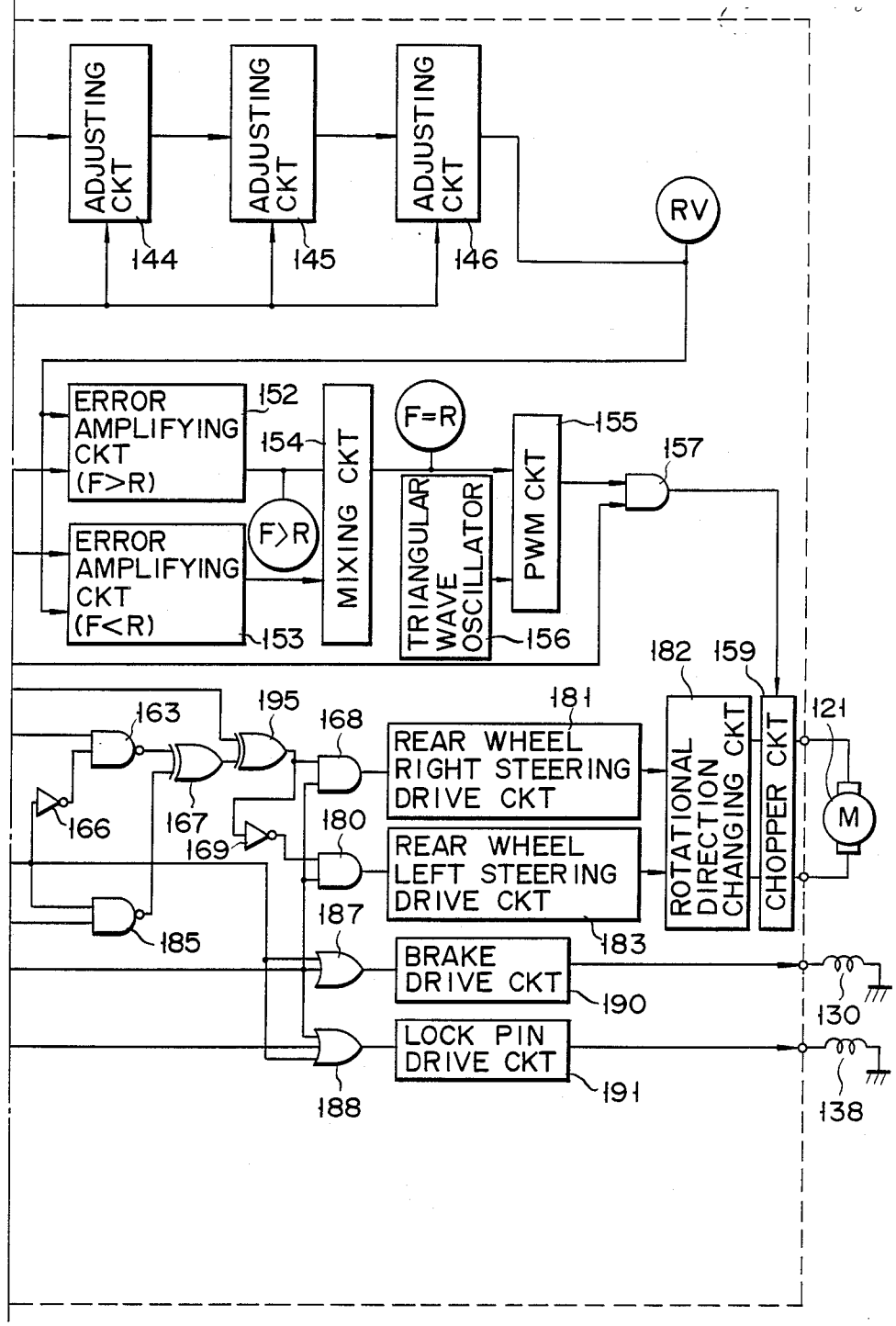

The operation of the control circuit shown in FIG. 13 will be described hereinafter. The low-velocity mode operation and the operation up to the chopper circuit 159 are the same as those in FIG. 12, and a detailed description thereof will be omitted. Only the main feature of the operation in the control circuit of FIG. 13 will be described wherein the rear wheels are steered in the high velocity mode in a direction opposite to that in the low velocity mode. The steering state of the rear wheels will be described when the front wheels are steered to the right in the high velocity mode (e.g., 50 km/h). An output from a circuit 160 for detecting a right position of the front wheels is set at H level, and a circuit 162 for detecting F>R is set at H level. An output from the exclusive OR gate 161 is set at L level. The rear wheels are kept in the neutral position, so that an output from a circuit 165 for detecting a left position of the front wheels is set at L level. An output from the exclusive OR gate 164 is set at H level. The output from the circuit 193 is set at H level, and an output from the exclusive OR gate 194 is set at L level. Outputs from the exclusive OR gate 195 and the AND gate 168 are set at H level to operate a rotational direction changing circuit 182 so as to steer the rear wheels to the right.

A case will be described wherein the front wheels are steered to the right and then returned to the neutral position. The output from the circuit 160 is set at H level, and the output from the circuit 162 is set at L level. The output from the exclusive OR gate 161 is thus set at H level. Since the rear wheels are steered to the right, the circuit 165 generates the output of L level. The output from the exclusive OR gate 164 is set at H level. Since the output from the circuit 193 is set at H level, the output from the exclusive OR gate 194 is set at L level. The output from the exclusive OR gate 195 thus goes low, and the output from the AND gate 180 goes high, thereby operating the changing circuit 182 to steer the rear wheels to the left.

When the front wheels are steered from the neutral position to the left in the high velocity mode, the output from the circuit 160 is set at L level, and the output from the circuit 162 is set at H level. The output from the exclusive OR gate 161 is thus set at H level. In this state, since the rear wheels are kept in the neutral position, the output from the circuit 165 is kept low, and then the output from the exclusive OR gate 164 is set at L level. Since the output from the circuit 193 is set at H level, the output from the exclusive OR gate 194 is set at H level. Therefore, the output from the exclusive OR gate 195 is set at L level, and the output from the AND gate 180 is set at H level, thereby operating the changing circuit 182 to steer the rear wheels to the left.

When the front wheels steered to the left return to the neutral position in the high velocity mode, the output from the circuit 160 is set at L level, and the output from the circuit 162 is set at L level. The output from the exclusive OR gate 161 is thus set at L level. Since the rear wheels are steered to the left, the output from the circuit 165 is set at H level, and then the output from the exclusive OR gate 194 is set at L level. The outputs from the exclusive OR gate 195 and the AND gate 168 go high to operate the changing circuit 182 so as to steer the rear wheels to the right.

In the above embodiment, in the same manner as in the first and second embodiments, the front and rear wheels are steered in the opposing directions in the low velocity mode and in the same direction in the high velocity mode. At the same time, the steering angle of the rear wheels can be changed in a stepped manner in accordance with the change in front wheel steering angle. In this embodiment, the pipes and the reservoir of the first and second embodiments can be omitted, thereby providing a compact rear wheel steering apparatus. When the intermediate velocity range of 20 km/h to 40 km/h as described with reference to the first embodiment is provided between the high velocity mode (for steering the front and rear wheels in the same direction) and the low velocity mode (for steering the front and rear wheels in the opposing directions), the rear wheels may not be further steered unlike in the first embodiment and may return only to the neutral position.

Figure 15:
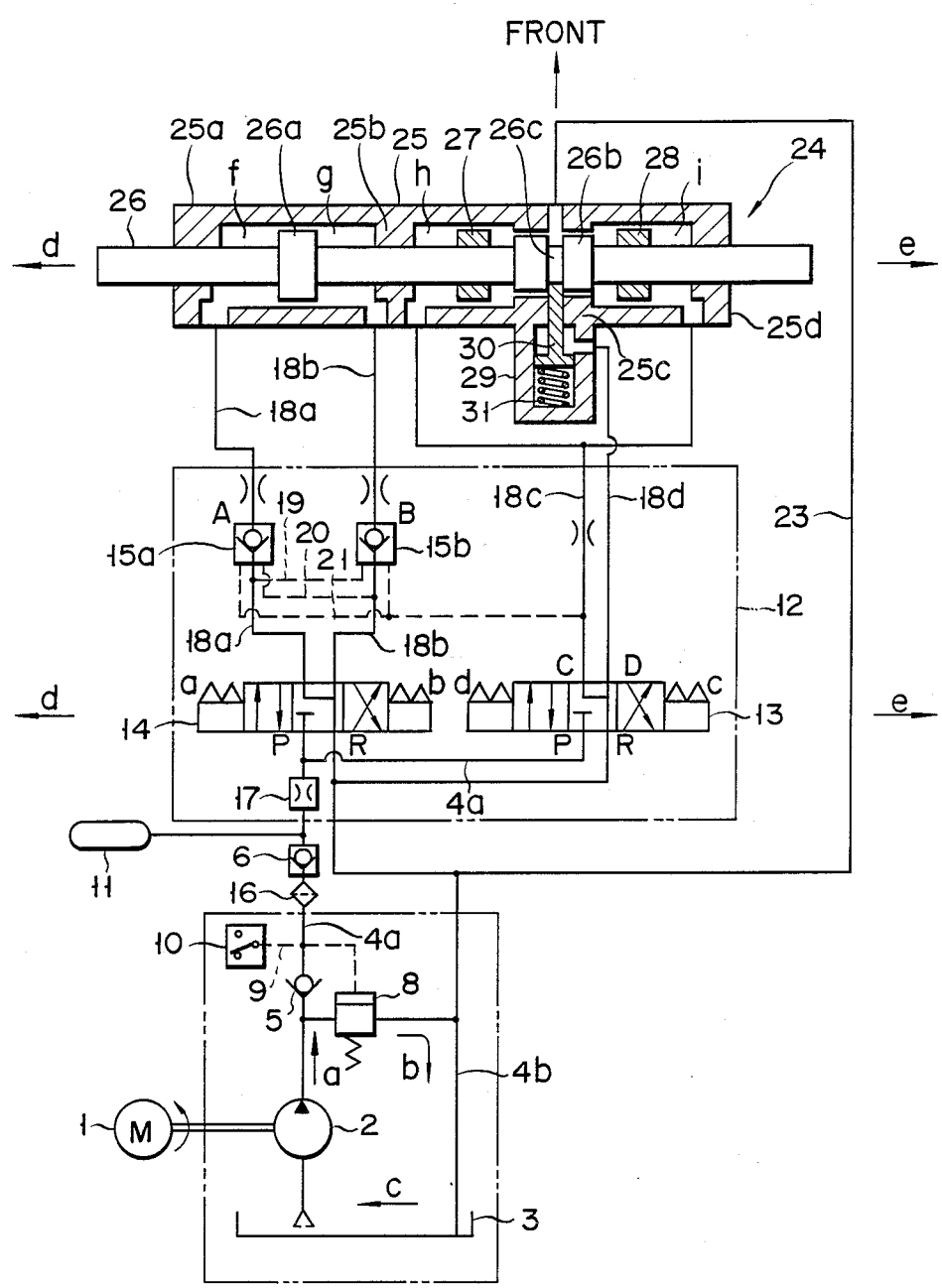
FIG. 15 is a system diagram of a hydraulic circuit when a control circuit according to a fourth embodiment is kept inactive.

A fourth embodiment of the present invention will be described with reference to FIGS. 15 to 19B. The same reference numerals as in the fourth embodiment denote the same parts as in the first and second embodiments, and a detailed description thereof will be omitted. FIG. 15 shows a hydraulic circuit when the rear wheels are kept in the neutral position. The differences between the hydraulic circuit (FIG. 2A) of the first embodiment and the hydraulic circuit (FIG. 15) of the fourth embodiment are given as follows: (1) The valve 13 comprises a bidirectional selector valve in the first embodiment but a four-directional selector valve in the fourth embodiment; (2) The valve 15c is arranged in the passage 18c, and the passage 22 is provided to connect the valve 15c and the passage 18d in the first embodiment. However, according to the fourth embodiment, the valve 15c and the passage 22 are omitted; and (3) in order to supply the compressed oil to the chambers h and i of the cylinder 25 and remove the compressed oil from the body 29, the valve 13 is kept in a neutral position in the first embodiment, but a solenoid coil d is energized in the fourth embodiment.

The valve 13 is kept in the neutral position to set the piston rod 26 in the neutral position in the first embodiment. However, according to the fourth embodiment, the coil d is energized. Other operations in the fourth embodiment are the same as those in the first embodiment, and a detailed description thereof will be omitted.

Figures 1, 16A:
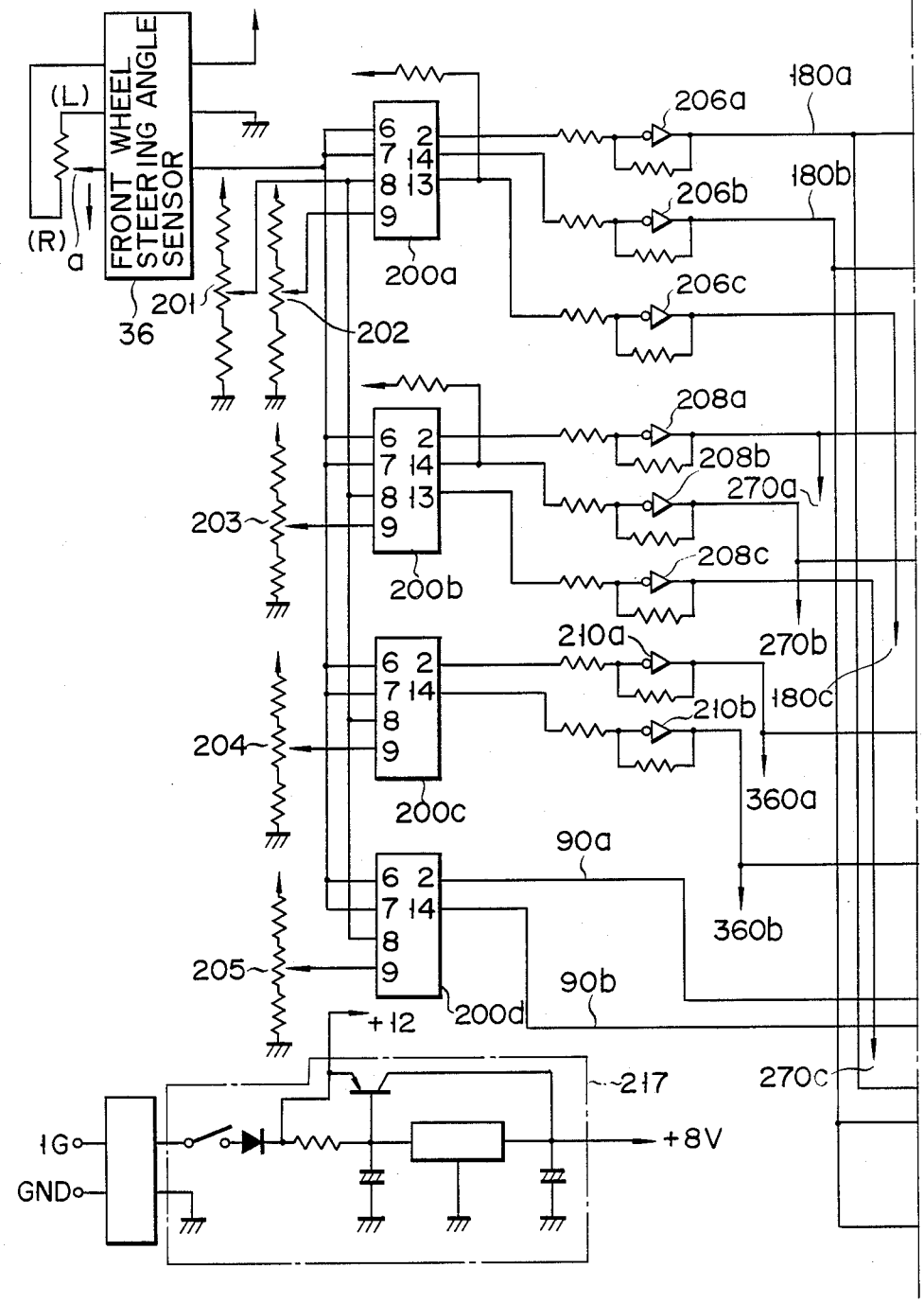
FIGS. 16A to 16C are respectively circuit diagrams of the control circuit of the fourth embodiment of the present invention.
Figures 2, 16A:
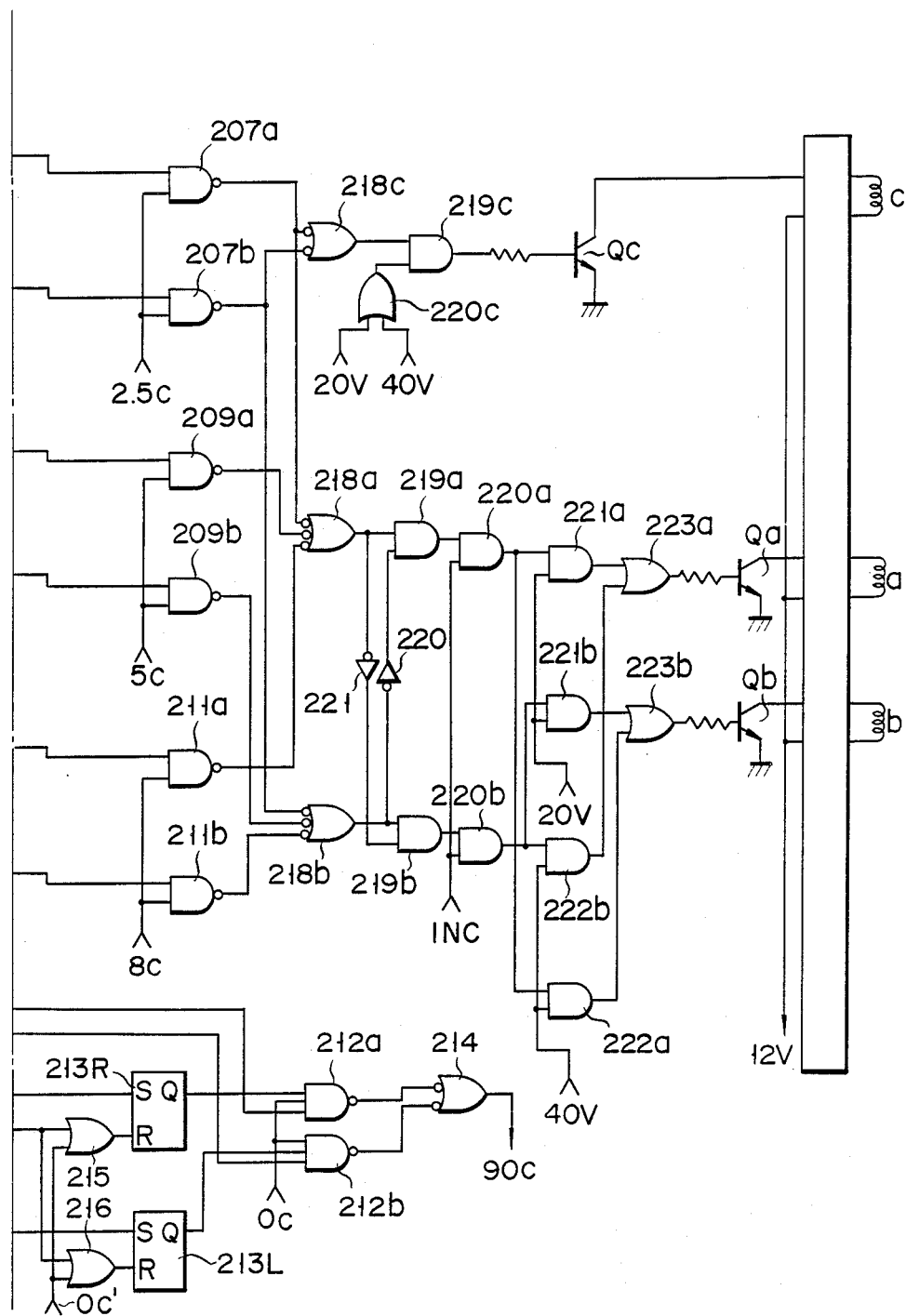
Figures 1, 16B:
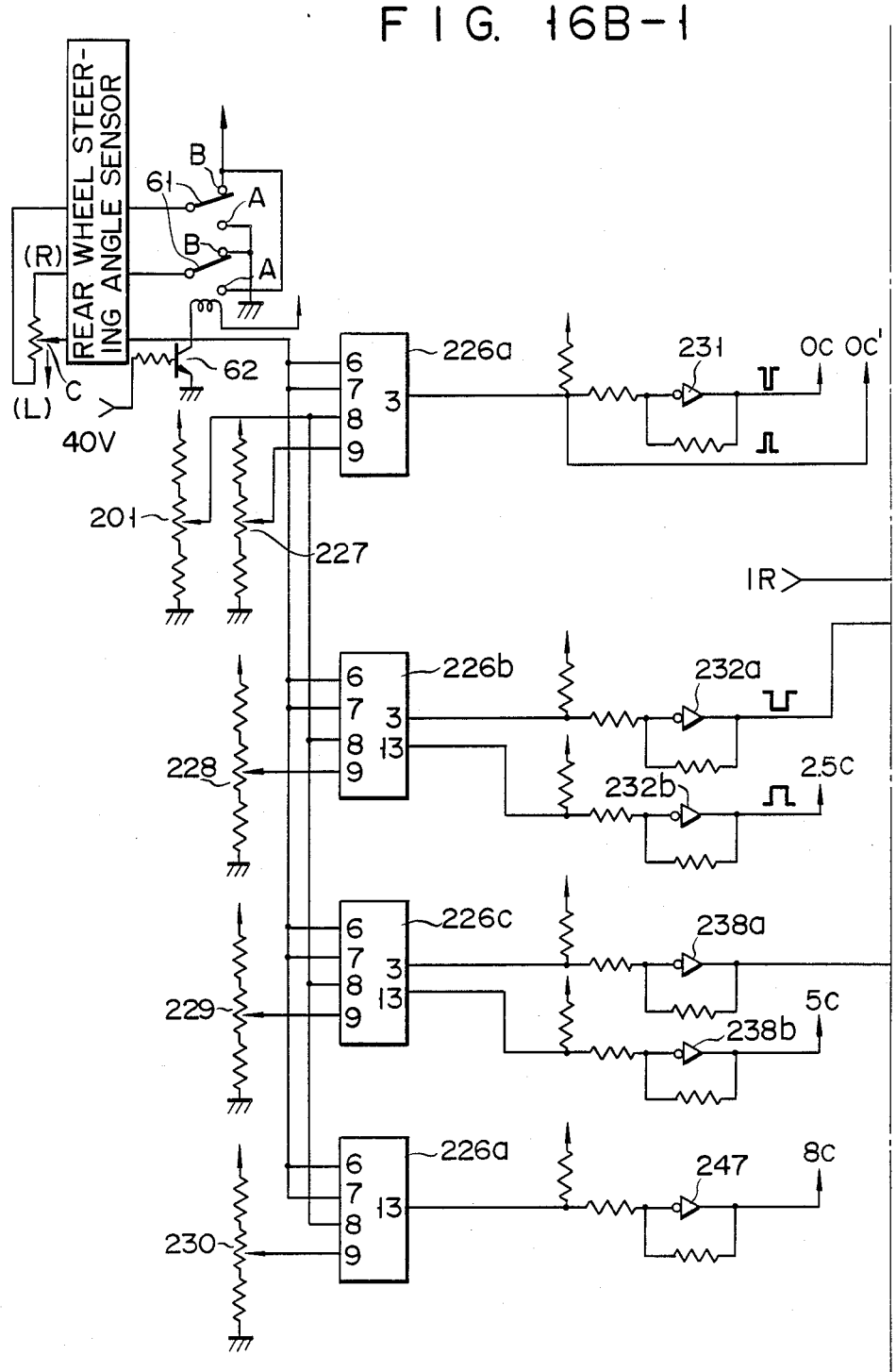
Figures 2, 16B:
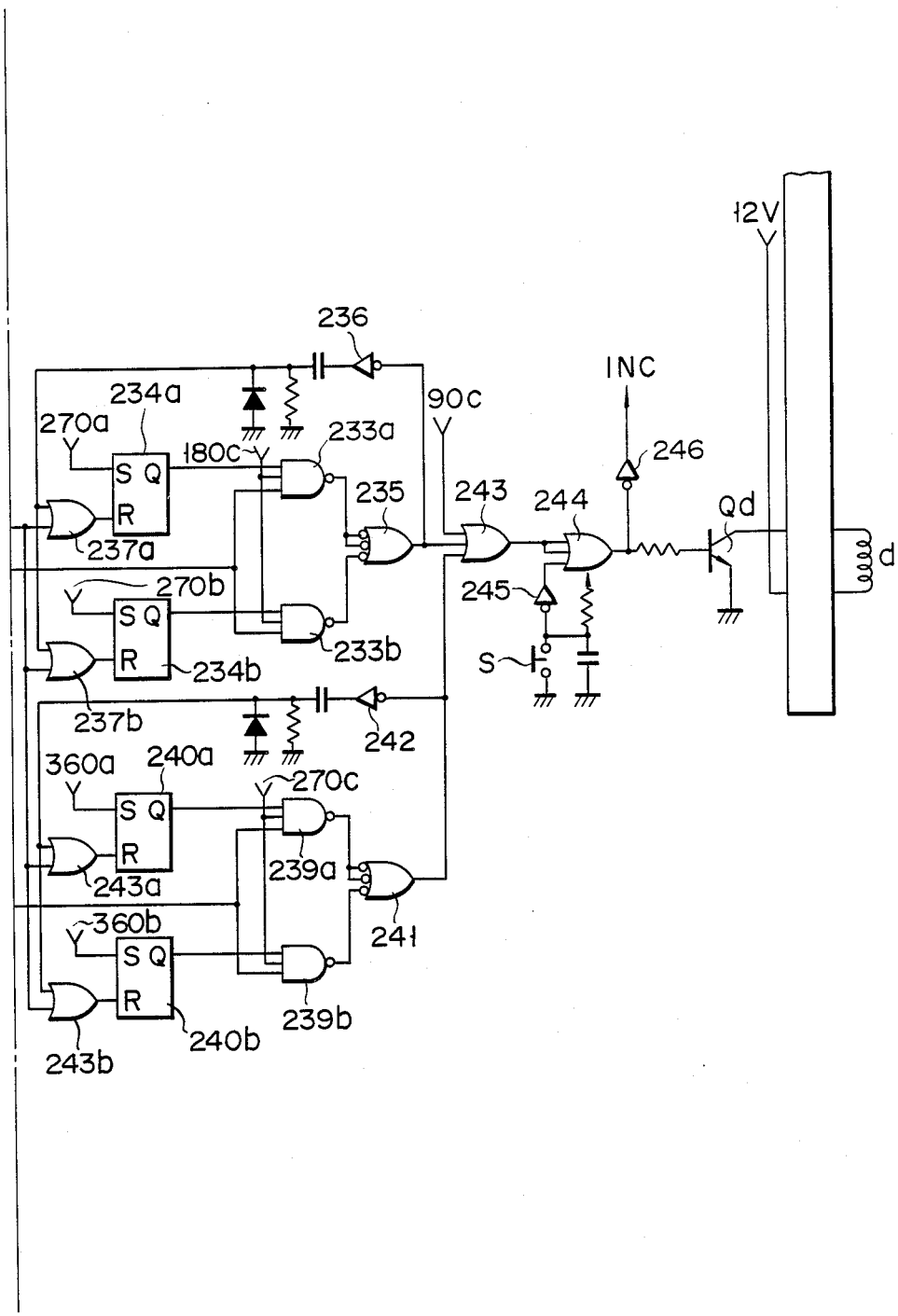

A control unit 37 will be described in detail with reference to FIG. 16, wherein coils a to d shown in FIG. 15 are selectively driven to steer the rear wheels. The main feature of the present invention will be described with reference to FIG. 17 wherein the rear wheels are steered in a stepped manner. When the clockwise (i.e., right direction) steering angle and the counterclockwise (i.e., left direction) steering angle of the steering wheel 38 are defined as $\theta f$ and $\theta r$, respectively, the rear wheels are steered in a stepped manner, as shown in FIG. 17. The solid line represents a locus of steering angles $\theta r$ of the rear wheels when the front wheels are steered from the neutral position to the right and left. The dotted line represents a locus of the steering angles $\theta r$ of the rear wheels when the front wheels return to the neutral position. The steering angles $\theta r$ of the rear wheels upon steering and returning of the front wheels have a hysteresis characteristic. When the steering wheel 38 is rotated through 180 degrees to the right, the rear wheels are steered 2.5 degrees to the right in the high velocity mode or to the left in the low velocity mode. However, when the steering wheel 38 is rotated from 180 degrees to 90 degrees, the rear wheels have a steering angle of 0 degrees (i.e., the neutral position). A case will be described wherein the rear wheels are steered in three steps (i.e., ±2.5 degrees, ±5.0 degrees and ±8.0 degrees) when the steering angle $\theta f$ of the steering wheels changes within the range of 0 to ±360 degrees. Referring to FIG. 16A, the contact of the sensor 36 is moved in the direction indicated by the arrow when the steering wheel 38 is rotated to the right and in a direction opposite to that indicated by the arrow when the steering wheel 38 is rotated to the left. More specifically, when the steering wheel 38 is rotated to the right, a voltage generated from the sensor 36 is increased. However, when the steering wheel 38 is rotated to the left, the voltage generated from the sensor 36 is decreased. The sensor 36 generates a voltage signal (to be referred to as a steering signal $\theta f$ hereinafter) proportional to a steering angle falling within the range of −360 degrees to +360 degrees of the steering wheel 38. This voltage signal is supplied to fifth to eighth window comparators 200a to 200d. The comparators 200a to 200d comprise TCA965s available from Siemens Components Co., Ltd to provide the preset steering angle range means for developing a plurality of preset steering angle ranges. The steering signal $\theta f$ is supplied to the "6" and "7" terminals of each of the comparators 200a to 200d. The comparator 200a detects when the steering wheel 38 is rotated through ±180 degrees. The comparator 200b detects when the steering wheel 38 is rotated through ±270 degrees. The comparator 200c detects when the steering wheel 38 is rotated through ±360 degrees. The comparator 200d detects when steering wheel 38 is rotated through ±90 degrees. In order to perform these functions, the "8" terminal of each of the comparators 200a to 200d receives a potential V8 supplied by a resistor 201 for determining the center value of the window. The window half width value of the comparator 200a is determined by a potential V9 which is applied to the "9" terminal and is supplied by a resistor 202. Similarly, the window half width value of the comparator 200b is determined by a potential V9 which is applied to the "9" terminal and is supplied by a resistor 203; the window half width value of the comparator 200c is determined by a potential V9 which is applied to the "9" terminal and is supplied by a resistor 204; and the window half width value of the comparator 200d is determined by a potential V9 which is applied to the "9" terminal and is supplied by a resistor 205.

Figure 18A:
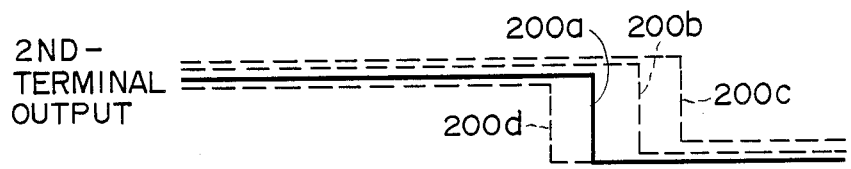
FIGS. 18A to 18C. are respectively timing charts each showing output signals from fifth to eighth window comparators of the fourth embodiment.
Figure 18B:
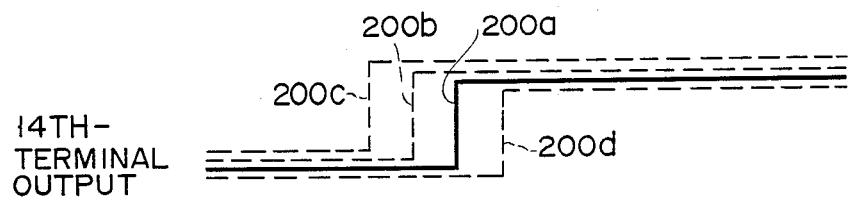
Figure 18C:
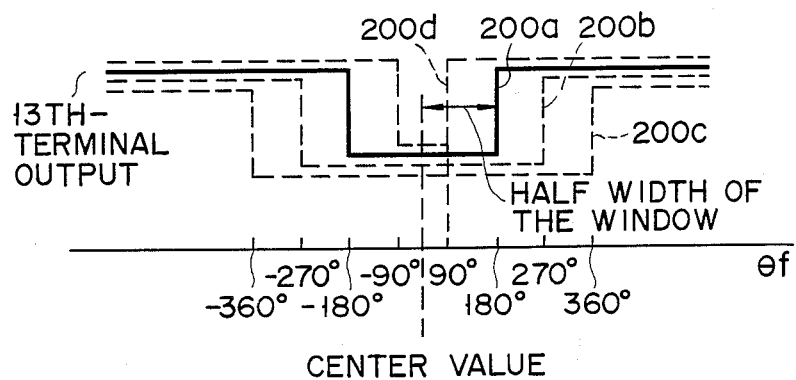

The waveforms of the outputs from the comparators 200a to 200d will be described with reference to FIGS. 18A to 18C. Referring to FIG. 18A, an output at the "2" terminal of each of the comparators 200a to 200d is set at L level when the voltages applied to the "6" and "7" terminals exceed a voltage of V8+V9. As shown in FIG. 18B, an output at the "14" terminal of each of the comparators 200a to 200d is set at L level when the voltages applied to the "6" and "7" terminals are less than a voltage of V8−V9. As shown in FIG. 18C, an output at the "13" terminal is set at L level when voltages applied at "6" and "7" fall within the range between the voltage of V8+V9 and the voltage of V8–V9. Since the voltages V9 of the comparators 200a to 200d are different, the output waveforms thereof are represented by the same reference numerals as the comparators. As shown in FIG. 18C, the window half width values are increased in an order of the comparators 200d, 200a, 200b and 200c. The level switching occurs when the steering angles of the steering wheel 38 are given as ±90 degrees, ±180 degrees, ±270 degrees and ±360 degrees.

Referring again to FIG. 16A, an output from the "2" terminal of the comparator 200a is supplied as a signal 180a to one input terminal of a NAND gate 207a through an inverter 206a. An output from the "14" terminal of the comparator 200a is supplied as a signal 180b to one input terminal of a NAND gate 207b through an inverter 206b. An output from the "13" terminal of the comparator 200a is generated as a signal 180c through an inverter 206c. The signals 180a to 180c have the inverted waveforms of the signals shown in FIGS. 18A to 18C. The signal 180a is set at H level when the steering wheel 38 is rotated through 180 degrees to the right. The signal 180b is set at H level when the steering wheel 38 is rotated through 180 degrees to the left. The signal 180c is set at H level when the steering wheel 38 is rotated within ±180 degrees.

An output from the "2" terminal of the comparator 200b is supplied as a signal 270a to one input terminal of a NAND gate 209a through an inverter 208a. An output from the "14" terminal of the comparator 200b is supplied as a signal 270b to one input terminal of a NAND gate 209b through an inverter 208b. An output from the "13" terminal is generated as a signal 270c through an inverter 208c. The signals 270a to 270c have the inverted waveforms of the signals shown in FIGS. 18A to 18C. The signal 270a is set at H level when the steering wheel 38 is rotated through 270 degrees to the right. The signal 270b is set at H level when the steering wheel 38 is rotated through 270 degrees to the left. The signal 270c is set at H level when the steering wheel 38 is rotated within ±270 degrees. An output from the "2" terminal of the comparator 200c is supplied as a signal 360a to one input terminal of a NAND gate 211a through an inverter 210a. An output from the "14" terminal of the comparator 200c is supplied as a signal 360b to one input terminal of a NAND gate 211b through an inverter 210b. The signals 360a and 360b have the inverted waveforms of the signals shown in FIGS. 18A and 18B, respectively. The signal 360a is set at H level when the steering wheel 38 is rotated through 360 degrees to the right, and the signal 360b is set at H level when the steering wheel 38 is rotated through 360 degrees to the left.

An output from the "2" terminal of the comparator 200d is supplied as a signal 90a to a NAND gate 212a, and an output from the "14" terminal thereof is supplied as a signal 90b to a NAND gate 212b. The signals 90a and 90b have the same waveforms as those of the signals shown in FIGS. 18A and 18B, respectively. The signal 90a is set at L level when the steering wheel 38 is rotated to the right through an angle larger than 90 degrees. The signal 90b is set at L level when the steering wheel 38 is rotated to the left through an angle larger than 90 degrees.

The signal 180a is supplied to the S input terminal of a flip-flop 213R which is set when the steering wheel 38 is rotated to the right through an angle larger than 180 degrees. The signal 180b is supplied to the S input terminal of a flip-flop 213L which is set when the steering wheel 38 is rotated to the left through an angle larger than 180 degrees. A Q output from the flip-flop 213R is supplied to the NAND gate 212a, and a Q output from the flip-flop 213L is supplied to the NAND gate 212b. Outputs from the NAND gates 212a and 212b are inverted, and the inverted signals are supplied to an OR gate 214. An output from the OR gate 214 is generated as a signal 90c. The signal 90c has the inverted waveform of the signal shown in FIG. 18C. When the steering wheel 38 is rotated within ±90 degrees, the signal 90c is set at H level. Reference numeral 217 denotes a power source circuit which supplies voltages of +8 V and +12 V to the respective components.

An output from the NAND gate 207a is inverted, and the inverted signal is supplied to OR gates 218c and 218a. An output from the NAND gate 207b is inverted, and an inverted signal is supplied to OR gates 218c and 218b. Outputs from the NAND gates 209a and 211a are inverted, and the inverted signals are supplied to the OR gate 218a. Outputs from the NAND gates 209b and 211b are inverted, and the inverted signals are supplied to an OR gate 218b. An output from the OR gate 218c is supplied to one input terminal of an AND gate 219c. Signals 20 V and 40 V to be described later are supplied to an OR gate 220c, and an output therefrom is supplied to the other input terminal of the AND gate 219c. An output from the AND gate 219c is supplied to the base of the transistor Qc for driving the coil c. The collector of the transistor Qc is connected to the coil c shown in FIG. 15. An output from the OR gate 218a is supplied to one input terminal of an AND gate 219a, and the other input terminal thereof receives an output from the OR gate 218b through an inverter 220. An output from the OR gate 218b is supplied to one input terminal of an AND gate 219b, and the other input terminal thereof receives an output from the OR gate 218a through an inverter 221. The inverters 220 and 221 prevent simultaneous energizing of the coils a and b. An output from the AND gate 219a is supplied to one input terminal of an AND gate 220a, and an output from the AND gate 219b is supplied to one input terminal of an AND gate 220b. An inhibit signal INC to be described later is supplied to the other input terminal of each of the AND gates 220a and 220b. The inhibit signal INC is set at L level when the coil d is energized. The signal INC prevents energizing of the coils a and b when the wheels return to the neutral position. An output from the AND gate 220a is supplied to one input terminal of each of AND gates 221a and 222a. An output from the AND gate 220b is supplied to one input terminal of each of AND gates 221b and 222b. A signal 20 V to be described later is supplied to the other input terminal of each of the AND gates 221a and 221b. A signal 40 V to be described later is supplied to the other input terminal of each of the AND gates 222a and 222b. The signal 20 V is set at H level when the velocity is less than 20 km/h. The signal 40 V is set at H level when the velocity is higher than 40 km/h. Outputs from the AND gates 221a and 222b are supplied to an OR gate 223a. Outputs from the AND gates 222a and 221b are supplied to an OR gate 223b. An output from the OR gate 223a is supplied to the base of a transistor Qa for driving the coil a. The collector of the transistor Qa is connected to the coil a shown in FIG. 16A. An output from the OR gate 223b is supplied to the base of a transistor Qb for driving the coil b. The collector of the transistor Qb is connected to the coil b shown in FIG. 16A.

The arrangement of the control unit will be described with reference to FIG. 16B. Referring to FIG. 16B, the contact of the rear wheel steering angle sensor 60 for detecting the steering angle θr of the rear wheels is moved in the direction indicated by the arrow when the rear wheels are steered to the left. However, the contact is moved in a direction opposite to that indicated by the arrow when the rear wheels are steered to the right. In other words, when the rear wheels are steered to the left, a voltage from the sensor 60 is increased in the low velocity mode and is decreased in the high velocity mode. However, when the rear wheels are steered to the right, the voltage from the sensor 60 is decreased in the low velocity mode and is increased in the high velocity mode. The sensor 60 generates a voltage signal proportional to the steering angle θr falling within the range of −8 degrees (right direction or clockwise) to +8 (left direction or counterclockwise). This voltage signal is supplied to ninth to twelfth window comparators 226a to 226d. The comparators 226a to 226d have the same arrangement as that of the comparators 200a to 200d and comprise TCA965s available from Siemens Components Co., Ltd., U.S.A. The steering signal θr is supplied to the "6" and "7" terminals of each of the comparators 226a to 226d. The comparator 226a detects that the rear wheels are kept at the neutral position. The comparator 226b detects that the rear wheels are steered through ±2.5 degrees. The comparator 226c detects that the rear wheels are steered through ±5 degrees. The comparator 226d detects that the rear wheels are steered through ±8 degrees. The "8" terminal of each of the comparator 226a to 226d receives a potential V8 supplied by a resistor 201 for determining a center value of the window. The center value of the comparators 226a to 226d is the same as that of the comparators 200a to 200d. The window half width of the comparator 226a is set by a potential V9 which is received at the "9" terminal and is supplied by a resistor 227. Similarly, the window half width of the comparator 226b is set by a potential V9 which is received at the "9" terminal and is supplied by a resistor 228; the window half width of the comparator 226c is set by a potential V9 which is received at the "9" terminal and is supplied by a resistor 229; and the window half width of the comparator 226d is set by a potential V9 which is received at the "9" terminal and is supplied by a resistor 230.

Figure 19A:
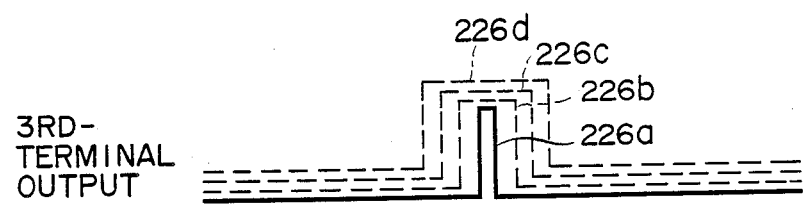
FIGS. 19A to 19B are respectively timing charts each showing output signals from ninth to twelfth window comparators of the fourth embodiment.
Figure 19B:
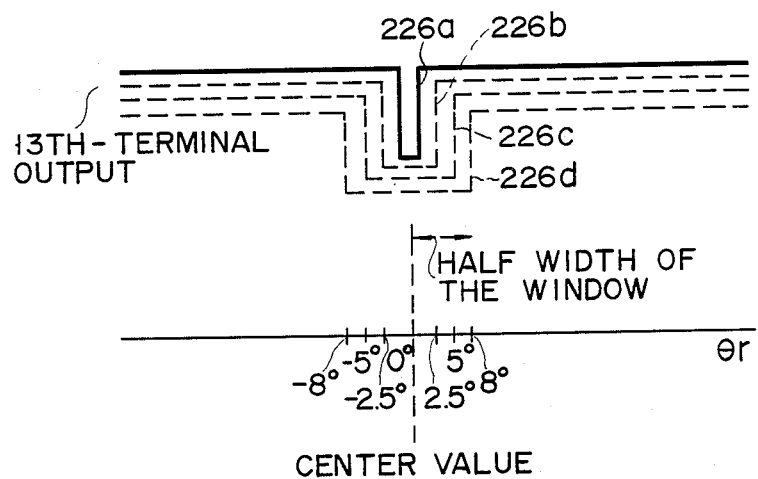

The waveforms of the outputs from the comparators 226a to 226d will be described with reference to FIG. 19. As shown in FIG. 19A, an output from the "3" terminal of each of the comparators 226a to 226d is set at H level when voltages applied to the "6" and "7" terminals thereof fall within the range between the voltage V8−V9 and the voltage V8+V9. As shown in FIG. 19B, an output from the "13" terminal is set at L level when voltages applied to the "6" and "7" terminals fall within the range between the voltage V8−V9 and the voltage V8+V9. As described above, the voltages V9 of the comparators 226a to 226d are different from each other, and the output waveforms thereof are also different. The waveforms are represented by the same reference numerals as the comparators, respectively. As shown in FIG. 19B, the window half widths are increased in an order of the comparators 226a, 226b, 226c and 226d. The level is switched at the rear wheel steering angles θr of ±2.5 degrees, ±5 degrees and ±8 degrees.

Referring again to FIG. 19B, an output from the "3" terminal of the comparator 226a is supplied as a signal 0c to the NAND gates 212a and 212b of FIG. 16A through an inverter 231. An output from the "3" terminal of the comparator 226a is supplied as a signal 0c' to the R input terminals of the flip-flops 213R and 213L through the OR gates 215 and 216 of FIG. 13A. The signal 0c has an inverted waveform of the signal shown in FIG. 16A, and is set at L level when the steering angle of the rear wheels is substantially zero, i.e., the rear wheels are kept substantially in the neutral position. The signal 0c' has the same waveform of the signal shown in FIG. 19A and is set at H level when the rear wheels are kept in the neutral position.

An output from the "3" terminal of the comparator 226b is supplied to NAND gates 233a and 233b through an inverter 232a. The NAND gate 233a also receives the signal 180c from the inverter 206c of FIG. 16A and a Q output from a flip-flop 234a. The signal 270a as the output from the inverter 208a of FIG. 16A is supplied to the S terminal of the flip-flop 234a. When the steering wheel 38 is rotated through 270 degrees or more to the right, the flip-flop 234a is set. The NAND gate 233b also receives the signal 180c of FIG. 16A and a Q output from a flip-flop 234b. The signal 270b as the output from the inverter 208b of FIG. 16A is supplied to the S terminal of the flip-flop 234b. When the steering wheel 38 is rotated through 270 degrees or more to the left, the flip-flop 234b is set. Outputs from the NAND gates 233a and 233b are inverted, and the inverted signals are supplied to an OR gate 235. An output from the OR gate 235 is supplied to the R terminal of each of the flip-flops 234a and 234b through an inverter 236 and OR gates 237a and 237b. An output from the "13" terminal of comparator 226b is supplied as a signal 2.5c to the NAND gates 207a and 207b of FIG. 16A through an inverter 232b.

An output from the "3" terminal of the comparator 226c is supplied to NAND gates 239a and 239b through an inverter 238a. The signal 270c as the output from the inverter 208c of FIG. 16A is supplied to the NAND gate 239a. A Q output from a flip-flop 240a is also supplied to the NAND gate 239a. The signal 360a as the output from the inverter 210 of FIG. 16A is supplied to the S terminal of the flip-flop 240a. When the steering wheel 38 is rotated through 360 degrees or more to the right, the flip-flop 240a is set. The NAND gate 239b receives the signal 270c of FIG. 16A and a Q output from a flip-flop 240b. The signal 360b as the output from the inverter 210b of FIG. 16A is supplied to the S terminal of the flip-flop 240b. When the steering wheel 38 is rotated through 360 degrees or more to the left, the flip-flop 240b is set. Outputs from the NAND gates 239a and 239b are inverted, and the inverted signals are supplied to an OR gate 241. An output from the OR gate 241 is supplied to the R terminals of the flip-flops 240a and 240b through an inverter 242 and OR gates 243a and 243b. An output from the "13" terminal of the comparator 226c is supplied as a signal 5c to the NAND gates 209a and 209b of FIG. 16A through an inverter 238b.

An initial reset signal IR signal is supplied to the reset terminals of the flip-flops 234a, 234b, 240a and 240b through OR gates 237a, 237b, 243a and 243b so as to initially reset these flip-flops.

Outputs from the OR gates 235 and 241 and the signal 90c as the output from the OR gate 214 of FIG. 16A are supplied to an OR gate 243. An output from the OR gate 243 is supplied through an OR gate 244 to the base of a transistor Qd for driving the coil d. The collector of the transistor Qd is connected to the coil d of FIG. 15. A neutral position restoring switch S is connected to the OR gate 244 through an inverter 245. An output from the OR gate 244 is supplied as the signal INC to the AND gates 20a and 220b of FIG. 16A through an inverter 246. An output from the "13" terminal of the comparator 226d is supplied as a signal 8c to the NAND gates 211a and 211b of FIG. 16A through an inverter 247.

Figure 16C:
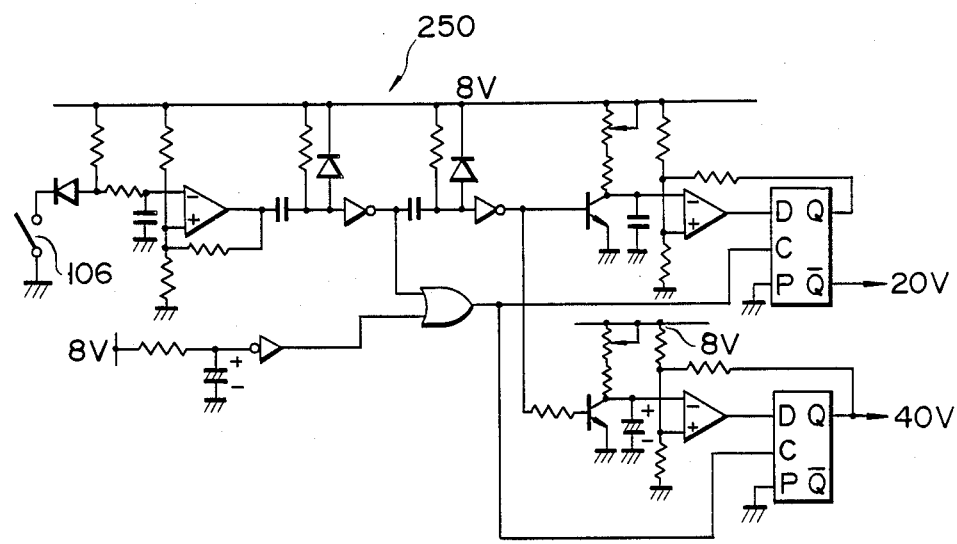
Figure 17:
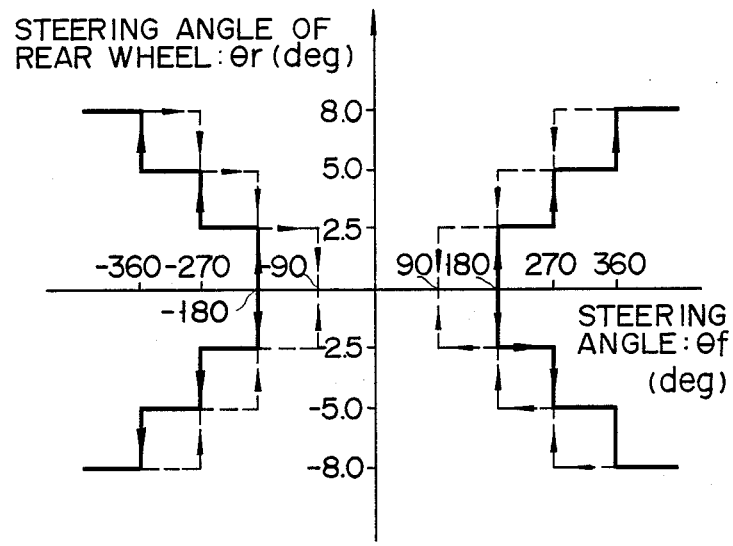
FIG. 17 is a graph showing a steering angle $\theta r$ of rear wheels as a function or a steering angle $\theta f$ according to the fourth embodiment of the present invention.

FIG. 16C shows a velocity detector 250 for receiving an output from the sensor 106 and detecting a velocity of the vehicle. The output signal 20 V is set at H level when the velocity is less than 20 km/h. The signal 20 V is supplied to the OR gate 220c and the AND gates 221a and 221b of FIG. 16A. The output signal 40 V from the detector 250 is set at H level when the velocity is more than 40 km/h. The signal 40 V is supplied to the OR gate 220c and the AND gates 222a and 222b of FIG. 16A and the transistor 62 of FIG. 16B.

The operation of the control unit described above will be described with reference to FIG. 16.

Since the steering directions of the rear wheels in the high and low velocity modes are reversed, the operation in the low velocity mode is described, and the conditions in the high velocity mode are described in parentheses.

The steering state of the rear wheels will be described when the steering wheel 38 is rotated through 180 degrees or more and then returns to the neutral position. When the steering wheel 38 is rotated to the right and the steering angle $\theta f$ exceeds 180 degrees, the signal 180a goes high. Since the rear wheels are not steered by ±2.5 degrees, the signal 2.5c supplied to the NAND gate 207a is kept high. Therefore, the logic of and the NAND gate 207a is established, and an output therefrom is set at L level. The output from the NAND gate 207a is inverted, and the inverted signal is supplied to the transistor Qc through the OR gate 218c and the AND gate 219c. When the velocity is less than 20 km/h or more than 40 km/h, the transistor Qc is driven to energize the coil c of FIG. 15. The output from the NAND gate 207a is inverted, and the inverted signal is supplied to the OR gate 218a, so that the output from the OR gate 218a is set at H level. Since the signal from the inverter 220 and the signal INC are set at H level, the output from the AND gate 220a is set at H level. When the velocity is less than 20 km/h, i.e., when the low velocity mode is set (when the velocity is more than 40 km/h, i.e., when the high velocity mode is set), the signal 20 V (the signal 40 V) is set at H level, and the AND gate 221a (the AND gate 222b) is set at H level. The output from the OR gate 223a (the OR gate 223b) is set at H level, and the transistor Qa (the transistor Qb) is driven to energize the coil a (the coil b). When the steering wheel 38 is rotated through 180 degrees or more, the coils c and a (b) are energized, and the flip-flop 213R is set, thereby detecting that the steering wheel 38 is rotated through 180 degrees or more to the right. When the coils c and a (b) are energized, the rear wheels are steered to the left (right) as described above. In this state, the output signal from the sensor 60 is increased, and the rear wheels are steered by 2.5 degrees to the left (right). The signal 2.5c as the output from the inverter 232b is set at L level, as is apparent from FIG. 19A. Since the signal 2.5c is supplied to the NAND gate 207a, the logic thereof is no longer established. The transistors Qc and Qa (Qb) are turned off, and the coils c and a (b) are deenergized. Thus, the rear wheels are thus kept steered at 2.5 degrees to the left (right).

When the steering wheel 38 returns toward the neutral position and the steering angle $\theta f$ is set at 90 degrees, the signal 90a as the output from the comparator 200d goes high. Since the rear wheels are steered through 2.5 degrees to the left (right), the signal 0c is set at H level. As described above, the flip-flop 213R is set, and the logic of the NAND gate 212a is established. The signal 90c as the output from the OR gate 214 goes high. Since the signal 90c is supplied to the OR gate 243 of FIG. 16B, the transistor Qd is turned on to energize the coil d. In this state, the rear wheels return to the neutral position, as described with reference to FIG. 15. When the rear wheels return to the neutral position, the signal 0c as the output from the inverter 231 is set at L level. Since the signal 0c is supplied to the NAND gate 212a, the logic thereof is not established. Therefore, when the rear wheels return to the neutral position, the signal 90c goes low, and the transistor Qd is turned off. As a result, the coil d is deenergized.

As described above, the steering wheel 38 is rotated through 180 degrees to the right and returns to the neutral position. In this case, when the steering wheel 38 is rotated through 180 degrees to the right, the rear wheels are steered through 2.5 degrees to the left (right). When the steering wheel 38 returns to the angle of 90 degrees, the rear wheels return to the neutral position. The stepwise operation of the rear wheels is represented by the locus in FIG. 17.

When the steering wheel 38 is rotated through 180 degrees to the left and then returns to the neutral position, the above stepwise operation is also performed. More particularly, when the steering wheel 38 is rotated through 180 degrees to the left, the rear wheels are steered through 2.5 degrees to the right (left). When the steering wheel 38 returns to the angle of 90 degrees, the rear wheels return to the neutral position. In this case, when the steering wheel 38 is rotated through 180 degrees to the left, the flip-flop 213L is set. At the same time, the signal 180b goes high to energize the coils c and b (a). When the steering wheel 38 returns to the angle of 90 degrees, the signal 90b and then the signal 90c go high to energize the coil d. When the rear wheels return to the neutral position, the signal 0c goes low to deenergize the coil d. Therefore, the rear wheels are kept in the neutral position.

A steering state of the rear wheels will be described when the steering wheel 38 is rotated through 270 degrees to the right and then returns to 0 degrees. When the steering wheel 38 is rotated through 180 degrees to the right, the rear wheels are steered through 2.5 degrees to the left (right). This operation has been described above in detail and will be omitted. When the steering wheel 38 is further rotated through 90 degrees and is kept at an angle of 270 degrees, the signal 270a goes high. Since the rear wheels are not steered at an angle of 5 degrees to the left (right), the signal 5c supplied to the NAND gate 209a is kept at H level. The logic of the NAND gate 209a is established, and an output therefrom goes low. The output from the NAND gate 209a is inverted, and the inverted signal is supplied to the OR gate 218a. The output from the OR gate 218a is thus set at H level. The output from the inverter 220 is set at H level and the signal INC is also set at H level, so that the output from the AND gate 220a is set at H level. When the velocity is set in the low velocity mode, i.e., less than 20 km/h, (in the high velocity mode, i.e., more than 40 km/h), the signal 20 V (the signal 40 V) is set at H level, and the output from the AND gate 221a (the AND gate 222b) is set at H level. The output from the OR gate 223a (the OR gate 223b) is set at H level, and the transistor Qa (the transistor Qb) is driven to energize the coil a (the coil b). Therefore, when the steering wheel 38 is rotated through 270 degrees or more, the coil (the coil b) is energized, and the flip-flop 234a is set, thereby detecting that the steering wheel 38 is steered through 270 degrees or more to the right. When the coil a (the coil b) is energized, the rear wheels are steered to the left (right). When the rear wheels are further steered to the left (right), the output signal from the sensor 60 is increased. When the rear wheels are steered through 5 degrees to the left (right), the signal 5c as the output from the inverter 238b is set at L level, as is apparent from the waveform of FIG. 19A. The signal 5c is supplied to the NAND gate 209a, and the logic of the NAND gate 209a is not established. Therefore, the transistor Qa (the transistor Qb) is turned off to deenergize the coil a (the coil b), and the rear wheels are kept steered at the angle of 5 degrees to the left (right).

When the steering wheel 38 returned toward the neutral position and the steering angle θf is set at 180 degrees, the signal 180c as the output from the inverter 206c goes high. The output from the inverter 232a supplied to the NAND gate 223a is set at H level since the rear wheels are steered at an angle of 5 degrees to the left (right). As described above, the flip-flop 234a is set, so that the logic of the NAND gate 233a is established. The output from the OR gate 235 is set at H level. The transistor Qd is driven to energize the coil d. When the coil d is energized, the rear wheels return toward the neutral position, as previously described with reference to FIG. 15. When the rear wheels return at an angle of 2.5 degrees (−2.5 degrees), the output from the inverter 232a is set at L level. This output is supplied to the NAND gate 233a, so the logic thereof is not established. Therefore, when the rear wheels return to an angle of 2.5 degrees (−2.5 degrees), the transistor Qd is turned off, and the coil d is deenergized.

The operation for returning the steering wheel 38 at an angle of 90 degrees has been described and will be omitted.

In the manner described above, in the case wherein the steering wheel 38 is rotated to the right and returns to the neutral position, when the steering wheel 38 is rotated through 180 degrees to the right, the rear wheels are steered at the angle of 2.5 degrees to the left (right). When the steering wheel 38 is further rotated through 90 degrees and reaches 270 degrees, the rear wheels are steered at the angle of 5 degrees to the left (right). When the steering wheel 38 returns to the angle of 180 degrees, the rear wheels return to the angle of 2.5 degrees (−2.5 degrees). Furthermore, when the steering wheel 38 returns to the angle of 90 degrees, the rear wheels return to the neutral position. The rear wheels are steered stepwise, as is apparent from the locus shown in FIG. 17.

When the steering wheel 38 is rotated through 270 degrees to the left and then returns to the neutral position, the above operation is performed. When the steering wheel 38 is rotated through 180 degrees to the right (left), the rear wheels are steered at an angle of 2.5 degrees to the right (left). When the steering wheel 38 is further rotated to an angle of 270 degrees, the rear wheels are steered at an angle of 5 degrees to the right (left). Furthermore, when the steering wheel 38 returns to an angle of 180 degrees, the rear wheels return to an angle of 2.5 degrees (−2.5 degrees). When the steering wheel 38 returns to an angle of 90 degrees, the rear wheels return to the neutral position. In this case, when the steering wheel 38 is rotated through 180 degrees to the left, the flip-flop 213L is set and the signal 180b goes high. The coil c and the coil b (a) are energized to steer the rear wheels at an angle of 2.5 degrees to the right (left). Thereafter, the coils c and a (b) are deenergized. When the steering wheel 38 is rotated to an angle of 270 degrees, the signal 270b goes high to set the flip-flop 234b. At the same time, the coil b (a) is energized to steer the rear wheels to the right (left). When the rear wheels are steered at the angle of 5 degrees in the right (left), the signal 5c goes low to deenergize the solenoid b. Furthermore, when the steering wheel 38 returns to the angle of 180 degrees, the signal 180c goes high. The logic of the NAND gate 233b is established to energize the coil d. When the rear wheels return to the angle of 2.5 degrees (−2.5 degrees), the output from the inverter 232a is set at L level. In this manner, when the steering wheel 38 returns to the angle of 180 degrees, the rear wheels are steered at the angle of 2.5 degrees (−2.5 degrees). Furthermore, when the steering wheel 38 returns to the angle of 90 degrees, the signal 90b goes high and then the signal 90c goes high, thereby returning the rear wheels to the neutral position.

Steering of the rear wheels will be described when the steering wheel 38 is rotated through 360 degrees to the right and returns to 0 degrees. The operation for steering the steering wheel 38 through 270 degrees to the right to steer the rear wheels through 5 degrees to the left (right) has been described above and will be omitted. When the steering wheel 38 is rotated through 360 degrees to the right, the signal 360a goes high. Since the rear wheels are not steered at an angle of 8 degrees to the left (right), the signal 8c supplied to the NAND gate 211a is kept at H level. The logic of the NAND gate 211a is established, and the output therefrom is set at L level. The output from the NAND gate 211a is inverted, and the inverted signal is supplied to the OR gate 218a. The output from the OR gate 218a is thus set at H level. Since the output from the inverter 220 and the signal INC are set at H level, the output from the AND gate 220a is set at H level. When the velocity is set in the low velocity mode, i.e., less than 20 km/h (in the high velocity mode, i.e., more than 40 km/h), the signal 20 V (the signal 40 V) is set at H level, and then the output from the AND gate 221a (the AND gate 222b) is set at H level. The output from the AND gate 223a (the OR gate 223b) is set at H level to turn on the transistor Qa (the transistor Qb), thereby energizing the coil a (the coil b). Therefore, when the steering wheel 38 is rotated through 360 degrees or more, the coil a (the coil b) is energized and the flip-flop 239a is set, thereby detecting that the steering wheel 38 is rotated through 360 degrees or more to the right. When the coil a (the coil b) is energized, the rear wheels are steered to the left (right) as described above. When the rear wheels are further steered to the left (right), the output signal from the sensor 60 is increased. When the rear wheels are steered at the angle of 8 degrees to the left (right), the signal 8c as the output from the inverter 247 goes L level, as is apparent from the waveform of FIG. 19A. The signal 8c is supplied to the NAND gate 211a, and the logic thereof is no longer established. The transistor Qa (the transistor Qb) is turned off to deenergize the coil a (the coil b). Therefore, the rear wheels are kept steered at the angle of 8 degrees to the left (right).

When the steering wheel 38 returns to the angle of 270 degrees, the signal 270c as the output from the inverter 208c goes high. The output generated from the inverter 237a and supplied to the NAND gate 239a is set at H level since the rear wheels are kept steered at the angle of 8 degrees. Since the flip-flop 240a is set, the logic of the NAND gate 239a is established. For this reason, the output from the OR gate 241 is set at H level. The transistor Qd is then driven to energize the coil d. When the solenid d is energized, the rear wheels return to the neutral position, as described with reference to FIG. 15. When the rear wheels return to the angle of 5 degrees (−5 degrees), the output from the inverter 238a is set at L level. This signal is supplied to the NAND gate 239a, so the logic thereof is no longer established. Therefore, when the rear wheels return to the angle of 5 degrees (−5 degrees), the transistor Qd is turned off and the coil d is deenergized. The operation when the steering wheel 38 is returned to the angle of 180 degrees has been described above and will be omitted.

In the case wherein the steering wheel 38 is rotated to the right and returns to the neutral position, when the steering wheel 38 is rotated through 180 degrees to the right, the rear wheels are steered at the angle of 2.5 degrees to the left (right). When the steering wheel 38 is further rotated through 90 degrees to 270 degrees, the rear wheels are steered at the angle of 5 degrees to the left (right). When the steering angle of the steering wheel 38 reaches 360 degrees, the rear wheels are steered at the angle of 8 degrees to the left (right). When the steering wheel 38 returns to the angle of 270 degrees, the rear wheels return to the angle of 5 degrees (−5 degrees). When the steering wheel 38 returns to the angle of 180 degrees, the rear wheels return to the angle of 2.5 degrees (−2.5 degrees). When the steering wheel 38 returns to the angle of 90 degrees, the rear wheels return to the neutral position. The stepwise steering of the rear wheels is represented by the locus shown in FIG. 17.

In the case wherein the steering wheel 38 is rotated through 360 degrees to the left and returns to the neutral position, when the steering wheel 38 is rotated through 180 degrees to the left, the rear wheels are steered at the angle of 2.5 degrees to the right (left). When the angle of the steering wheel 38 reaches 360 degrees, the rear wheels are steered at the angle of 8 degrees to the right (left). When the steering wheel 38 returns to the angle of 270 degrees, the rear wheels return to the angle of 5 degrees (−5 degrees). When the steering wheel 38 returns to the angle of 180 degrees, the rear wheels return to the angle of 2.5 degrees (−2.5 degrees). Finally, when the steering wheel 38 returns to the angle of 90 degrees, the rear wheels return to the neutral position. In this case, the steering wheel 38 is rotated through 180 degrees to the left, the flip-flop 213L is set, and the signal 180b goes high, so that the coils c and b (a) are energized. When the rear wheels are steered at the angle of 2.5 degrees to the right (left), the coils c and b (a) are deenergized. When the steering wheel 38 is rotated to the angle of 270 degrees to the left, the signal 270b goes high to set the flip-flop 234b and the coil b (the coil a) is energized. The rear wheels are steered to the right (left). When the rear wheels are steered at the angle of 5 degrees to the right (left), the signal 5c is set at L level. The coil b (the coil a) is thus deenergized. When the steering wheel 38 is rotated up to the angle of 360 degrees, the signal 360b goes high to set the flip-flop 240b and energize the coil b (the coil a) again. The rear wheels are steered to the right (left). When the rear wheels are steered at the angle of 8 degrees to the right (left), the signal 8c is set at L level and the coil b (the coil a) is deenergized. When the steering wheel 38 returns to the angle of 270 degrees, the signal 270c goes high. The logic of the NAND gate 239b is established to energize the coil d. When the rear wheels return to the angle of 5 degrees (−5 degrees), the output from the inverter 238a is set at L level. Therefore, when the steering wheel 38 returns to the angle of 270 degrees, the rear wheels return to the angle of 5 degrees (−5 degrees). When the steering wheel 38 returns to the angle of 180 degrees, the signal 180c goes high. The logic of the NAND gate 233b is established to energize the coil d. When the rear wheels return to the angle of 2.5 degrees (−2.5 degrees), the output from the inverter 232a goes low. When the steering wheel 38 returns to the angle of 180 degrees, the rear wheels return to the angle of 2.5 degrees (−2.5 degrees). When the steering wheel 38 returns to the angle of 90 degrees, the signal 90b and then the signal 90c go high, and the rear wheels return to the neutral position.

In the above embodiment, the rear wheels are steered in both the low and high velocity modes. However, the rear wheels may be steered in either the low or high velocity mode.

Referring to FIG. 16A, when the rear wheels are steered only in the low velocity mode, (1) The OR gate 220c is omitted, and the signal 20 V is supplied to the other input terminal of the AND gate 219c.

(2) The output from the AND gate 221a is directly supplied to the output side of the OR gate 223a, and the output from the AND gate 221b is directly supplied to the output side of the OR gate 223b. The AND gates 222a and 222b and the OR gates 223a and 223b are omitted.

Referring to FIG. 16B, when the rear wheels are steered only in the low velocity mode, (1) The switch 61 is set in the position of the "B" terminal, and the corresponding terminals are connected. The transistor 62 and the switch 61 are omitted.

When the velocity is set in the high velocity mode, the signal 20 V is set at L level, and the output from the AND gate 219c is set at L level. In this case, the coil c is not energized. The outputs from the AND gates 221a and 221b are set at L level, and the coils a and b are not energized. Therefore, the rear wheels are not steered.

Referring to FIG. 16A, when the rear wheels are steered only in the high velocity mode, (1) The OR gate 220c is omitted, and the signal 40 V is supplied to the other input terminal of the AND gate 219c.

(2) The output from the AND gate 222b is directly supplied to the output side of the OR gate 223a, and the output from the AND gate 222a is directly supplied to the output side of the OR gate 223b. The AND gates 221a and 221b and the OR gates 223a and 223b are omitted.

Referring to FIG. 16B, when the rear wheels are steered only in the high velocity mode, (1) The switch 61 is set at the position of the "A" terminal, and the corresponding terminals are connected. The transistor 62 and the switch 61 are omitted.

When the velocity is set in the low velocity mode, the signal 40 V is set at L level, and the output from the AND gate 219c is set at L level. The coil c is not energized. The outputs from the AND gates 222a and 222b are set at L level, and the coils a and b are not energized.

According to the embodiment described above, the steering angle of the rear wheels is changed in a stepped manner in accordance with the steering angle of the steering wheel (i.e., the front wheels) as shown in FIG. 17. Even if the maximum steering angle of the rear wheels is large, the steering angle of the rear wheels is gradually changed to provide a rear wheel steering apparatus with high operation stability.

The steering angle sensors are used in the first, second and fourth embodiments, and the front wheel steering angle sensor is used in the third embodiment to detect steering angles of the steering wheel and the front wheels. However, either sensor can be used.

What is claimed is:

1. A rear wheel steering apparatus for a vehicle having steerable front and rear wheels comprising:
    driving condition detecting means including,
        front wheel steering angle detecting means for detecting a front wheel steering angle of said vehicle and generating a signal corresponding to the front wheel steering angle, and
        rear wheel steering angle detecting means for detecting a rear wheel steering angle of the vehicle and generating a signal corresponding to the rear wheel steering angle;
    rear wheel steering control means for steering said rear wheels, including,
        a first cylinder housing,
        a first piston member adapted to reciprocate within said cylinder housing and coupled to the rear wheels,
        a selector control valve for selectively causing a pressure source and a tank to communicate with two chambers defined in said first cylinder housing by said piston member, and
        a steering mechanism which is arranged between said selector control valve and said two chambers and which has check valves allowing a flow-in operation for one of said two chambers and simultaneously a flow-out operation for the other of said two chambers, said steering control means being adapted to control said steering mechanism; and
    rear wheel steering control means including,
        discriminating means for discriminating a difference between said front and rear wheel steering angle signals from said front and rear wheel steering angle detecting means, and
        steering control means, responsive to said decriminating means, for supplying a steering signal to said rear wheel steering means to eliminate the difference between said front and rear wheel steering angles when the difference exceeds a predetermined value.

2. An apparatus according to claim 1, wherein said driving condition detecting means further comprises velocity detecting means for detecting a velocity of the vehicle and providing a signal corresponding thereto, and said rear wheel steering control means further comprises enabling means for enabling the rear wheels to be steered in response to a signal within a predetermined velocity range from said velocity detecting means, and for inhibiting the rear wheel steering angle to be increased from a neutral position and enabling the rear wheels to return to the neutral position in response to a signal outside said predetermined velocity range, said steering control means generating an enabling signal to enable said rear wheel steering means to steer the rear wheels.

3. An apparatus according to claim 2, wherein said steering control means includes means for causing said rear wheel steering means to steer the rear wheels in a direction opposite to that of the front wheels in response to a velocity signal from said velocity detecting means which is below a preset velocity.

4. An apparatus according to claim 3, wherein said driving condition detecting means further comprises lever position detecting means for detecting a position of an operation lever of a gear transmission unit of the vehicle, said enabling means inhibiting the rear wheel steering angle to be increased from the neutral position and enabling the rear wheels to be steered to the neutral that said operation lever is set in a high velocity mode.

5. An apparatus according to claim 2, wherein said steering control means includes means for causing said rear wheel steering means to steer the rear wheels in the same direction as that of the front wheels in response to a velocity signal from said velocity detecting means which is above a preset velocity.

6. An apparatus according to claim 5, wherein said steering control means further includes means for causing said rear wheel steering means to steer the rear wheels in a direction opposite to that of the front wheels in response a velocity signal from said velocity detecting means which is below said preset velocity.

7. An apparatus according to claim 5, wherein said driving condition detecting means further comprises lever position detecting means for detecting a position of an operation lever of a gear transmission unit of the vehicle, said enabling means inhibiting the rear wheel steering angle to be increased from the neutral position and enabling steering of the rear wheels to neutral position when said lever position detecting means detects that said operation lever is set in a high velocity mode.

8. An apparatus according to claim 2, wherein said driving condition detecting means further comprises velocity detecting means for detecting a velocity of the vehicle and providing a signal corresponding thereto, and said rear wheel steering control means further comprises means for inhibiting steering of the rear wheels when a front wheel steering angle signal from said front wheel steering angle detecting means falls within a preset steering angle range from a neutral position, and switching means for switching the preset steering range in response to the signal from said velocity detecting means.

9. An apparatus according to claim 8, wherein said switching means is arranged such that the preset steering angle range is wider when said velocity signal is below a preset velocity that when said velocity signal is above said preset velocity.

10. An apparatus according to claim 1, wherein said rear wheel steering control means further comprises front wheel steering direction detecting means for detecting a steering direction of the front wheels in response to a signal front wheel steering angle detecting means, said steering control means operating said rear wheel steering control means in response to outputs from said discriminating means and said front wheel steering direction detecting means.

11. An apparatus according to claim 2, wherein said apparatus further comprises:
    front wheel steering direction detecting means for detecting a steering direction of the front wheels in response to a signal from said front wheel steering angle detecting means;
    front wheel steering direction detecting means for detecting a steering direction of the front wheels in response to a signal from said front wheel steering angle detecting means; and
    steering signal generating means for generating a steering signal for steering the rear wheels so as to eliminate said difference between said front and rear wheels steering angles in response to outputs from aid front wheel steering position detecting means and said discriminating means and for generating an overrun signal when the rear wheels are steered through an angle exceeding said difference, said steering control means operating said rear wheel steering means in response to a direction signal from said front wheel steering direction detecting means, said steering signal, and said overrun signal.

12. An apparatus according to claim 6, wherein said rear wheel steering angle detecting means further comprises signal switching means for switching an output signal in response to a change in an output signal from said front wheel steering angle detecting means when the velocity signal from said velocity detecting means is below said preset velocity and the rear wheels are steered in a direction opposite to that of the front wheels, and when the velocity signal is above said preset velocity and the rear wheels are steered in the same direction as that of the front wheels.

13. An apparatus according to claim 2, wherein the difference between the front and rear steering angles is detected by overshoot detecting means for detecting whether the difference is larger than a preset value, which preset value is larger than said predetermined value, and said enabling means inhibits the rear wheel steering angle from being increased when said overshoot detecting means detects that the difference exceeds the preset value.

14. An apparatus according to claim 2, wherein said rear wheel steering control means further comprises:
    output comparing means for comparing whether a signal from said rear wheel steering angle detecting means is outside a range defined by a preset upper limit and a preset lower limit and providing a signal corresponding thereto; and
    inhibiting means for inhibiting the operation of said rear wheel steering means in response to said signal from said output comparing means.

15. A apparatus according to claim 1, wherein said rear wheel steering means comprises a steering mechanism coupled to the rear wheels and a lock mechanism for inhibiting the operation of said steering mechanism to hold the rear wheels in the neutral position.

16. An apparatus according to claim 15, wherein said rear wheel steering control means further comprises:
    lock detecting means for detecting that the lock mechanism is in an inhibiting mode and providing a signal corresponding thereto;
    front wheel steering position detecting means for detecting a steering position of the front wheels in response to a signal from said front wheel steering angle detecting means; and
    inhibiting means for generating a steering inhibiting signal to said steering control means when a signal is not received from said lock detecting means within a predetermined period of time after a signal representing that the front wheels are located in the neutral position is generating from said front wheel steering angle detecting means.

17. An apparatus according to claim 15, wherein said rear wheel steering control means further comprises:
    front wheel steering position detecting means for detecting the steering position of the front wheels in response to a signal from said front wheel steering angle detecting means;
    rear wheel steering position detecting means for detecting the steering position of the rear wheels in response to a signal from said rear wheel steering angle detecting means; and
    lock control means for actuating and setting said lock mechanism in a lock enabling state when the steering angle detected by said front wheel steering position detecting means exceeds a preset value and the steering angle detected by said rear wheel steering position detecting means is smaller than said predetermined value.

18. An apparatus according to claim 1, further comprising: a second cylinder housing; a second piston member adapted to reciprocate within said second cylinder housing and coupled to the rear wheels; a biasing member, movable within said second cylinder housing, for biasing said second piston member at a neutral position; a lock member, arranged in said second cylinder housing, for engaging with said second piston member when said second piston member is located at the neutral position; and a lock mechanism having an actuating control valve operated in a state wherein a pressure from said pressure source is applied to said biasing member and in a state wherein the pressure is applied to said lock member to separate said lock member from said piston member, said steering control means being adapted to control said lock mechanism and said steering mechanism to steer the rear wheels.

19. An apparatus according to claim 18, wherein said check valves are operated to cause said selector control valve to communicate with said two chambers when said actuating control valve applies pressure from said pressure source on said biasing member.

20. An apparatus according to claim 1, further comprising: a second cylinder housing; a second piston member adapted to reciprocate within said second cylinder housing and coupled to the rear wheels; a biasing member, movable within said second cylinder housing, for biasing said second piston member at a neutral position; a lock member, arranged in said second cylinder housing, for engaging with said second piston member when said second piston member is located at the neutral position; and a lock mechanism having an actuating control valve operated to apply the pressure from said pressure source to said second cylinder housing so as to urge said biasing member against a biasing force thereof and separate said lock member from said piston member, said steering control means being adapted to control said lock mechanism and said steering mechanism to steer the rear wheels.

21. An apparatus according to claim 20, wherein said actuating control valve is operated to apply pressure from said pressure source to said check valves to cause said selector control valve to communicate with said two chambers when said actuating control valve is inactive.

22. An apparatus according to claim 2, wherein said rear wheel steering means comprises
   a first cylinder housing:
   a first piston member adapted to reciprocate within said first cylinder housing and coupled to the rear wheels:
   a selector control valve for selectively causing a pressure source and a tank to communicate with two chambers defined in said first cylinder housing by said first piston member;
   and a steering mechanism which is arranged between said selector control valve and said two chambers and which has check valves for allowing a flow-in operation for one of said two chambers and simultaneously a flow-out operation for the other of said two chambers, said driving condition detecting means further comprises lever position detecting means for detecting a position of an operation lever of a gear transmission means of the vehicle; and said rear wheel steering control means further comprises pressure generation actuating means for actuating the pressure generating means of said pressure source in response to a position signal from said lever position detecting means, the predetermined velocity range signal from said velocity detecting means, and a low pressure signal which is supplied from said pressure source and which represents a pressure lower than a preset pressure.

23. An apparatus according to claim 1, wherein said rear wheel steering control means actuates said rear wheel steering means to steer the fear wheels at a preset angle when the difference detected by said discriminating means exceeds said predetermined value.

24. An apparatus according to claim 1, wherein said driving condition detecting means further comprises velocity detecting means for detecting the velocity of the vehicle, and said rear wheel steering control means comprises switching means for switching a ratio of the rear wheel steering angle to the front wheel steering angle in response to the velocity signal from said velocity detecting means.

25. A rear wheel steering apparatus for a vehicle having steerable front and rear wheels comprising:
   driving condition detecting means including
      front wheel steering angle detecting means for detecting a front wheel steering angle of said vehicle and generating a signal corresponding to the front wheel steering angle, and
      rear wheel steering angle detecting means for detecting a rear wheel steering angle of the vehicle and generating a signal corresponding to the rear wheel steering angle;
   preset steering angle range means for developing a plurality of preset steering angle ranges;
   discriminating means for discriminating if the front wheel steering angle detecting by said front wheel steering angle detecting means is within one of said plurality of preset steering angle ranges and developing a specific steering angle range corresponding to one of said plurality of preset steering angle ranges having the front wheel steering angle detected therein; and
   rear wheel steering control means for steering the rear wheels to a predetermined steering angle corresponding to the specific steering angle range developed by said discriminating means.

26. An apparatus according to claim 25, further comprising: a motor for driving an output shaft of said rear wheel steering control means which is coupled to the rear wheels so as to steer the rear wheels; braking means for braking the rotation of said output shaft; and a lock mechanism for engaging with said output shaft to hold the rear wheels in the neutral position.

27. An apparatus according to claim 26, wherein said rear wheel steering control means operates said braking means to restrict the rotation of said output shaft when the difference between said rear wheel steering angle and said predetermined steering angle is substantially zero.

* * * * *

UNITED STATES PATENT AND TRADEMARK OFFICE
CERTIFICATE OF CORRECTION

PATENT NO. : 4,884,647
DATED : Dec. 5, 1989
INVENTOR(S) : Mimuro et al.

It is certified that error appears in the above-identified patent and that said Letters Patent is hereby corrected as shown below:

On the title page, section [30], Foreign Application Priority Data:

Line 1, delete "Nov. 21, 1983  JP  Japan .......... 58-179923"

Line 2, delete "Nov. 30, 1983  JP  Japan .......... 58-184861"

Line 3, delete "Nov. 30, 1983  JP  Japan .......... 58-184860"

Line 4, delete "Nov. 30, 1983  JP  Japan .......... 58-184851"

Line 5, delete "Nov. 30, 1983  JP  Japan .......... 58-184853"

Line 6, delete "Nov. 30, 1983  JP  Japan .......... 58-184854"

Signed and Sealed this

Twenty-fifth Day of August, 1992

*Attest:*

DOUGLAS B. COMER

*Attesting Officer*     Acting Commissioner of Patents and Trademarks